(12) United States Patent
Smith

(10) Patent No.: US 11,668,240 B2
(45) Date of Patent: Jun. 6, 2023

(54) GAS-WIND TURBINE ENGINE

(71) Applicant: Mike Richard John Smith, Surrey (CA)

(72) Inventor: Mike Richard John Smith, Surrey (CA)

( * ) Notice: Subject to any disclaimer, the term of this patent is extended or adjusted under 35 U.S.C. 154(b) by 0 days.

(21) Appl. No.: 17/274,262

(22) PCT Filed: Apr. 2, 2020

(86) PCT No.: PCT/CA2020/000047
§ 371 (c)(1),
(2) Date: Mar. 8, 2021

(87) PCT Pub. No.: WO2021/003551
PCT Pub. Date: Jan. 14, 2021

(65) Prior Publication Data
US 2022/0128005 A1    Apr. 28, 2022

(30) Foreign Application Priority Data

Jul. 8, 2019 (CA) ................................ CA 3048823

(51) Int. Cl.
| F02C 7/18 | (2006.01) |
| F01D 1/02 | (2006.01) |
| F01D 15/10 | (2006.01) |
| F01D 25/12 | (2006.01) |
| F02C 6/06 | (2006.01) |

(52) U.S. Cl.
CPC ............... F02C 7/18 (2013.01); F01D 1/026 (2013.01); F01D 15/10 (2013.01); F01D 25/12 (2013.01); F02C 6/06 (2013.01); F05D 2260/211 (2013.01)

(58) Field of Classification Search
CPC ..................................... F02C 7/12; F02C 7/18
See application file for complete search history.

(56) References Cited

U.S. PATENT DOCUMENTS

| 4,251,185 A * | 2/1981 | Karstensen ............. F01D 11/08 |
| | | 415/113 |
| 2011/0056208 A1* | 3/2011 | Norris ........................ F02C 7/36 |
| | | 60/792 |
| 2015/0252732 A1* | 9/2015 | Kupratis ................... F02C 9/18 |
| | | 60/226.3 |

* cited by examiner

*Primary Examiner* — Gerald L Sung
(74) *Attorney, Agent, or Firm* — Ryan W. Dupuis; Kyle R. Satterthwaite; Ade & Company Inc.

(57) ABSTRACT

The engine is adapted to generate thrust or designed to generate torque includes a combustor, the combustor generates an exhaust gas flow to push the rotor blades of a rotor in a rotor housing, the exhaust gas flow rotates the rotor, shaft, and fan which produces a rotating force and produces an air flow. The rotor housing having a first wall, a second wall, and a third wall which guides the exhaust gas flow until the exhaust gas flow reaches a housing gap at the second wall and the exhaust gas flow moves out from the rotor housing, while the first wall having another housing gap for the air flow to go through to cool the rotor and the cooling process adds torque to the engine. The engine includes an optional wind turbine assembly. An air compressor is either driven by an electric motor or driven by other means.

20 Claims, 34 Drawing Sheets

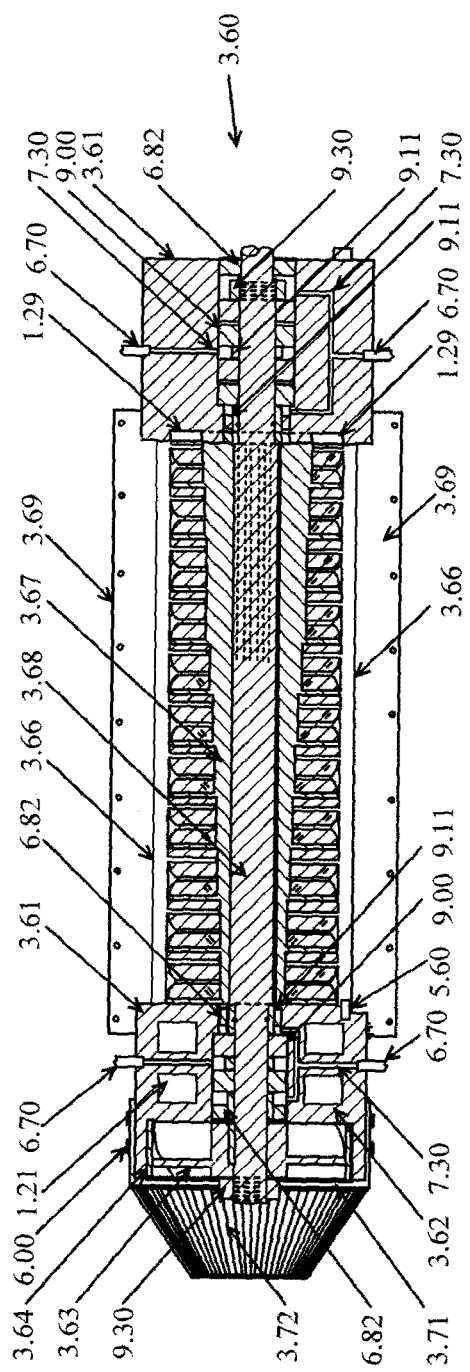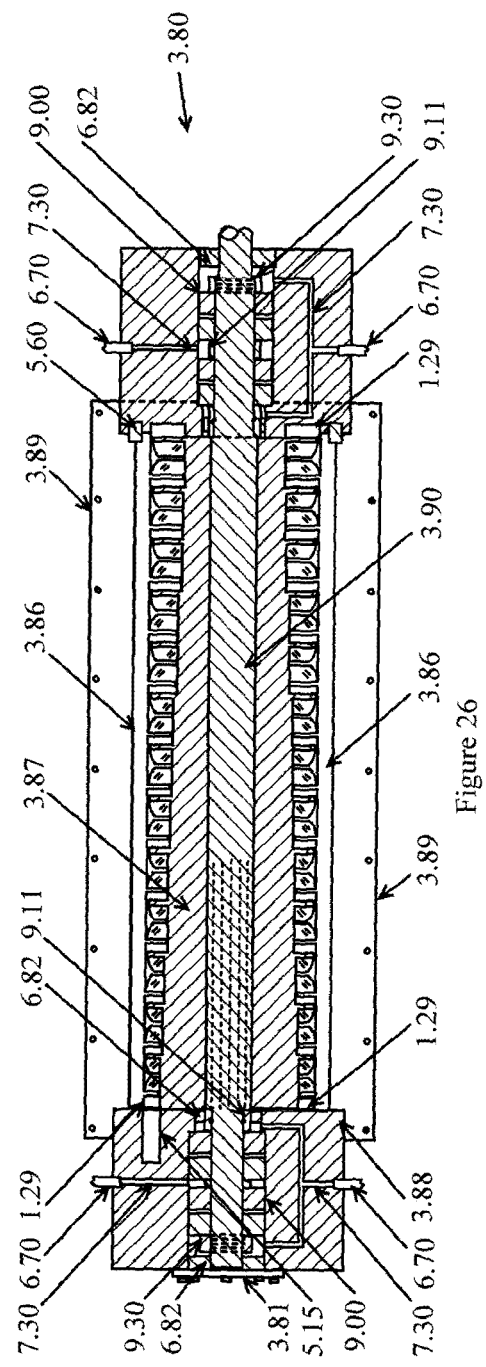
Figure 25
Figure 26

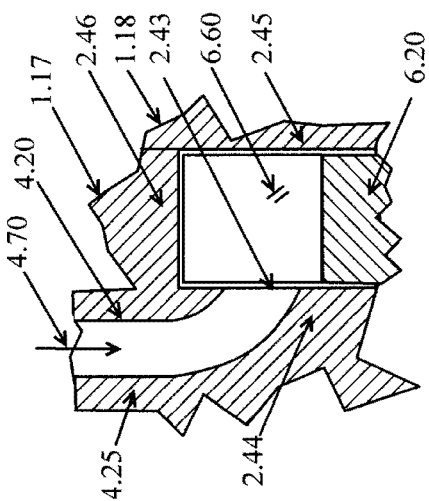
Figure 34
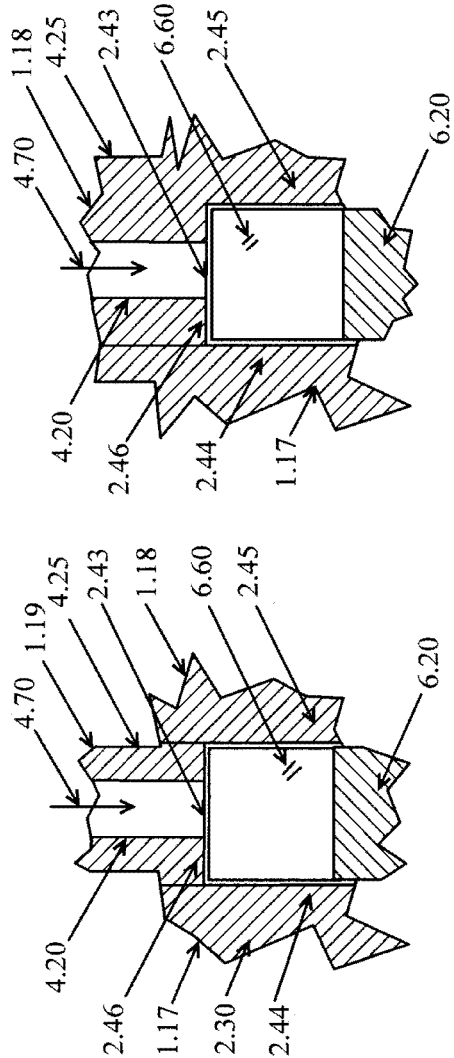
Figure 33
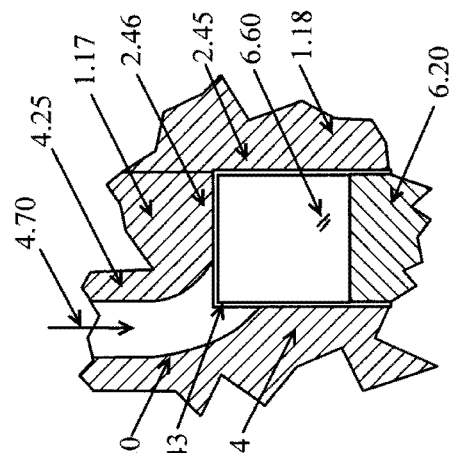
Figure 35
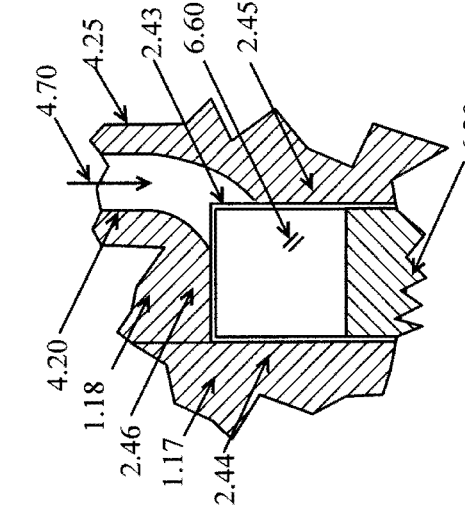
Figure 37
Figure 38
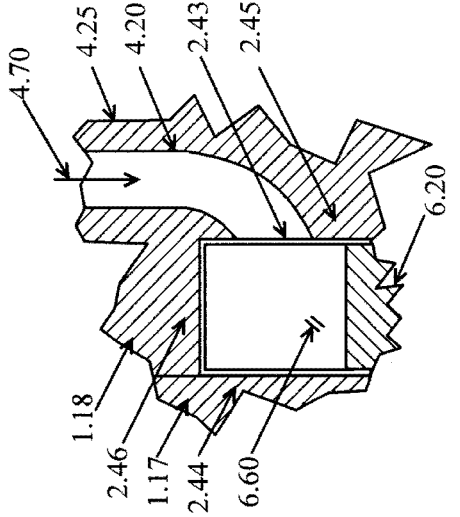
Figure 36

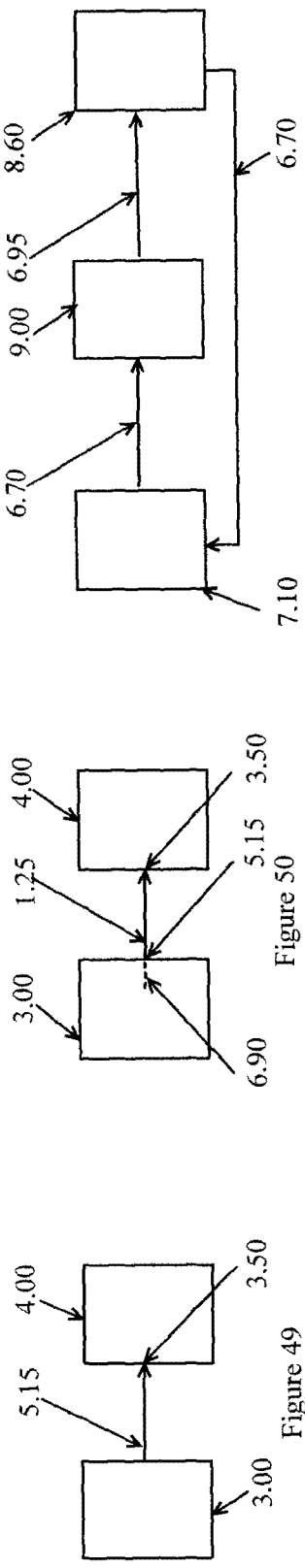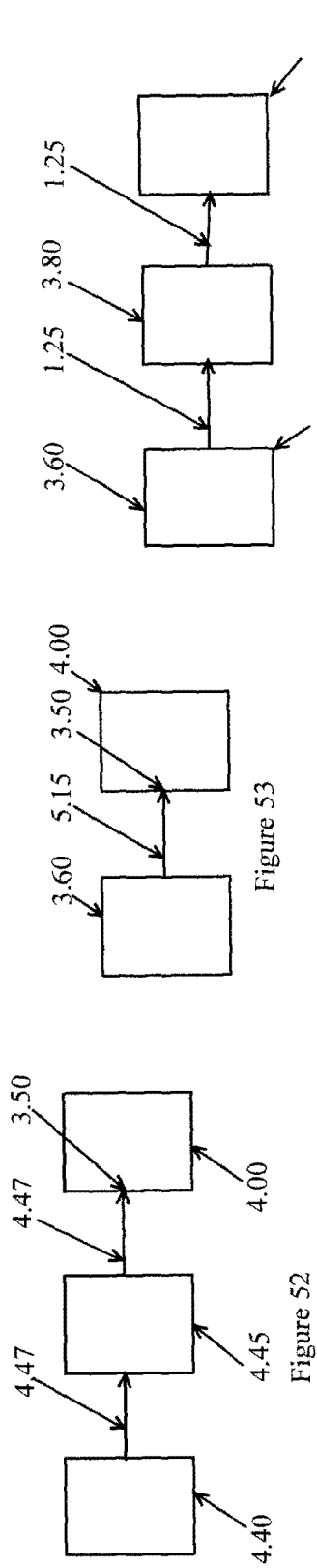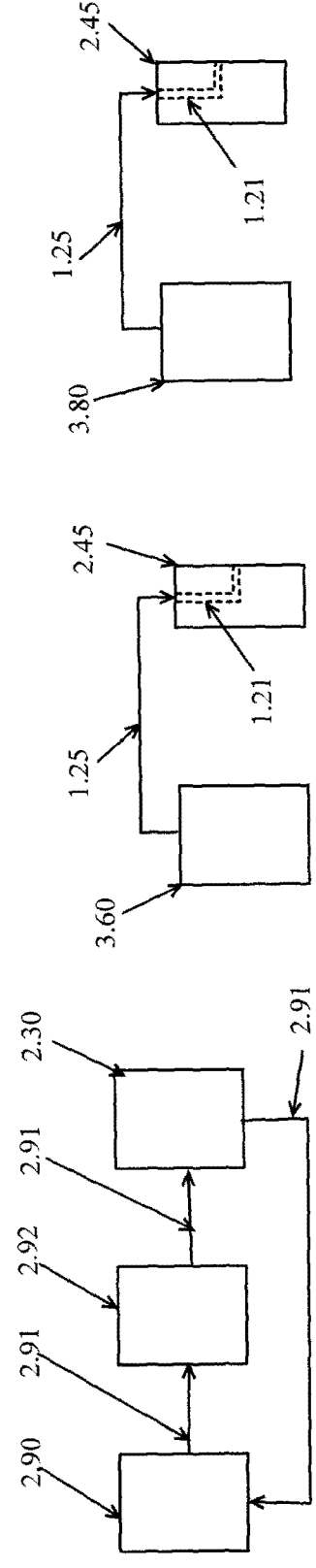
Figure 49, Figure 50, Figure 51, Figure 52, Figure 53, Figure 54, Figure 55, Figure 56, Figure 57

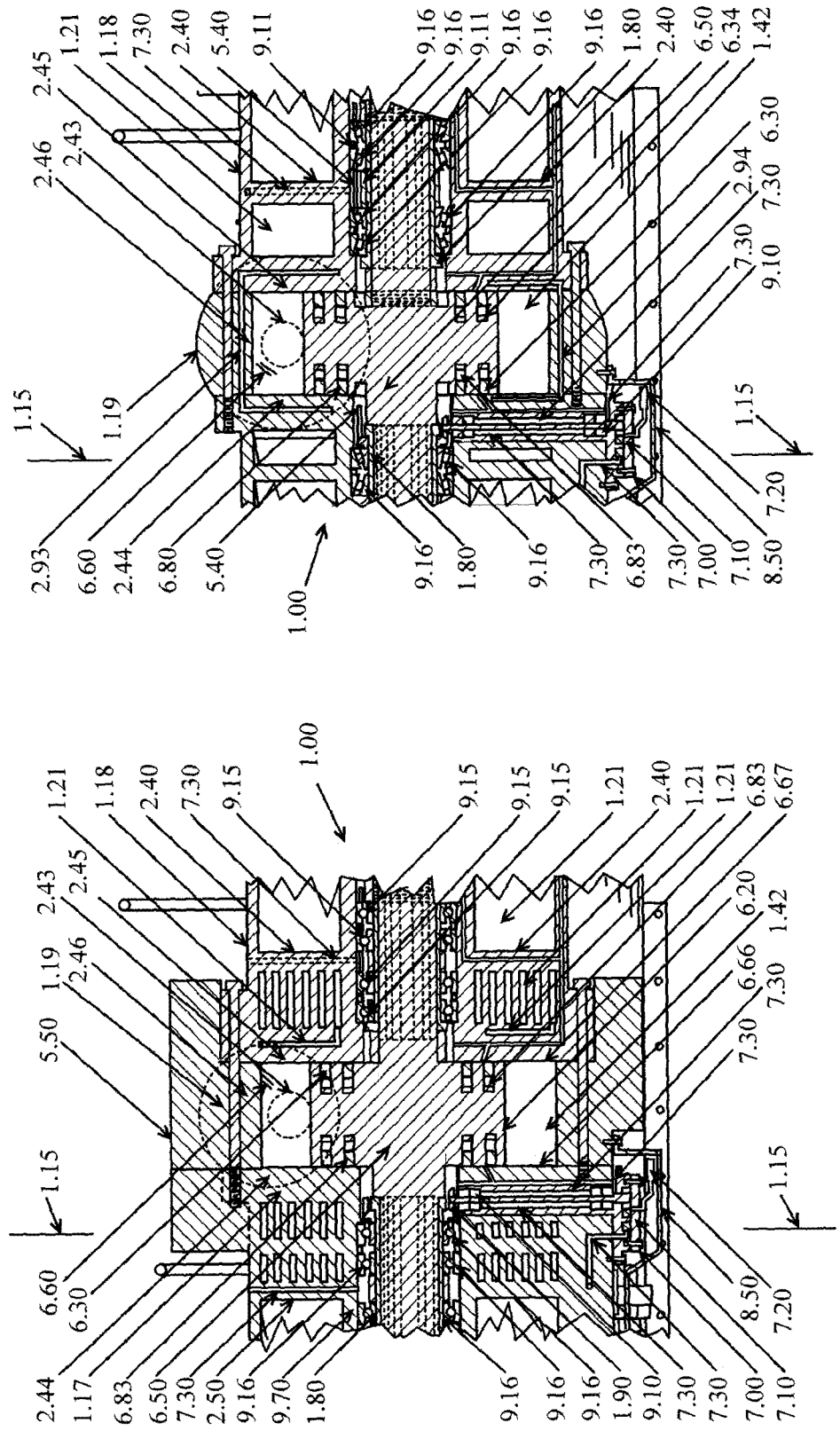

GAS-WIND TURBINE ENGINE

This application is a national phase filing of PCT/CA2020/000047 and claims foreign priority benefits from Canadian Patent Application 3,048,823 filed Jul. 8, 2019.

FIELD OF THE INVENTION

The present invention relates to an engine referred to as a gas-wind turbine engine.

DESCRIPTION OF THE PRIOR ART

The present invention gas-wind turbine engine is considered to be an improvement to an engine described in U.S. Pat. No. 2,608,058 awarded to L. J. Geeraert, an improvement to an engine in U.S. Pat. No. 4,807,440 awarded to Ahmed Salem, and an improvement to an engine disclosed in U.S. Pat. No. 6,298,821 B1 awarded to Alexander Alexandrovich Bolonkin, the three prior art United States patents indicated above does not mention a large fan air flow or usable air flow from a fan housing assembly and the fan assembly for cooling the turbine rotor blades so the above mentioned prior art engines when manufactured without proper cooling the rotor blades may result to an engine failure in a long period of engine operation. The present invention gas-wind turbine engine further is an improvement to the prior art jet turbine engine because the prior art jet turbine engine does not utilize air or wind directly from a fan for cooling the turbine rotor and for cooling the turbine rotor blades of the prior art engine. The prior art engines further was not disclosed having a wind or usable air flow or large fan air flow from a fan for giving additional push for rotation to the turbine rotor which gives more force to rotate the engine turbine rotor shaft. The prior art gas turbine engines does not include a wind turbine but in one the present invention engine configuration includes a wind turbine assembly.

SUMMARY OF THE INVENTION

The prior art turbine engine for: jet propelled aircraft, flying machine with turbine engine, land vehicle, water vehicle, amphibious vehicle, power shaft turbine, jetpack, auxiliary power unit, and engine for other electric generating systems are a lot more complicated or has more moving parts and therefore the prior art engine cost a lot more and bound to have more problems related to the numerous moving parts and the prior art turbine engine additionally is somewhat problematic since the rotor blades are exposed constantly to hot exhaust gases during operation of the prior art turbine engine which requires a complicated and energy wasting cooling system, requires expensive materials, and requires frequent maintenance of said prior art turbine engine which likely increase the prior art turbine engine maintenance cost.

I have found that the disadvantages of the prior art engine maybe overcome by disclosing a simple present invention engine which we can call a gas-wind turbine engine, said gas-wind turbine engine has comparatively have less parts than the prior art turbine engine which makes the gas-wind turbine engine cheaper to produce and does not require very expensive materials or expensive parts since the gas-wind turbine engine blades of the gas-wind turbine engine rotor is not always exposed to hot exhaust gases during the gas-wind turbine engine operation because in the present invention gas-wind turbine engine design, the gas-wind turbine engine rotor blades are heated during power stage and along the cycle of engine operation during cooling stage said gas-wind turbine engine rotor blades are cooled by fast moving air from the fan when said large fan air flow or usable air flow goes through a gap at the first wall and a gap at second wall of the gas-wind turbine engine rotor housing to cool the blades and the process of cooling the gas-wind turbine engine rotor blades generates additional power for the present invention gas-wind turbine engine since the gas-wind turbine engine in the present invention the air flow or the fast moving wind generated by the fan and generated by the fan related parts also pushes the gas-wind turbine engine rotor blades which gives additional force to the gas-wind turbine engine rotor of a gas-wind turbine engine to rotate. The gas-wind turbine engine having at least one combustor where the exhaust gas flow is generated, the exhaust gas flow is directed to the gas-wind turbine engine rotor blades and since said gas-wind turbine engine rotor blades are adjacent to the exhaust gas duct opening at some point during rotation of the gas-wind turbine engine rotor and since said gas-wind turbine engine rotor blades are between the walls of a gas-wind turbine engine rotor housing, the exhaust gas flow pushes the gas-wind turbine engine rotor blades and rotates the gas-wind turbine engine rotor and also rotates the gas-wind turbine engine main shaft of the gas-wind turbine engine in the generation of power, the pressure of the exhaust gas flow pushes the gas-wind turbine engine rotor blades and rotates the gas-wind turbine engine rotor and also rotates the attached gas-wind turbine engine main shaft is an operation which generates power to do work. The exhaust gas flow which pushes the blades of a gas-wind turbine engine rotor eventually be at the mixture flow duct. The present invention gas-wind turbine engine in other configuration includes an optional wind turbine assembly having a wind turbine rotor, said wind turbine rotor attached to the gas-wind turbine engine main shaft, said wind turbine is housed by the engine housing system and said wind turbine is rotated by exhaust gases and additionally rotated by the air flow from the fan and the fan housing assembly, the exhaust gas flow and the air flow going to the wind turbine are directed by the fourth guide vanes. Some of the fourth guide vanes maybe attached to the second wall of a gas-wind turbine engine housing so that the air flow for cooling would not be substantially altered by the exhaust gas flow. For the gas-wind turbine engine to work properly the air pressure generated by the engine fan in a torque generating engine are to be greater than the pressure of the mixture of usable air flow and exhaust gas flow at the mixture flow duct while in the thrust producing engine the air pressure generated by the large fan are to be greater than the pressure of the mixture of air and exhaust gas flow at the mixture flow duct, the pressure of the mixture of air and exhaust gas at the mixture flow duct could be reduced by making the mixture flow duct larger and also could be done by making the external housing smaller or making the large fan air flow duct smaller to increase the air pressure going into the gas-wind turbine engine rotor housing.

The present invention gas-wind turbine engine having either an air cooling system or having both an air cooling system and a liquid cooling system, said air cooling system is adapted for aviation purposes or adapted for other gas-wind turbine engine model since the gas-wind turbine engine with air cooling system likely be an engine with less weight but an air cooled and a liquid cooled gas-wind turbine engine likely adapted for power generating station or when the gas-wind turbine engine has to run in a relatively hot environment or when the liquid medium for cooling the gas-wind turbine engine is needed for heating purposes which likely a requirement in a land operating gas-wind turbine engine system or an amphibious vehicle with a gas-wind turbine engine system or a body of water operating vehicle with a gas-wind turbine engine system.

The gas-wind turbine engine is a simple rotary engine having a starting system which rotates the gas-wind turbine engine main shaft and activates the air compressing system and also rotates the gas-wind turbine engine fan, the air compressing system which includes a compressor fan is designed to deliver more air to the combustor, the compressed air goes along air duct or through other suitable means, the air compressing system supplies air for cooling the combustor and supplies air for the combustion of fuel and air mixture in the combustor, and when the fuel and air mixture is ignited the gas pressure in the combustor increases and the pressure at the exhaust gas duct also increases which also increases the pressure at the area where the gas-wind turbine engine rotor is located so that the gas pressure pushes the gas-wind turbine engine rotor blades and rotates the gas-wind turbine engine rotor and also rotates the gas-wind turbine engine main shaft which creates torque for the present invention engine, the rotation of the gas-wind turbine engine main shaft also rotates the gas-wind turbine engine fan so that the fan generates an air pressure for engine usage and additionally said air pressure from the fan helps to rotate the gas-wind turbine engine rotor and in the process cools the gas-wind turbine engine rotor and cools other parts of the gas-wind turbine engine.

In the present invention the gas-wind turbine engine may just have a single shaft or several shaft which is referred to as a power shaft means but in the present invention specification refers to a gas-wind turbine engine main shaft since said gas-wind turbine engine main shaft is attached to the gas-wind turbine engine rotor, the specification refers to engine fan shaft since the engine fan shaft is attached to an engine fan and the specification refers to a large fan shaft because it is attached to the large fan although the gas-wind turbine engine in the present invention may just have a single shaft. The air compressing system as shown in the present invention could be substituted with another air compressing system. Changing the air compressing system or changing other features of the present invention engine does not invalidate the claims of the present invention. Replacing the bearing with bearings of different configuration does not invalidate the claims of the present invention. Relocating other parts or replacing some parts with different configuration or omitting some parts of the present invention engine does not make the claims of the present invention as claimed to be invalid. The patent specification contains information which could be used for: guide in the proper construction of the gas-wind turbine engine, partial or full information about building the gas-wind turbine engine, and new information as a proof of novelty, utility, and discloses new ways of machine operation of an engine. The information disclosed herein explains and shows one or more to adapt partly or fully on how to make the gas-wind turbine engine.

NUMERICAL REPRESENTATION OF THE GAS-WIND TURBINE ENGINE PARTS IN RELATION TO THE DRAWINGS AND SKETCHES

Gas-wind turbine engine—1.00, First rotation axis—1.10, First plane—1.11, Second plane—1.12, Fourth plane—1.14, Fifth plane—1.15, Sixth plane—1.16, Engine first housing—1.17, Engine second housing—1.18, Engine third housing—1.19, Usable air flow—1.20, Air passages—1.21, Air pipe assemblies—1.25, Air hose assemblies—1.27, Air convergence zone—1.29, Shaft play sensor—1.30, First part—1.31, Second part—1.32, Turbo air space—1.40, First space—1.41, Second space—1.42, Third space—1.43, Air gap—1.44, Belt—1.52, Bracket—1.54, Radial arc—1.70, Insert—1.80, Gear—1.90, External housing—2.00, Engine fan housing—2.11, Engine fan—2.12, Engine fan shroud—2.13, Engine fan shaft—2.14, Engine fan hub—2.15, Engine fan blades—2.18, Air pressure sensor—2.19, Core shell—2.20, Fourth guide vane section 2.21, Fourth line 2.22, Fourth leading edge 2.23, Fourth trailing edge 2.24, Fourth angle 2.25, Fourth root—2.26, Fourth segment—2.27, Gas-wind turbine engine rotor housing—2.30, Fourth guide vanes—2.40, Wall—2.41, Housing gaps—2.42, Exhaust gas duct opening—2.43, First wall—2.44, Second wall—2.45, Third wall—2.46, First guide vane—2.50, First guide vane section—2.51, First line—2.52, First leading edge—2.53, First trailing edge—2.54, First angle—2.55, First root—2.56, First segment—2.57, Engine cowling—2.70, Heat radiator—2.90, Coolant hose assemblies—2.91, Liquid cooling pump—2.92, Liquid cooling passageways—2.93, Liquid cooling spaces—2.94, Coolant pipe assemblies—2.95, Internal air compressing system—3.00, Internal air compressing system fan—3.10, Internal air compressing system fan hub—3.11, Internal air compressing system fan blades—3.12, Internal air compressing system fan housing—3.20, Internal air compressing system shaft—3.21, Internal air compressing system shroud—3.22, Internal air compressing system first stationary vanes assembly—3.23, Internal air compressing system second stationary vanes assembly—3.24, Internal air compressing system shaft mounted vanes assembly—3.25, Slip joint—3.30, Small groove—3.40, Compressed air receiving means—3.50, Starting air tube—3.55, Auxiliary air compressor—3.60, Auxiliary air compressor first housing—3.61, Auxiliary air compressor guide vanes—3.62, Auxiliary air compressor fan—3.63, Auxiliary air compressor fan shroud 3.64, Auxiliary air compressor first stationary vanes assembly—3.65, Auxiliary air compressor second stationary vanes assembly—3.66, Auxiliary air compressor shaft mounted vanes assembly—3.67, Auxiliary air compressor shaft—3.68, Auxiliary air compressor second housing—3.69, Air filtering system—3.71, Air filtering element—3.72, Air filtering element housing—3.73, Booster air compressor—3.80, Dust cover—3.81, Booster air compressor first stationary vanes assembly—3.85, Booster air compressor second stationary vanes assembly—3.86, Booster air compressor shaft mounted vanes assembly—3.87, Booster air compressor first housing 3.88, Booster air compressor second housing 3.89, Booster air compressor shaft—3.90, Combustor—4.00, Combustor housing—4.10, Combustion chamber—4.11, Swirl vanes—4.12, Liner—4.13, Corrugated joint—4.15, Small through spaces—4.16, Combustor seal—4.17, Exhaust gas duct—4.20, Exhaust gas duct housing—4.25, Fuel delivery means—4.30, Fuel tank—4.40, Fuel pump—4.45, Fuel line assemblies—4.47, Fuel and air mixture ignition means—4.50, Exhaust gas flow—4.70, Idler pulley—4.81, First pulley—4.82, Belt tension maintaining system—4.83, Turbo guide vanes—4.90, Large fan—5.00, Large fan housing—5.02, Large fan shroud—5.03, Large fan shaft—5.04, Large fan hub—5.05, Large fan blades—5.06, Large fan cone—5.07, Air duct—5.15, Large fan air flow—5.20, Main frame—5.30, Housing oil bypass—5.40, Fins—5.50, Bearing retainer—5.55, Tab lock—5.56, Key—5.60, O-ring—5.65, Hydraulic pump—5.70, Pylon—5.80, Structural guide vanes—5.90, Clamp—6.00, Gas-wind turbine engine rotor—6.10, Gas-wind turbine engine rotor hub—6.20, Oil ring hub groove—6.26, Oil ring radial oil channel—6.27, Oil ring hub groove inner periphery—6.29, Exhaust gas pressure ring—6.30, Exhaust gas pressure ring radial oil channel center—6.31, Exhaust gas pressure ring inner periphery—6.32, Exhaust gas pressure ring radial oil channel—6.33, Exhaust gas pressure ring spring —6.34, Exhaust gas pressure ring extension—6.35, Exhaust gas pressure ring heat expansion gap—6.36, Exhaust gas pressure ring spring extension—6.37, Exhaust gas pressure ring outer periphery—6.38, Exhaust gas pressure ring spring pusher leg—6.39, Exhaust gas pressure ring hub groove—6.40, Exhaust gas pressure ring hub groove inner periphery—6.45, Exhaust gas pressure ring radial center—6.48, Gas-wind turbine engine main shaft—6.50, Gas-wind turbine engine rotor blades—6.60, Second section—6.61, Second line—6.63, Second root—6.64, Second tip—6.65, Second leading edge—6.66, Second trailing edge—6.67, Second angle—6.69, Oil line assemblies—6.70, Oil ring radial oil channel center—6.75, Oil ring radial center—6.77, Oil ring—6.80, Coil spring—6.81, Oil seal—6.82, Oil ring spring—6.83, Oil ring extension—6.84, Oil ring outer periphery—6.85, Oil ring heat expansion gap—6.86, Oil ring inner periphery—6.87, Oil ring spring extension—6.88, Oil ring spring pusher leg—6.89, Compressed air space—6.90, Oil hose assemblies—6.95, Oil pump assembly—7.00, Oil pump—7.10, Strainer—7.20, Oil duct—7.30, Alternator—7.40, Electric generator—7.50, Support—7.55, Starter—7.60, Air conditioning system compressor—7.70, Flywheel housing—7.80, Flywheel—7.90, Transmission—8.00, Wind turbine rotor—8.10, Wind turbine rotor hub—8.20, Wind turbine rotor blades—8.30, Sixth section—8.31, Sixth leading edge—8.32, Sixth trailing edge—8.33, Sixth line—8.34, Sixth angle—8.35, Sixth root—8.36, Sixth tip 8.37, Oil containment unit—8.50, Through hole—8.60, First electric motor—8.80, Second electric motor 8.90, Bearing means assembly—9.00, Bearings—9.10, Spacers—9.11, Ball bearings—9.15, Tapered roller bearings—9.16, Cylindrical roller bearings—9.17, Mixture flow duct—9.20, Exhaust gas manifold—9.25, Fasteners—9.30, Large fan air flow duct—9.50, Journal bearing—9.60, Bearing means assembly housing—9.70, First cooling fan—9.80, Second cooling fan—9.90, First location—111, Second location—222, First end—666, Side elevation—777, Second end—888, Third location—999, First guide vane length—100, Gas-wind turbine engine rotor blade length—200, Fourth guide vanes length—400, Wind turbine rotor blade length—600.

DESCRIPTION OF THE DRAWINGS AND SPECIFICATION OF THE INVENTION

FIG. 25 shows section 9-9' in FIG. 6 of a typical auxiliary air compressor.

FIG. 26 illustrates the section 10-10' in FIG. 6 of a typical booster air compressor.

FIG. 33 shows a sketch of the exhaust duct housing attached to the third wall of the gas-wind turbine engine rotor housing and the gas-wind turbine engine rotor housing composed of an engine first housing having a first wall, an engine second housing having a second wall, and an engine third housing having a third wall.

FIG. 34 shows a sketch of the exhaust duct housing attached to the third wall of the gas-wind turbine engine rotor housing and first part of a gas-wind turbine engine rotor housing includes a first wall and a third wall and the second part of a gas-wind turbine engine rotor housing includes a second wall.

FIG. 35 shows a sketch of the exhaust duct housing attached to the first wall of the gas-wind turbine engine rotor housing and the first part of a gas-wind turbine engine rotor housing having a first wall and having a third wall while portion of gas-wind turbine engine rotor housing includes a second wall.

FIG. 36 shows a sketch of the exhaust duct housing attached to the second wall of the gas-wind turbine engine rotor housing and the first part of a gas-wind turbine engine rotor housing having a first wall and the second part of a gas-wind turbine engine rotor housing having a second wall and having a third wall.

FIG. 37 shows a sketch of the exhaust duct housing attached to the third wall of the gas-wind engine rotor housing and attached to the second wall of the gas-wind turbine engine rotor housing and the first part of a gas-wind turbine engine rotor housing having a first wall and the second part of a gas-wind turbine engine rotor housing having a second wall and having a third wall.

FIG. 38 shows a sketch of the exhaust duct housing is attached to the first wall of the gas-wind turbine engine rotor housing and attached to the third wall of the gas-wind turbine engine rotor housing and first part of a gas-wind turbine engine rotor housing having a first wall and a having a third wall while the second part having a second wall.

FIG. 49 is a schematic diagram of the present invention typical compressed air flow with internal air compressing system.

FIG. 50 is a schematic diagram of another present invention typical compressed air flow in an internal air compressing system similar to a jet engine.

FIG. 51 is a schematic diagram of the present invention typical oil flow.

FIG. 52 is a schematic diagram of the present invention typical fuel flow.

FIG. 53 is a schematic diagram of another present invention typical compressed air flow of an external air compression system.

FIG. 54 is a schematic diagram of the present invention typical compressed air flow having an auxiliary air compressor and a booster air compressor.

FIG. 55 is a schematic diagram of the present invention typical liquid cooling flow.

FIG. 56 shows a schematic diagram of an air bleeding system from an auxiliary air compressor or an internal air compressing system to the air passages at the second wall of the gas-wind turbine engine rotor housing.

FIG. 57 shows a schematic diagram of an air bleeding system from a booster air compressor to the air passages at the second wall of the gas-wind turbine engine rotor housing.

FIG. 64 shows is a schematic diagram of the present invention engine having three main housing which includes: first housing with a first wall, second housing with a second wall, and third housing with a third wall in an air cooled present invention engine and showing the bearing used are ball bearings.

FIG. 65 is a schematic diagram of the present invention engine having three main housing which includes: engine first housing with a first wall, and engine second housing having a second wall, and third housing having a third wall in a liquid cooled present invention engine and showing the bearings used are tapered roller bearings.

Figure 1:
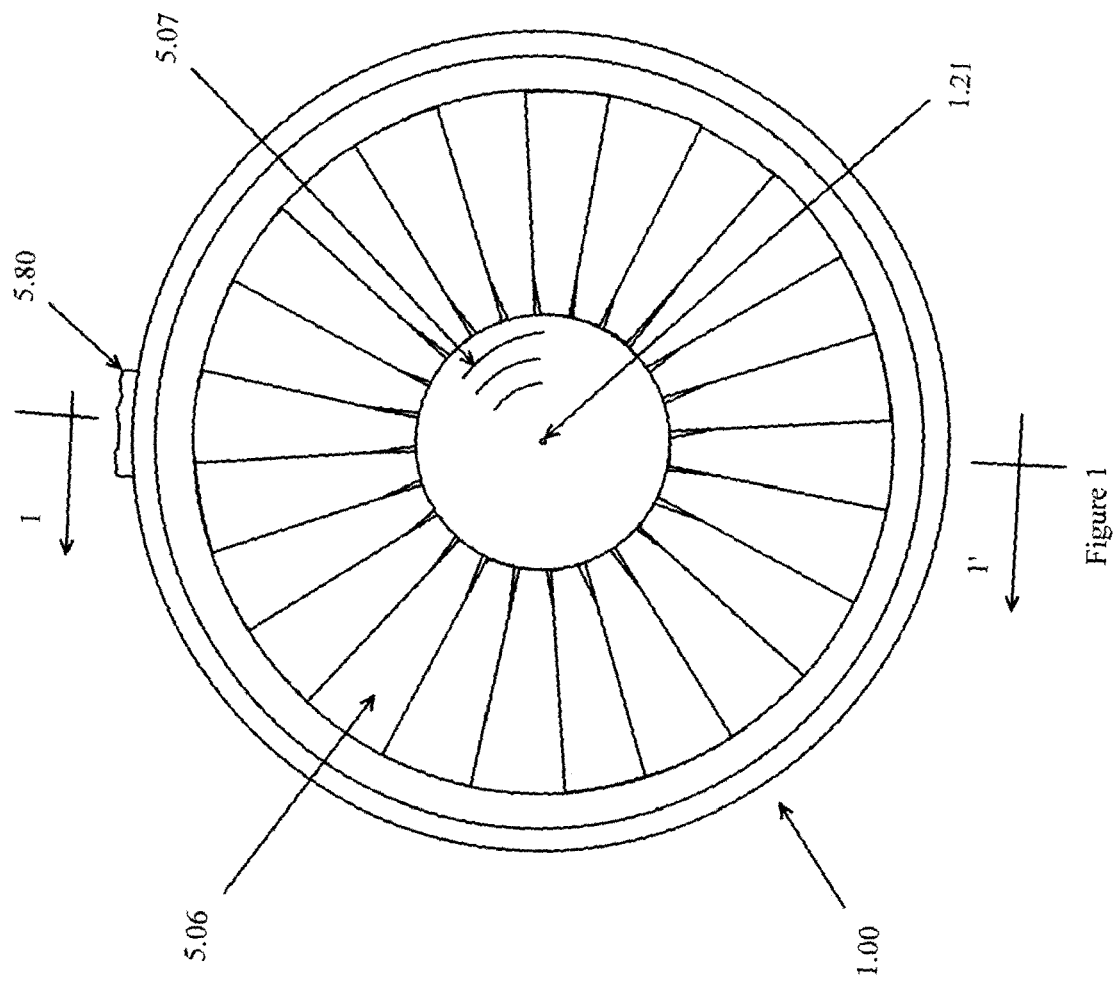
FIG. 1 illustrates the first end view of the gas-wind turbine engine having an air cooled system and adapted to generate thrust.
Figure 2:
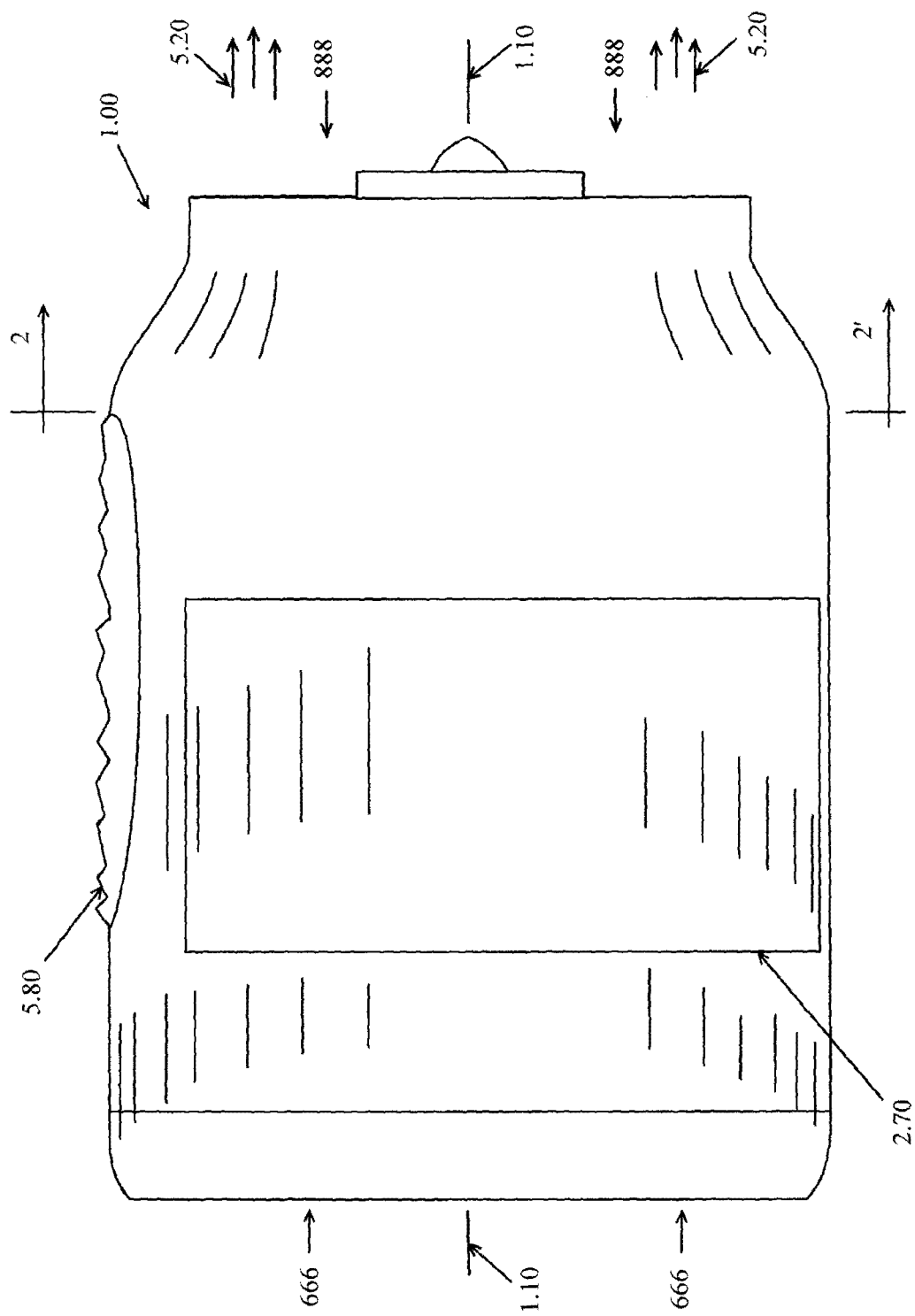
FIG. 2 illustrates the side elevation view of the gas-wind turbine engine shown in FIG. 1.
Figure 3:
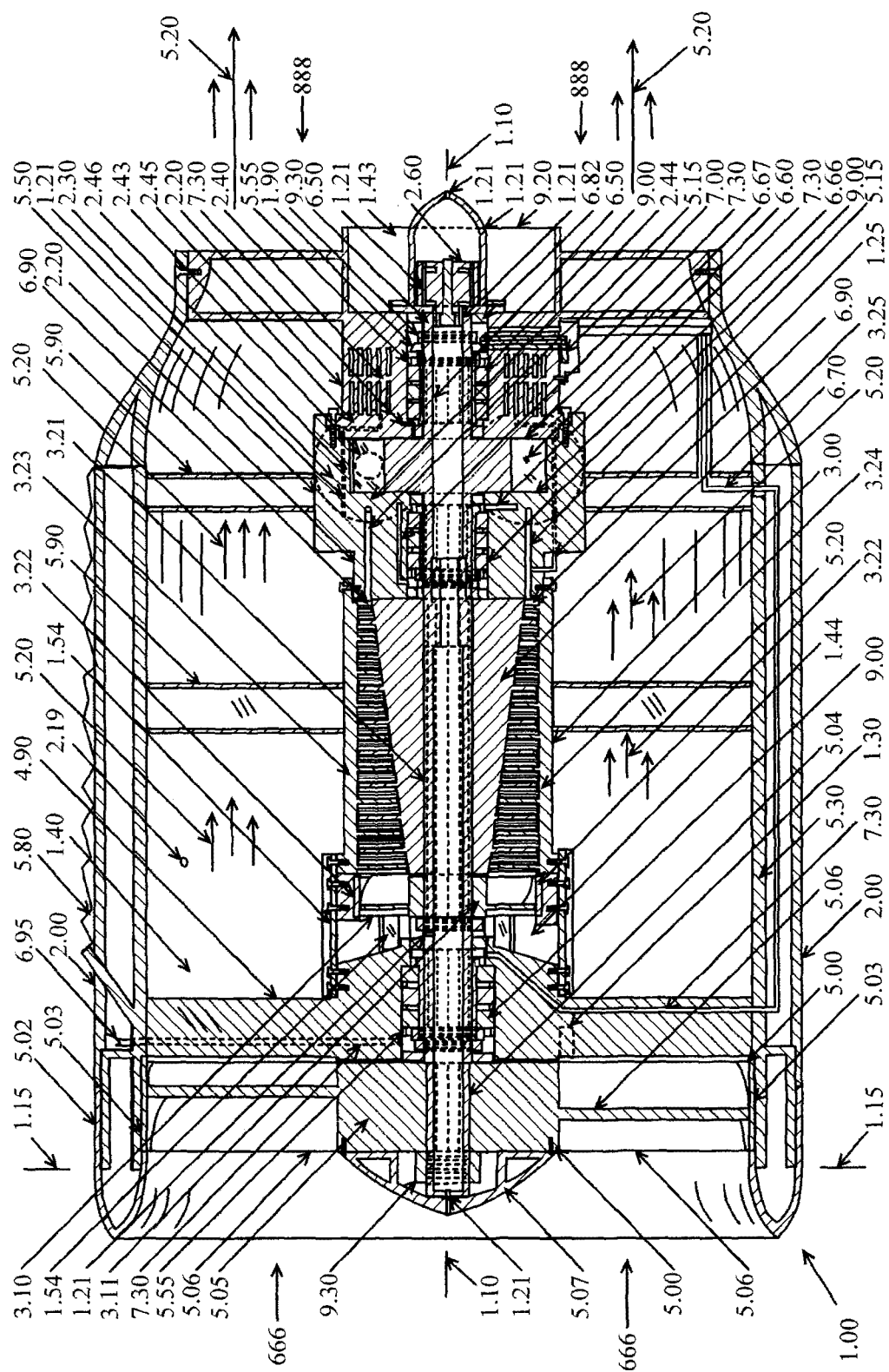
FIG. 3 illustrates the section 1-1' of the gas-wind turbine engine shown in FIG. 1 and showing an internal air compressing system.
Figure 4:
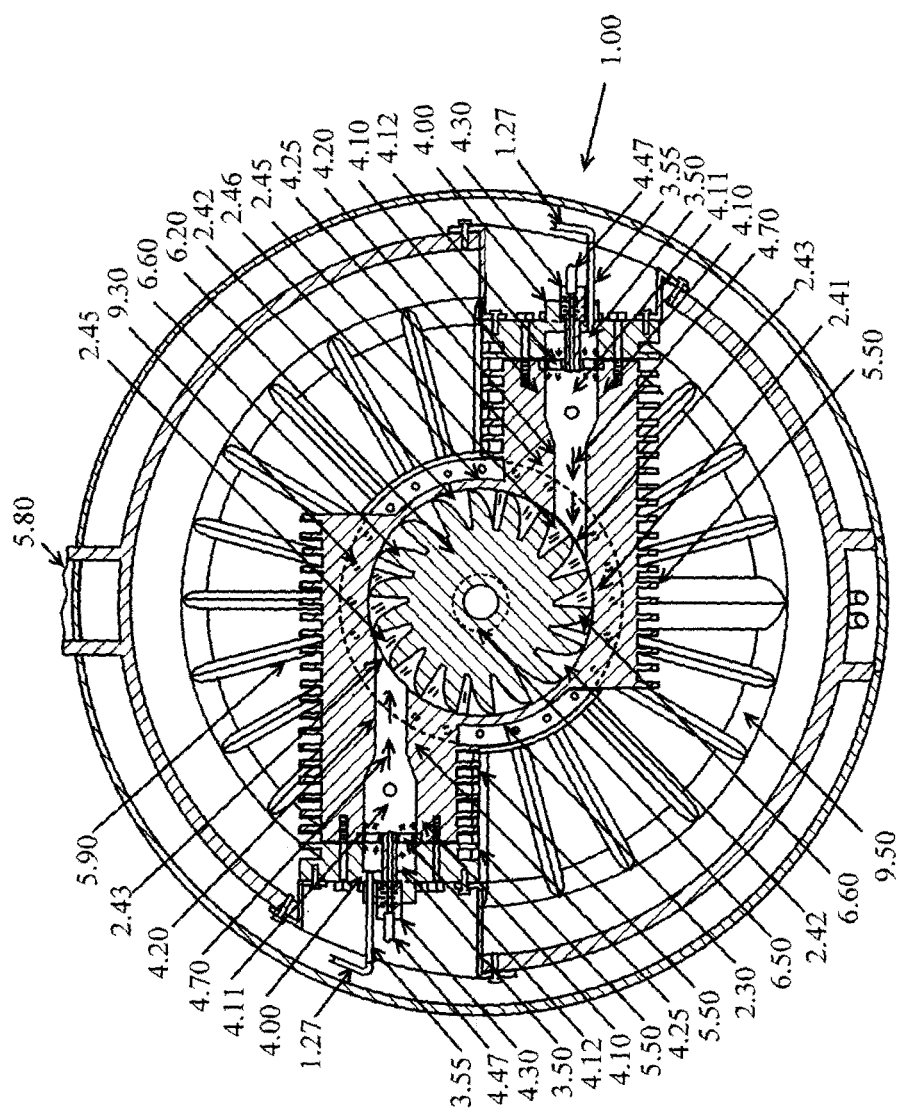
FIG. 4 shows the section 2-2' of FIG. 2.
Figure 5:
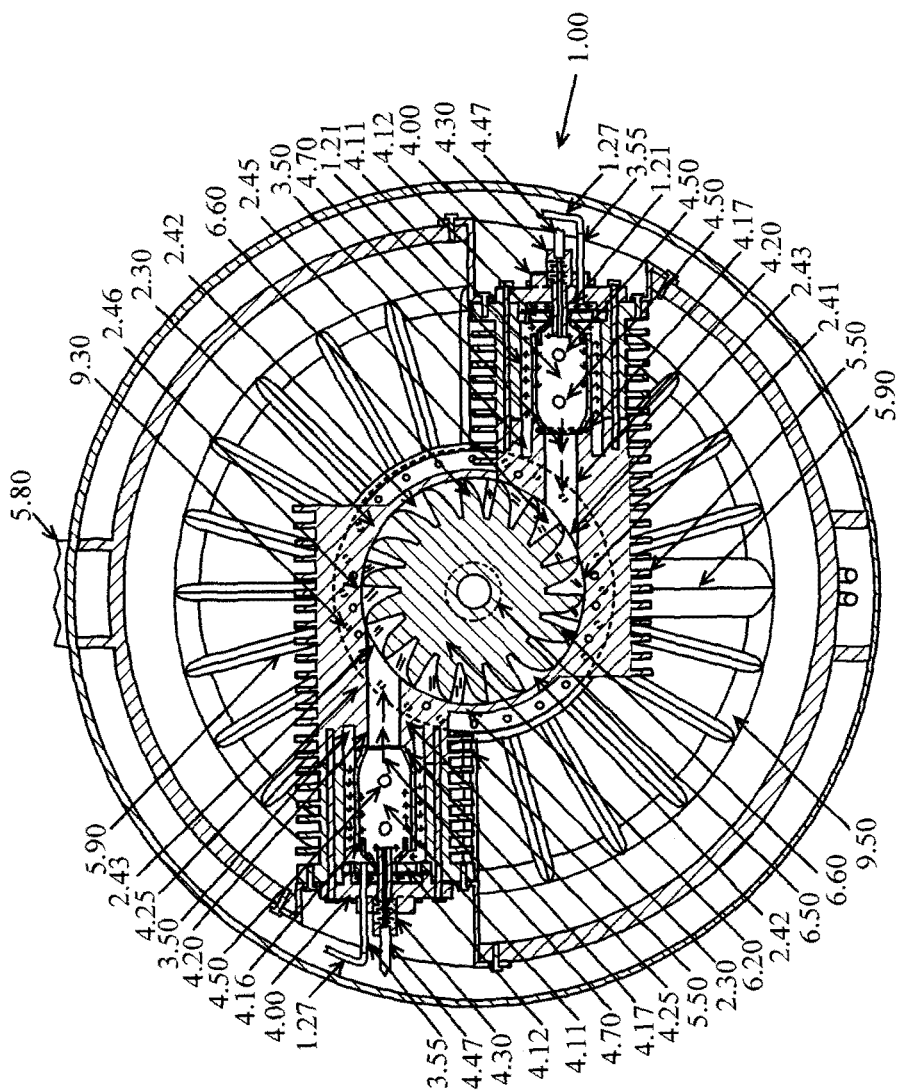
FIG. 5 illustrates an alternate section 2-2' of the gas-wind turbine engine shown in FIG. 2.
Figure 32:
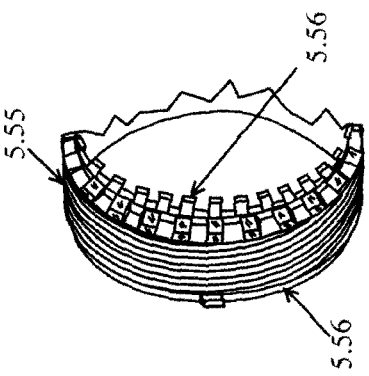
FIG. 32 shows a known bearing retainer with tab lock.
Figure 29:
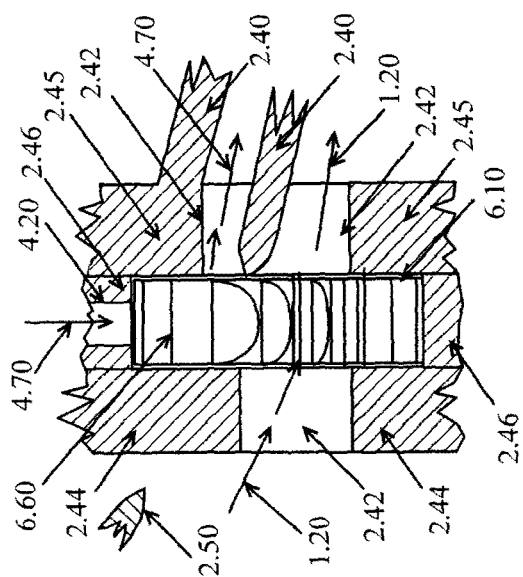
FIG. 29 shows a sketch of a first guide vane, walls, housing gaps, fourth guide vanes, and gas-wind turbine engine rotor of the present invention gas-wind turbine engine.
Figure 31:
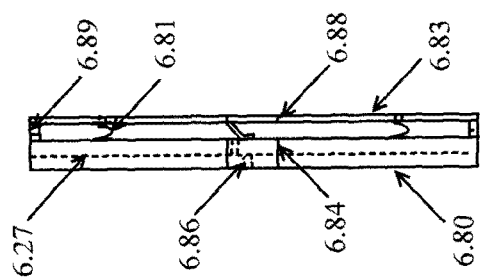
FIG. 31 illustrates an enlarged drawing as seen on second location 222 view in FIG. 30 for clarity of a typical oil ring and typical oil ring spring of the present invention engine designed to generate torque where the gas-wind turbine engine rotor hub is not shown to show more details of the oil ring and oil ring spring.
Figure 30:
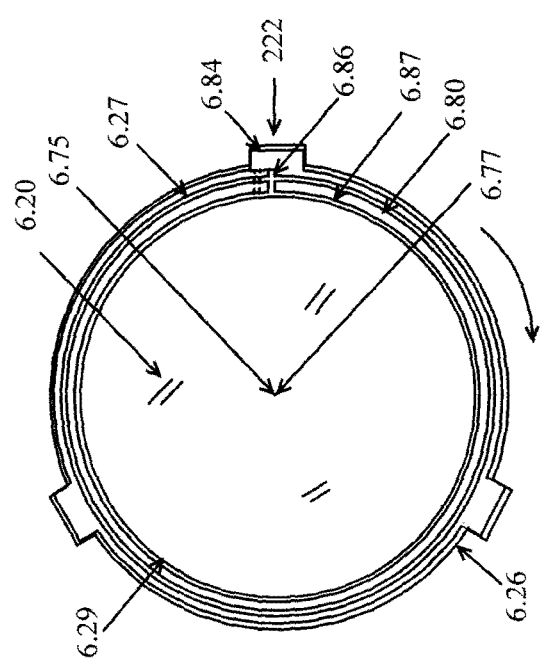
FIG. 30 illustrates an enlarged drawing for clarity of a typical oil ring of the present invention engine designed to generate torque.
Figure 39:
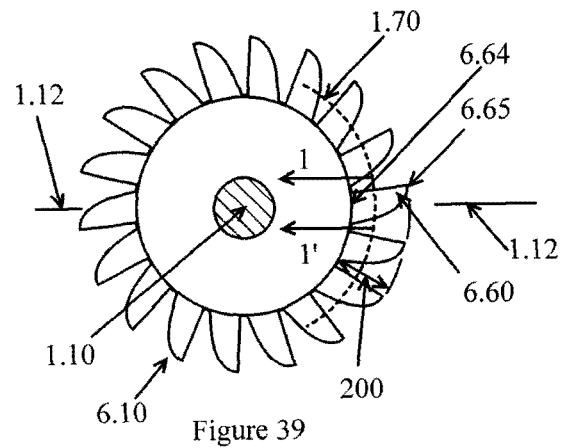
FIG. 39 shows a view of the gas-wind turbine engine rotor.
Figure 40:
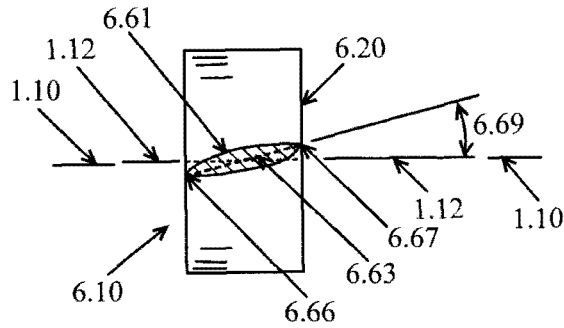
FIG. 40 shows a section as seen along line 1-1' in FIG. 39 of a gas-wind turbine engine rotor blade when cut by a radial arc.
Figure 41:
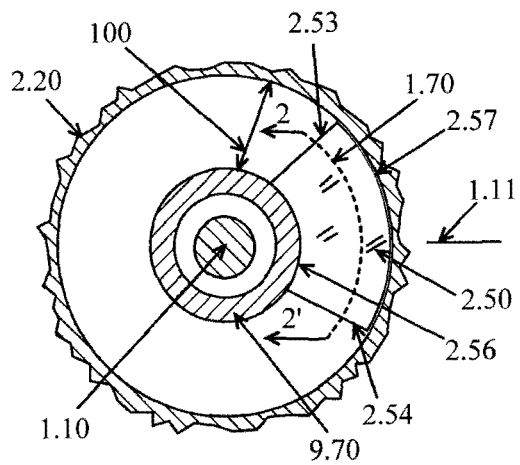
FIG. 41 shows an illustration of a first guide vane.
Figure 42:
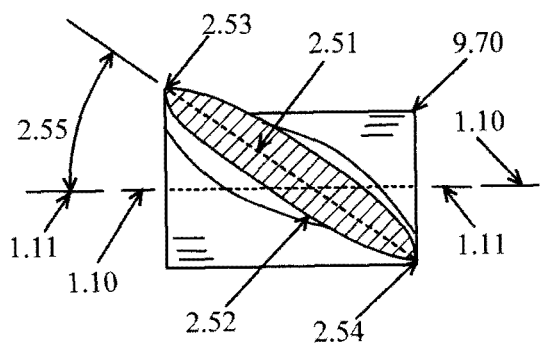
FIG. 42 shows the section of a first guide vane along line 2-2' in FIG. 41 when cut by a radial arc.
Figure 43:
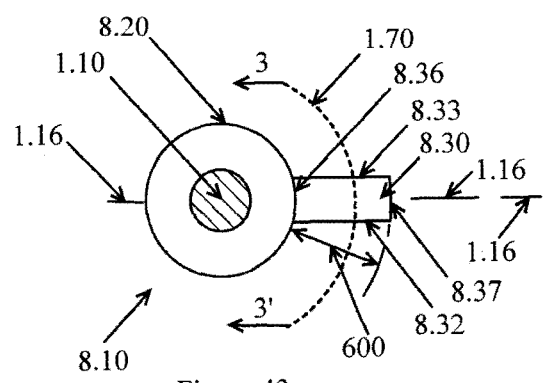
FIG. 43 shows a wind turbine rotor blade cut by a radial arc.
Figure 44:
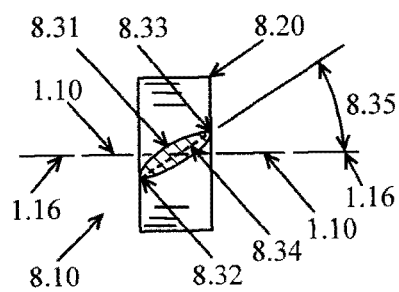
FIG. 44 shows the section along line 3-3' in FIG. 43 of the wind turbine rotor blade cut by the radial arc.
Figure 45:
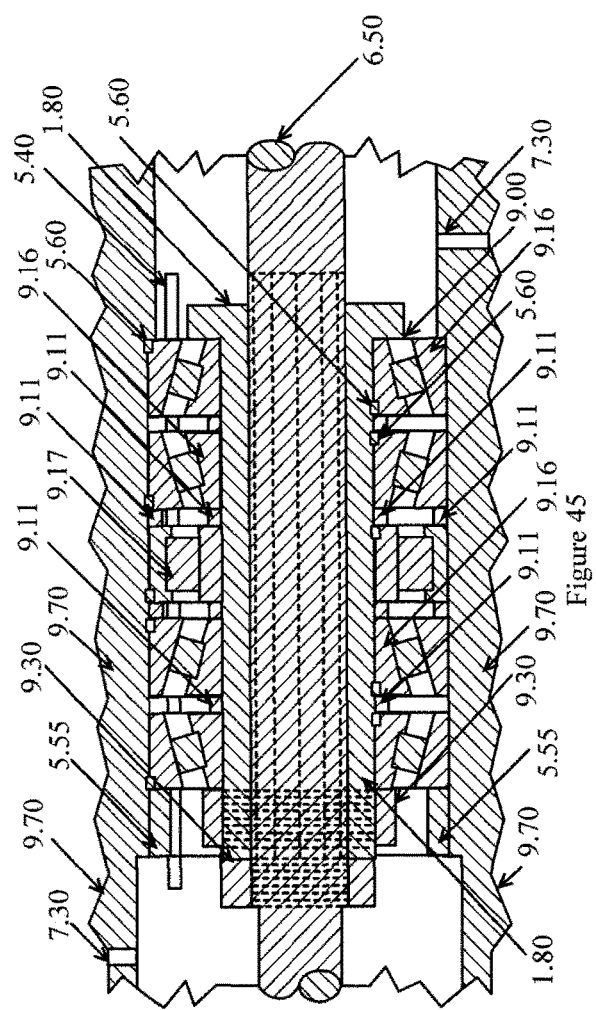
FIG. 45 shows another present invention configuration of a bearing means assembly with a cylindrical roller bearing, insert, and tapered roller bearings which could be used for the present invention gas-wind turbine engine.
Figure 46:
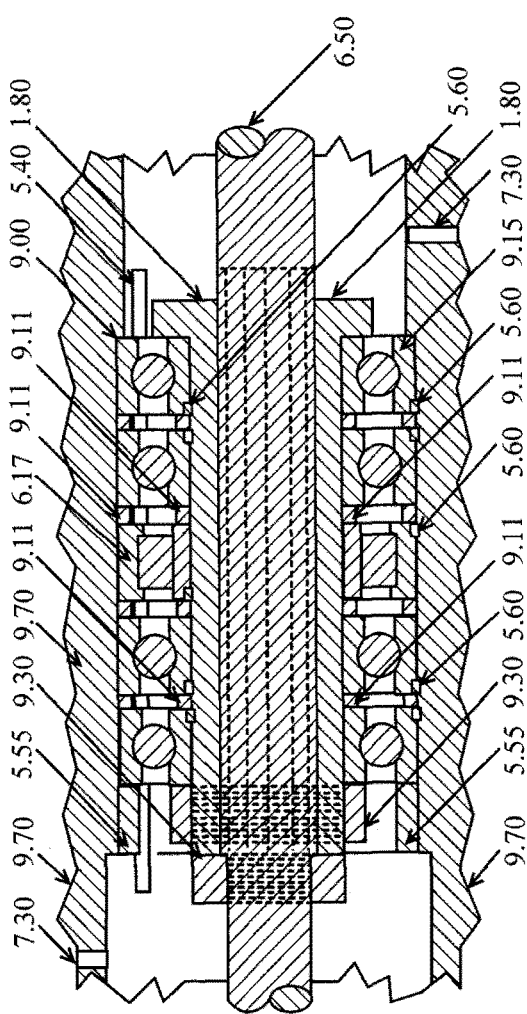
FIG. 46 shows another present invention configuration of a bearing means assembly with ball bearings, insert, and a cylindrical roller bearing which could be used for the present invention gas-wind turbine engine.
Figure 47:
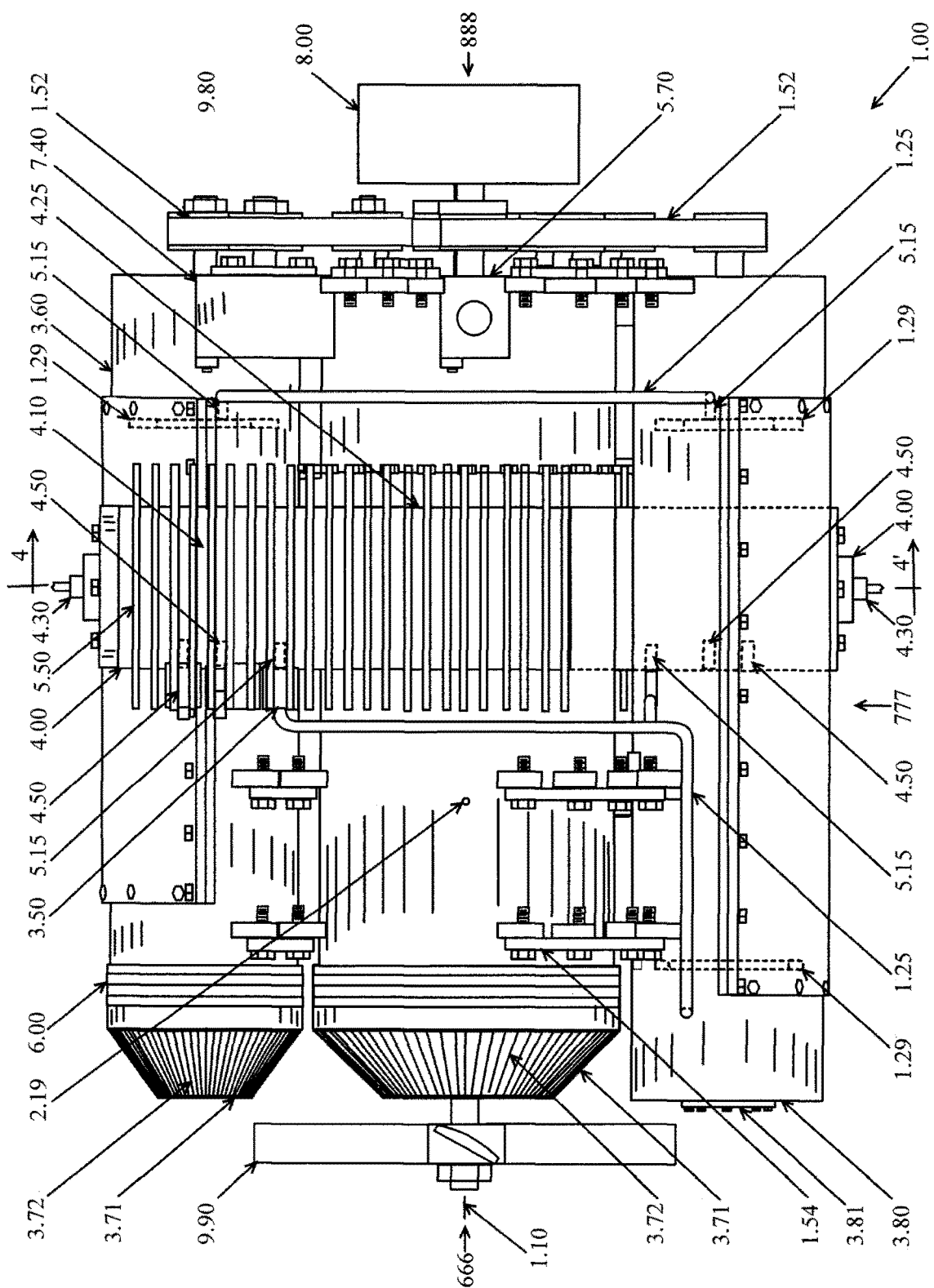
FIG. 47 shows the transmission and a second cooling fan in an air cooled gas-wind turbine engine.
Figure 48:
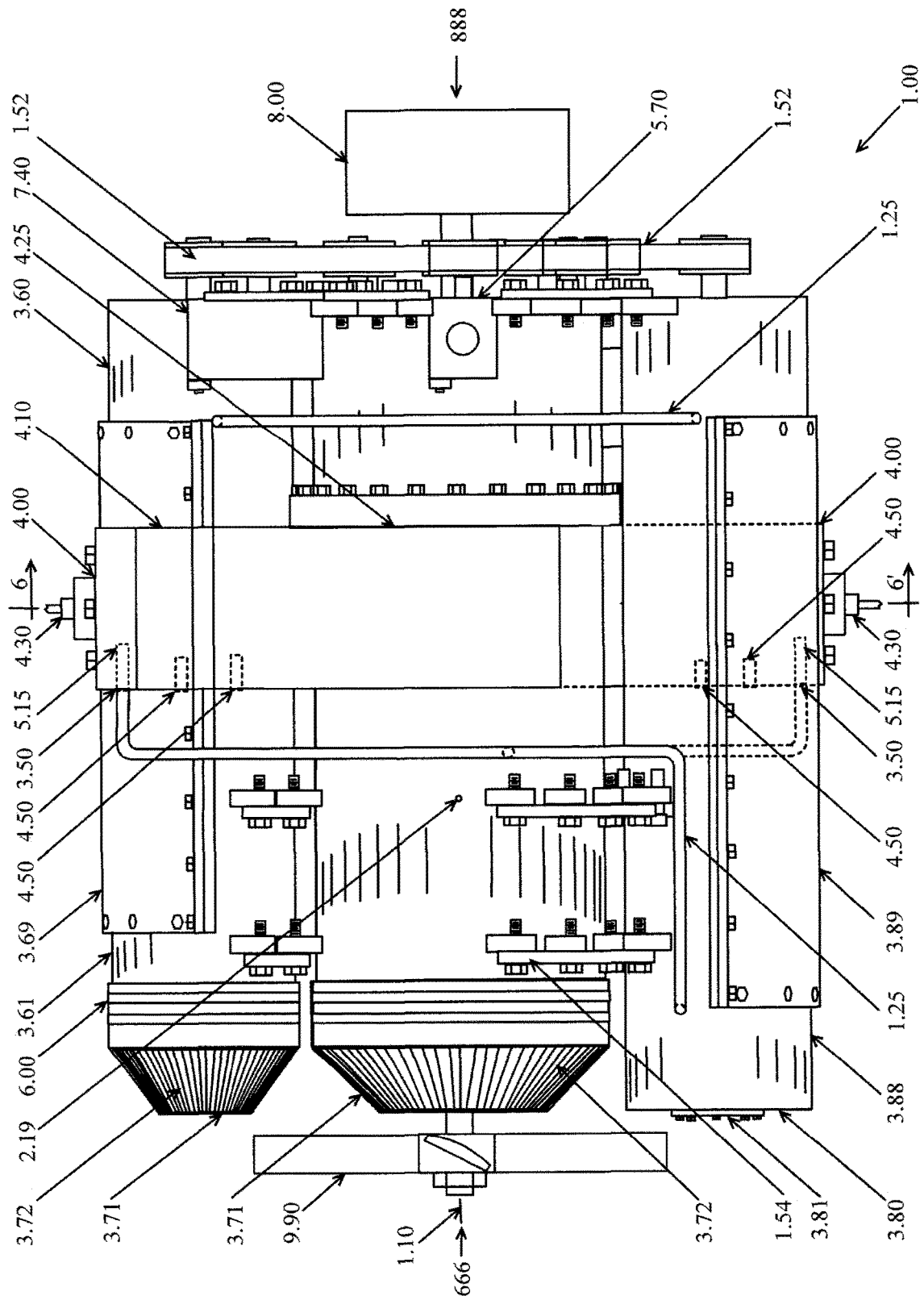
FIG. 48 shows the gas-wind turbine engine having both an air cooled and liquid cooled which includes a transmission and a second cooling fan.
Figure 58:
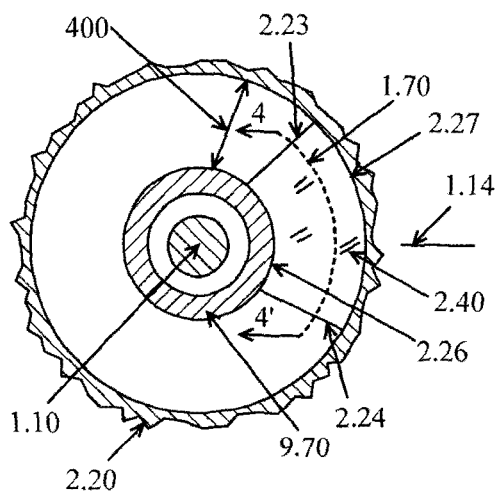
FIG. 58 shows an illustration of a fourth guide vane.
Figure 59:
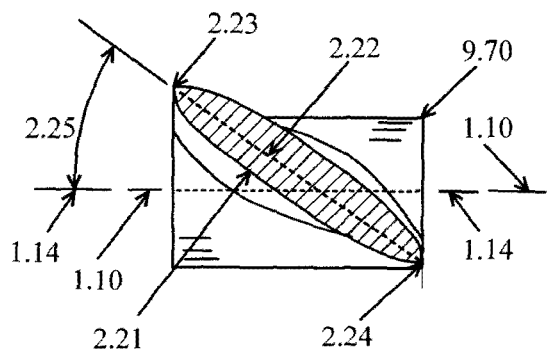
FIG. 59 shows the section of a fourth guide vane along line 4-4" in FIG. 58 when cut by a radial arc.
Figure 60:
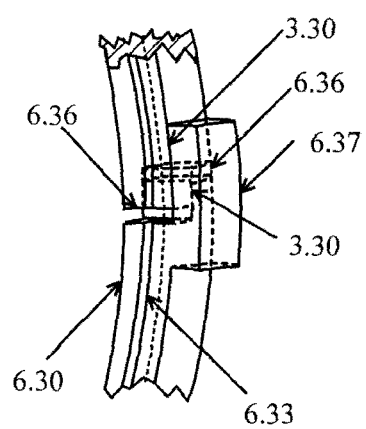
FIG. 60 shows a detailed and enlarged sketch of the expansion gap of the present invention exhaust gas pressure ring.
Figure 61:
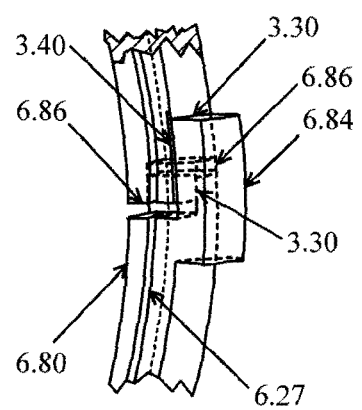
FIG. 61 shows a detailed and enlarged sketch of the expansion gap of the present invention oil ring.
Figure 62:
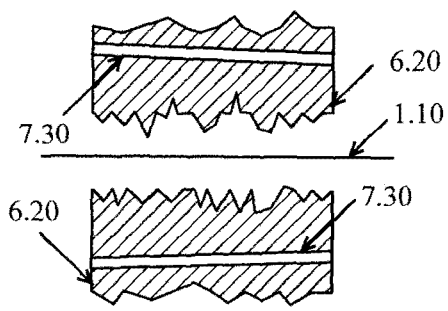
FIG. 62 shows an illustration or sketch of an optional oil duct located adjacent to the gas-wind turbine engine main shaft at the gas-wind turbine engine rotor hub which is non-parallel to the rotation axis of the gas-wind turbine engine rotor shaft so that the oil circulates for more efficient cooling of the gas-wind turbine engine rotor.
Figure 63:
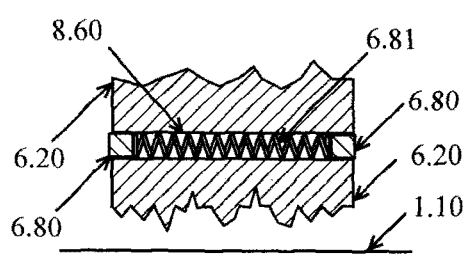
FIG. 63 shows an illustration or sketch of an alternate coil spring for the oil rings.

With reference to the FIG. 1, FIG. 2, FIG. 3, FIG. 4, and FIG. 5 and any of the applicable drawing from FIG. 29 to FIG. 65 inclusive are used for cross reference shows the first disclosure of the gas-wind turbine engine is stated in specification number 1 to specification number 3 inclusive are as follows:

1. A gas-wind turbine engine 1.00 having an air cooling system, said gas-wind turbine engine 1.00 comprising: an engine housing system, an air pressure sensor 2.19, a shaft play sensor 1.30, structural guide vanes 5.90, a large fan assembly having a large fan 5.00, an internal air compressing system 3.00 or a plurality of internal air compressing system 3.00, at least one combustor 4.00 having a combustor housing 4.10, at least one compressed air delivery system, at least one compressed air receiving means 3.50, at least one fuel system, an electrical system having at least one fuel and air mixture ignition system with at least one fuel and air mixture ignition means 4.50, at least one exhaust gas duct housing 4.25, at least one gas-wind turbine engine rotor assembly, a lubricating system, a power shaft means, gas-wind turbine engine accessories, a plurality of bearing means assembly 9.00, a plurality of known exhaust gas pressure sealing means, a plurality of known oil sealing means, fins 5.50, gears 1.90, a large fan cone 5.07, fastening system with fasteners 9.30, air pipe assemblies 1.25, air hose assemblies 1.27, gas-wind turbine engine various parts, and a drive system or a plurality of drive system for operating said gas-wind turbine engine various parts, said gas-wind turbine engine various parts includes one or more of the following: a large fan 5.00, an air pressure sensor 2.19, a shaft play sensor 1.30, a known starting system which is either in a form of an electric starter or a combination unit with starting capability and electric generating capability or any suitable starter, an internal air compressing system or a plurality of internal air compressing system, a fuel pump 4.45, an oil pump 7.10, said fuel system includes a fuel tank 4.40, a fuel pump 4.45, fuel line assemblies 4.47, a fuel flow controlling means, and having at least one fuel delivery means 4.30, said air cooling system includes air passages 1.21 and air pipe assemblies 1.25, said air pipe assemblies 1.25 and air hose assemblies 1.27 are interchangeable, said fuel delivery means 4.30 having communicating means with a fuel system, said fuel delivery means 4.30 is either a single nozzle or an optional multi-nozzle system, said lubricating system includes: at least one known oil pump assembly 7.00, oil duct 7.30, oil line assemblies 6.70, oil hose assemblies 6.95, and lubricating system accessories, said oil pump assembly 7.00 includes an oil pump 7.10, said oil line assemblies 6.70 and said oil hose assemblies 6.95 are interchangeable, said gas-wind turbine engine rotor assembly includes a gas-wind turbine engine rotor 6.10 and a gas-wind turbine engine main shaft 6.50, said gas-wind turbine engine main shaft 6.50 having a first rotation axis 1.10, during the operation of said gas-wind turbine engine 1.00 said gas-wind turbine engine rotor 6.10 and said gas-wind turbine engine main shaft 6.50 rotates on said first rotation axis 1.10 of said gas-wind turbine engine main shaft 6.50, said exhaust gas duct housing 4.25 includes an exhaust gas duct 4.20 and fins 5.50, said internal air compressing system 3.00 is an air pump which generates an air pressure for: cooling, air sealing means, and air to an air and fuel mixture combustion process, said internal air compressing system 3.00 includes an air duct 5.15 and compressed air space 6.90, said air duct 5.15 having communicating means with said compressed air receiving means 3.50 and said compressed air space 6.90, said internal air compressing system 3.00 could be substituted with other known air compressor for compressing air and adapted to said gas-wind turbine engine 1.00 so that said air pressure is high enough to flow to the combustor 4.00 for supplying air for cooling and supplying air for the ignition of the fuel and air mixture, said fuel and air mixture ignition means 4.50 is attached to said exhaust gas duct housing 4.25 or attached to said combustor housing 4.10 or attached to other suitable location;

wherein the engine housing system is either adapted for a high bypass air flow engine configuration or adapted for a low bypass air flow engine configuration, said engine housing system includes: an external housing 2.00, an engine cowling 2.70, a core shell 2.20, a turbo air space 1.40, at least one air gap 1.44, a second space 1.42, a third space 1.43, at least one gas-wind turbine engine rotor housing 2.30, a plurality of bearing means assembly housing 9.70, fourth guide vanes 2.40, and a mixture flow duct 9.20, in other configuration of the present invention some of the said bearing means assembly housing 9.70 is incorporated with said gas-wind turbine engine rotor housing 2.30, said external housing 2.00 includes a large fan housing assembly and a main frame 5.30, said main frame 5.30 includes a pylon 5.80 and a large fan air flow duct 9.50, the large fan assembly which is complimented by the large fan housing assembly generates a large fan air flow 5.20 during the operation of said gas-wind turbine engine 1.00, said large fan air flow 5.20 is adapted to cool hot parts of said gas-wind turbine engine 1.00, said core shell 2.20 is attached to the main frame 5.30 by the structural guide vanes 5.90 or by other similar system which works for same purpose, said main frame 5.30 and said structural guide vanes 5.90 also guides the large fan air flow 5.20 to the second end 888 of said gas-wind turbine engine 1.00, said core shell 2.20 is attached to the main frame 5.30 by the structural guide vanes 5.90, said core shell 2.20 includes fins 5.50 to radiate heat, said structural guide vanes 5.90 allows said large fan air flow 5.20 smooth movement to the second end 888 of said gas-wind turbine engine 1.00, said turbo air space 1.40 is designed to allow said large fan air flow 5.20 proper movement to the second end 888 of said gas-wind turbine engine 1.00 while said gas-wind turbine engine rotor housing 2.30 and said third space 1.43 allows portion of said large fan air flow 5.20 to move through, said third space 1.43 located at the mixture flow duct 9.20, said engine cowling 2.70 provides access for repairing some parts of the gas-wind turbine engine 1.00;

wherein the bearing means assembly 9.00 includes bearings 9.10 and bearing means assembly accessories, said bearing means assembly 9.00 prevents too much axial movement and prevents too much radial movement of a shaft in relation to the bearing means assembly housing 9.70, said bearings 9.10 could be in the form of ball bearings 9.15, tapered roller bearings 9.16, cylindrical roller bearings 9.17, journal bearings 9.60, and other suitable form of bearings 9.10, in one configuration of the present invention said bearing means assembly accessories includes: spacers 9.11, keys 5.60, inserts 1.80, O-rings 5.65, bearing retainers 5.55, tab lock 5.56, and oil seals 6.82, said bearing retainers 5.55 and said bearing means assembly housing 9.70 maintains said bearings 9.10 position, said bearing retainer 5.55 could be a known system which prevents said bearings from moving out of place, said bearing retainer 5.55 could be in the form of tabbed and threaded fasteners, said bearing retainer 5.55 works with the compliment of a tab lock 5.56, said spacers 9.11 are designed to transfer the axial load from a shaft to said bearings 9.10 or said spacers 9.11 transfers axial load from said bearing 9.10 to another bearing 9.10 or said spacers 9.11 are designed to transfer the axial load from said insert 1.80 to said bearings 9.10 while the bearing retainers 5.55 are designed to transfer the axial load from said bearings 9.10 to said bearing means assembly housing 9.70, said inserts 1.80 allows easy disassembly or separation of the bearing assembly from a shaft and includes easy disassembly of said gas-wind turbine engine main shaft 6.50 from said bearing means assembly 9.00 by doing few processes which leads to slip-out procedure, said inserts 1.80 also allows less damage to said bearing means assembly 9.00 in the insertion of said gas-wind turbine engine main shaft 6.50 or less damage to said bearing means assembly 9.00 in the insertion of the other shaft of said gas-wind turbine engine 1.00 in a slip-in assembly process, said insert 1.80 are to be secured to the said gas-wind turbine engine main shaft 6.50 so that said insert 1.80 rotates with said gas-wind turbine engine main shaft 6.50 and said insert 1.80 proper position is maintained in relation to said bearings 9.10 and in relation to said gas-wind turbine engine main shaft 6.50 and said insert 1.80 are to be secured to the other shaft related to said gas-wind turbine engine 1.00 so that said insert 1.80 rotates with said other shaft related to said gas-wind turbine engine 1.00 and said insert 1.80 proper position is maintained in relation to said bearings 9.10 and in relation to said other shaft, said bearing means assembly 9.00 could be substituted with other known form of bearing means assembly 9.00;

wherein the large fan assembly having a large fan 5.00, a large fan shaft 5.04, and a large fan cone 5.07, said large fan 5.00 is attached to the large fan shaft 5.04, said large fan 5.00 having a large fan hub 5.05, said large fan hub 5.05 includes a plurality of large fan blades 5.06, said large fan cone 5.07 attached to said large fan hub 5.05, said plurality of large fan blades 5.06 attached to said large fan hub 5.05, said large fan hub 5.05 attached to said large fan shaft 5.04, said large fan shaft 5.04 is supported for rotation by the bearing means assembly 9.00;

wherein the large fan housing assembly includes: a large fan housing 5.02, a large fan shroud 5.03, and turbo guide vanes 4.90, said turbo guide vanes 4.90 in one of the present invention configuration includes oil duct 7.30 for entry of feed oil and exit of return oil for the bearing means assembly 9.00, at least one of said bearing means assembly 9.00 located adjacent to the large fan assembly, said oil duct 7.30 of said large fan housing 5.02 are oil spaces along said turbo guide vanes 4.90, said oil duct 7.30, the oil line assemblies 6.70, and the oil hose assemblies 6.95 carries the oil to and from said bearing means assembly 9.00 at said large fan housing 5.02, said oil duct 7.30, said oil hose assemblies 6.95, and said oil line assemblies 6.70 communicates with the lubricating system;

wherein the large fan assembly and the large fan assembly during operation of the gas-wind turbine engine 1.00 generates a large fan air flow 5.20 for thrust and for cooling said gas-wind turbine engine 1.00, said large fan air flow 5.20 cools the following: combustor housing 4.10, gas-wind turbine engine rotor housing 2.30, core shell 2.20, mixture flow duct 9.20, and other hot parts of said gas-wind turbine engine 1.00 which needs cooling, said large fan air flow 5.20 is used for thrust when a high velocity of said large fan air flow 5.20 moves out of the second end 888 of said gas-wind turbine engine 1.00, said large fan air flow 5.20 also cools parts of the gas-wind turbine engine rotor assembly and cools other parts of said gas-wind turbine engine 1.00 when a portion of said large fan air flow 5.20 goes through the turbo air space 1.40, second space 1.42, and third space 1.43 of said gas-wind turbine engine 1.00;

wherein the lubricating system having communicating means with the plurality of bearing means assembly 9.00, said lubricating system supplies oil for cooling and lubrication of said plurality of bearing means assembly 9.00, said lubricating system includes at least one oil pump assembly 7.00, oil line assemblies 6.70, oil hose assemblies 6.95, and lubricating system accessories, said lubricating system accessories includes an oil cooler and oil containment unit 8.50, the parts that supports the bearing means assembly housing 9.70 of a large fan housing 5.02 includes the turbo guide vanes 4.90, said turbo guide vanes 4.90 could serve as an oil cooler;

wherein the internal air compressing 3.00 system includes: an internal air compressing system fan 3.10, an internal air compressing system fan housing 3.20, an internal air compressing system fan shroud 3.22, an internal air compressing system shaft 3.21, internal air compressing system first stationary vanes assembly 3.23, internal air compressing system second stationary vanes assembly 3.24, compressed air space 6.90, air duct 5.15, and internal air compressing system air compressing system shaft mounted vanes assembly 3.25, said internal air compressing system fan 3.10 includes an internal air compressing system fan hub 3.11 and internal air compressing system fan blades 3.12, said internal air compressing system 3.00 supplies compressed air to one or more of the following: to a combustor 4.00 for combustion of fuel and air mixture, to a combustor housing 4.10 for cooling purposes, and to the gas-wind turbine engine 1.00 for additional cooling of hot parts of said gas-wind turbine engine 1.00, said air compressing system as known having either an axial air compressing system or centrifugal air compressing system or having both an axial air compressing system and a centrifugal air compressing system, said air compressing system could be substituted with a known air compressing system, said air compressing system includes a known air bleeding system;

wherein the combustor 4.00 is designed to generate exhaust gas flow 4.70 during a gas-wind turbine engine 1.00 operation, said exhaust gas flow 4.70 is a result when fuel and air mixture is ignited, said combustor 4.00 includes one or more of the following: combustor housing 4.10, a combustion chamber 4.11, swirl vanes 4.12, a liner 4.13, and a combustor seal 4.17, said liner 4.13 and said combustor seal 4.17 is a known aviation system which could be adapted for said gas-wind turbine engine 1.00, said exhaust gas flow 4.70 goes through the exhaust gas duct housing 4.25 along the exhaust gas duct 4.20, said combustor housing 4.10 could either be cooled by one or more of the following: compressed air cooling, large fan air flow cooling, or other air flow cooling, said combustor 4.00 having communicating means with: a fuel delivery means 4.30, one or more fuel and air mixture ignition means 4.50, and an air compressing system, said combustor housing 4.10 in one of the present invention configuration includes attaching means to a main frame 5.30 or attaching means to other parts of the gas-wind turbine engine 1.00 to prevent stress and vibration of said combustor housing 4.10 caused by the large fan air flow 5.20, said main frame 5.30 allows access to said combustor 4.00 for parts replacement, said combustor housing 4.10 includes fins 5.50 to radiate heat and includes an starting air tube 3.55, said starting air tube 3.55 having communicating means with other source of compressed air;

wherein the gas-wind turbine engine rotor assembly includes a gas-wind turbine engine rotor 6.10 and a gas-wind turbine engine main shaft 6.50, said gas-wind turbine engine rotor 6.10 includes a gas-wind turbine engine rotor hub 6.20, said gas-wind turbine engine rotor hub 6.20 having a plurality of gas-wind turbine engine rotor blades 6.60, said plurality of gas-wind turbine engine rotor blades 6.60 are attached to said gas-wind turbine engine rotor hub 6.20, said gas-wind turbine engine rotor blades 6.60 may just be some extensions with different configuration from said gas-wind turbine engine rotor hub 6.20, said gas-wind turbine engine rotor blades 6.60 could be of any other suitable known shape, said gas-wind turbine engine rotor blades 6.60 could be made of different material as compared to the gas-wind turbine engine rotor hub 6.20 or said gas-wind turbine engine rotor blades 6.60 could be made of same material as said gas-wind turbine engine rotor hub 6.20, said gas-wind turbine engine rotor blades 6.60 extends in an outwardly manner from said gas-wind turbine engine rotor hub 6.20, said plurality of gas-wind turbine engine rotor blades 6.60 spaced substantially equally on said gas-wind turbine engine rotor hub 6.20, during the operation of said gas-wind turbine engine 1.00 said gas-wind turbine engine rotor blades 6.60, said gas-wind turbine engine rotor 6.10, and said gas-wind turbine engine main shaft 6.50 are moved to rotate on the first rotation axis 1.10 of said gas-wind turbine engine main shaft 6.50 by the exhaust gas flow 4.70 from the combustor 4.00 and additionally said gas-wind turbine engine rotor blades 6.60, said gas-wind turbine engine rotor 6.10, and said gas-wind turbine engine main shaft 6.50 are moved to rotate on said first rotation axis 1.10 of said gas-wind turbine engine main shaft 6.50 by a portion of the large fan air flow 5.20 from the large fan housing assembly and the engine fan assembly;

wherein the power shaft means is a system in which the large fan shaft 5.04, the internal air compressing system shaft 3.21, and the gas-wind turbine engine main shaft 6.50 is a single continuous shaft or the large fan shaft 5.04, the internal air compressing system shaft 3.21, and the gas-wind turbine engine main shaft 6.50 are separate shafts where said large fan shaft 5.04, said internal air compressing system shaft 3.21, and said gas-wind turbine engine main shaft 6.50 communicates with one another;

wherein the mixture flow duct 9.20 directs the mixture of a portion of large fan air flow 5.20 and exhaust gas flow 4.70 for thrust;

wherein the bearing means assembly housing 9.70 supports one bearing 9.10 or supports a plurality of bearings 9.10, said bearing means assembly housing 9.70 in one present invention configuration includes a housing oil bypass 5.40, said housing oil bypass 5.40 allows proper circulation of oil at the bearing means assembly housing 9.70, said bearing means assembly housing 9.70 and said bearings 9.10 in another present invention configuration includes a matching groove for a key 5.60, said key 5.60 prevents said bearings 9.10 from damaging said bearing means assembly housing 9.70;

wherein the exhaust gas flow 4.70 from a combustor 4.00 moves to a space of the gas-wind turbine engine rotor housing 2.30 and the movement of said exhaust gas flow 4.70 in said gas-wind turbine engine rotor housing 2.30 pushes the gas-wind turbine engine rotor blades 6.60 and rotates: the gas-wind turbine engine rotor 6.10, the gas-wind turbine engine main shaft 6.50, the internal air compressing system shaft 3.21, the large fan shaft 5.04, and the large fan 5.00, said gas-wind turbine engine main shaft 6.50 having communicating means with the internal air compressing system shaft 3.21 and said gas-wind turbine engine main shaft 6.50 having communicating means with the large fan shaft 5.04;

wherein the gas-wind turbine engine rotor housing 2.30 is adapted to allow installation of required parts of the gas-wind turbine engine 1.00 into said gas-wind turbine engine rotor housing 2.30 which includes allowing the installation of a gas-wind turbine engine rotor assembly, said gas-wind turbine engine rotor housing 2.30 allows the gas-wind turbine engine main shaft 6.50 and the gas-wind turbine engine rotor 6.10 to rotate, said gas-wind turbine engine rotor housing 2.30 having walls 2.41, at least two housing gaps 2.42, at least one exhaust gas duct opening 2.43, fins 5.50, and gas-wind turbine engine rotor assembly space, said walls 2.41 includes a first wall 2.44, a second wall 2.45, and a third wall 2.46, said first wall 2.44, said second wall 2.45, and said third wall 2.46 could be made of different sections and assembled together, in one configuration of the present invention said housing gap 2.42 at said second wall 2.45 being wider than said housing gap 2.42 at said first wall 2.44 are designed so that the exhaust gas flow 4.70 moves out from said gas-wind turbine engine rotor housing 2.30 through said housing gap 2.42 at said second wall 2.45, said gas-wind turbine engine rotor housing 2.30 is designed with air passages 1.21, a number of said air passages 1.21 could be used to cool said walls 2.41 of said gas-wind turbine engine rotor housing 2.30, said gas-wind turbine engine rotor assembly space includes a second space 1.42, said second space 1.42 allows said gas-wind turbine engine rotor 6.10 to rotate, the exhaust gas duct 4.20 communicates with a part of the second space 1.42 of said gas-wind turbine engine rotor housing 2.30, said exhaust gas duct housing 4.25 is directly or indirectly attached to said gas-wind turbine engine rotor housing 2.30 or attached either to: said first wall 2.44, said second wall 2.45, said third wall 2.46, or attached to any suitable combination of said first wall 2.44, said second wall 2.45, and said third wall 2.46 so that said exhaust gas flow 4.70 be allowed to move in to a part of said second space 1.42 of said gas-wind turbine engine rotor housing 2.30, said exhaust gas duct opening 2.43 on said third wall 2.46 are to be adjacent to said first wall 2.44 and adjacent to said second wall 2.45, at one point or more points of said gas-wind turbine engine rotor housing 2.30 said first wall 2.44, said second wall 2.45, and said third wall 2.46 are adjacent to each other, said gas-wind turbine engine rotor housing 2.30 having the required clearance from said gas-wind turbine engine rotor 6.10, by design and during the operation of said gas-wind turbine engine 1.00 said gas-wind turbine engine rotor housing 2.30 allows said exhaust gas flow 4.70 from a combustor 4.00 into said gas-wind turbine engine rotor housing 2.30, said exhaust gas flow 4.70 goes through said exhaust gas duct 4.20 and goes further to said part of said second space 1.42 of said gas-wind turbine engine rotor housing 2.30 and said exhaust gas flow 4.70 which is guided by said walls 2.41 of said gas-wind turbine engine rotor housing 2.30 pushes said gas-wind turbine engine rotor blades 6.60 thereby rotating said gas-wind turbine engine rotor 6.10 on the first rotation axis 1.10 of said gas-wind turbine engine main shaft 6.50 and the operation generates power for said gas-wind turbine engine 1.00, said power drives said gas-wind turbine engine main shaft 6.50 and the large fan 5.05 to rotate which moves large volume of air for thrust, said walls 2.41 and said gas-wind turbine engine rotor blades 6.60 prevents most of said exhaust gas flow 4.70 from escaping to the mixture flow duct 9.20 until said exhaust gas flow 4.70 reaches one of said housing gaps 2.42 at said second wall 2.45 of said gas-wind turbine engine rotor housing 2.30 and said exhaust gas flow 4.70 exits said gas-wind turbine engine rotor housing 2.30 through said housing gaps 2.42 at said second wall 2.45 and said exhaust gas flow 4.70 eventually be at said mixture flow duct 9.20, said housing gap 2.42 at said first wall and said housing gap 2.42 at said second wall 2.44 of said gas-wind turbine engine rotor housing 2.30 further allows portion of said large fan air flow 5.20 to move in and to move out from said gas-wind turbine engine rotor housing 2.30, said gas-wind turbine engine rotor housing 2.30 additionally allows said portion of said large fan air flow 5.20 from said large fan housing assembly to flow between said gas-wind turbine engine rotor blades 6.60 to cool said gas-wind turbine engine rotor blades 6.60 of said gas-wind turbine engine rotor 6.10 and in the process of cooling said gas-wind turbine engine rotor blades 6.60 the said portion of large fan air flow 5.20 which is moving as wind ultimately adds rotating force to said gas-wind turbine engine rotor 6.10 for rotation and therefore during the operation of said gas-wind turbine engine 1.00 said portion of large fan air flow 5.20 adds more torque to said gas-wind turbine engine 1.00, said portion of said large fan air flow 5.20 for cooling said gas-wind turbine engine rotor blades 6.60 is guided by guide vanes, in one configuration of the present invention said gas-wind turbine engine rotor housing 2.30 includes air passages 1.21 to allow said portion of large fan air flow 5.20 and includes air passages 1.21 for air from the air bleeding system to cool said walls 2.41 of said gas-wind turbine engine rotor housing 2.30, in another configuration of the present invention said gas-wind turbine engine rotor housing 2.30 includes at least one air duct 5.15 and fins 5.50.

2. A gas-wind turbine engine 1.00 according to the first disclosure wherein the combustor 4.00 includes a liner 4.13, said liner 4.13 having a corrugated joint 4.15, said corrugated joint 4.15 includes small through spaces 4.16 which allow compressed air to pass through said corrugated joint 4.15, said compressed air passing through said small through spaces 4.16 cools said liner 4.13 and said small through spaces 4.16 additionally directs cooling air for said liner 4.13.

3. A gas-wind turbine engine 1.00 according to the first disclosure wherein parts adjacent to: the gas-wind turbine engine main shaft 6.50, the large fan shaft 5.04, and the internal air compressing system shaft 3.21 having a communicating means with the shaft play sensor 1.30, said shaft play sensor 1.30 monitors excessive play of: said gas-wind turbine engine main shaft 6.50, said large fan shaft 5.04, and said internal air compressing system shaft 3.21 to warn crew of impending failure so it could be shut down before extensive damage is done.

Figure 6:
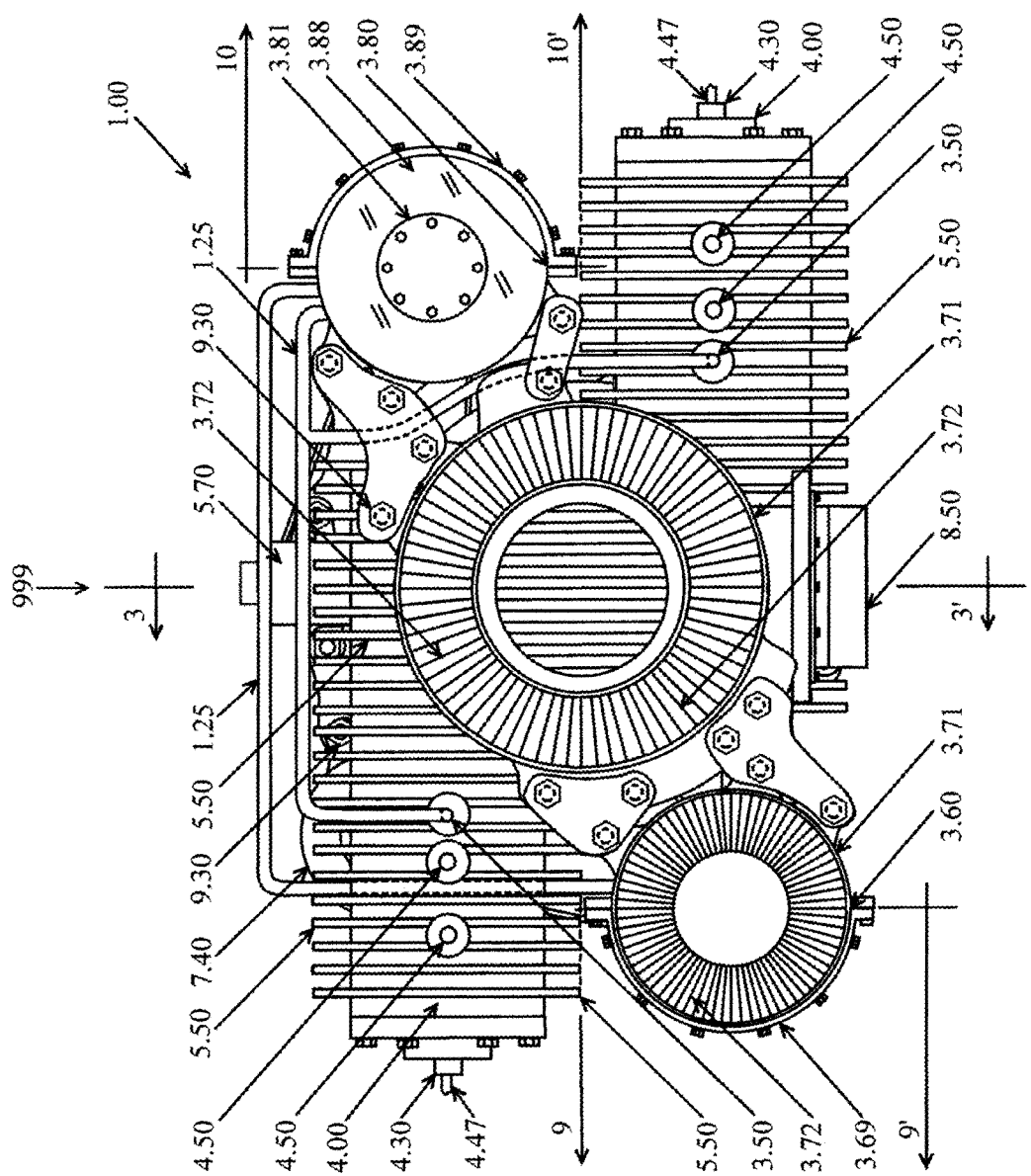
FIG. 6 illustrates the first end 666 view of the gas-wind turbine engine designed to generate torque and having an air cooling system and having an external air compressing system.
Figure 7:
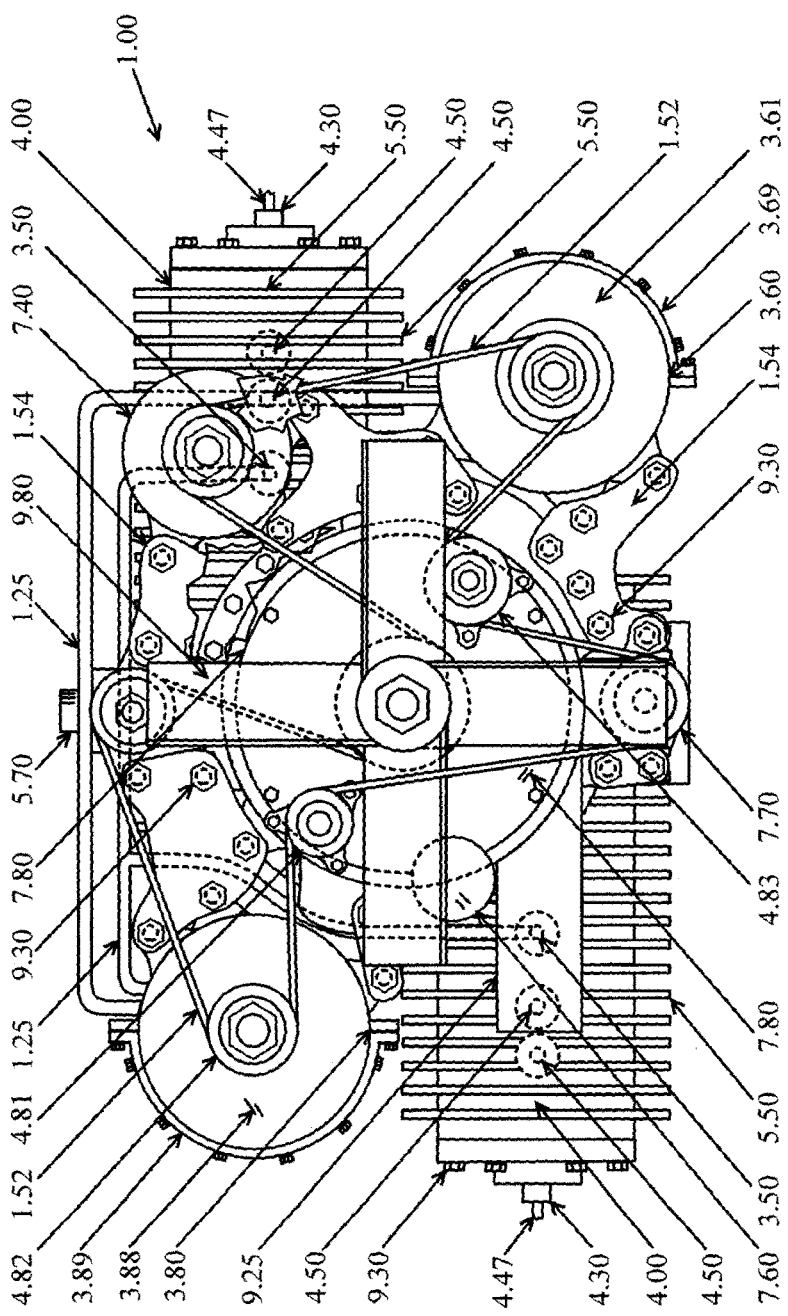
FIG. 7 illustrates the second end 888 view of the gas-wind turbine engine shown in FIG. 8 and second end view of the gas-wind turbine engine shown in FIG. 6.
Figure 8:
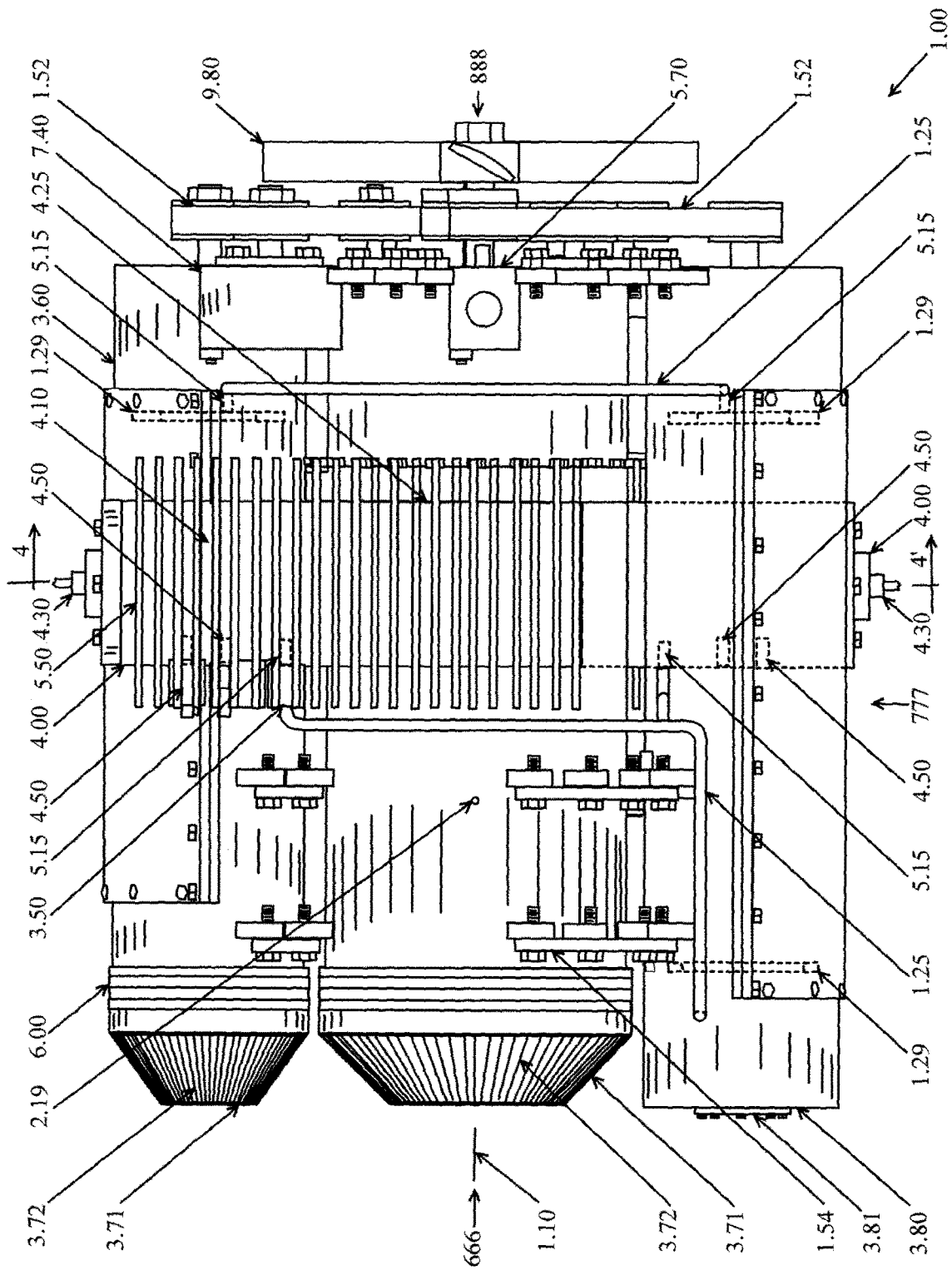
FIG. 8 illustrates the third location 999 view of the gas-wind turbine engine shown in FIG. 6.
Figure 9:
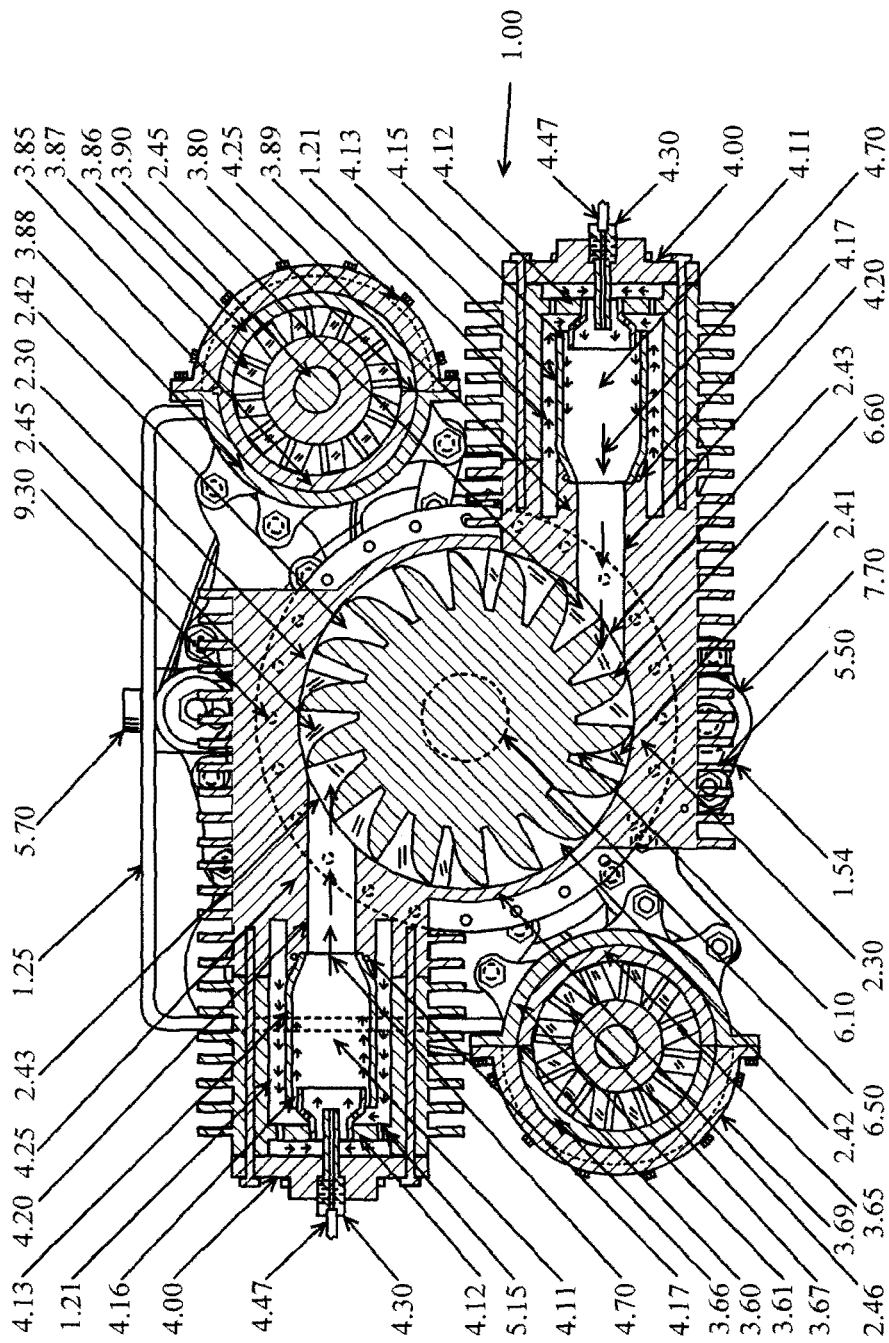
FIG. 9 illustrates section 4-4' of the gas-wind turbine engine shown in FIG. 8.
Figure 10:
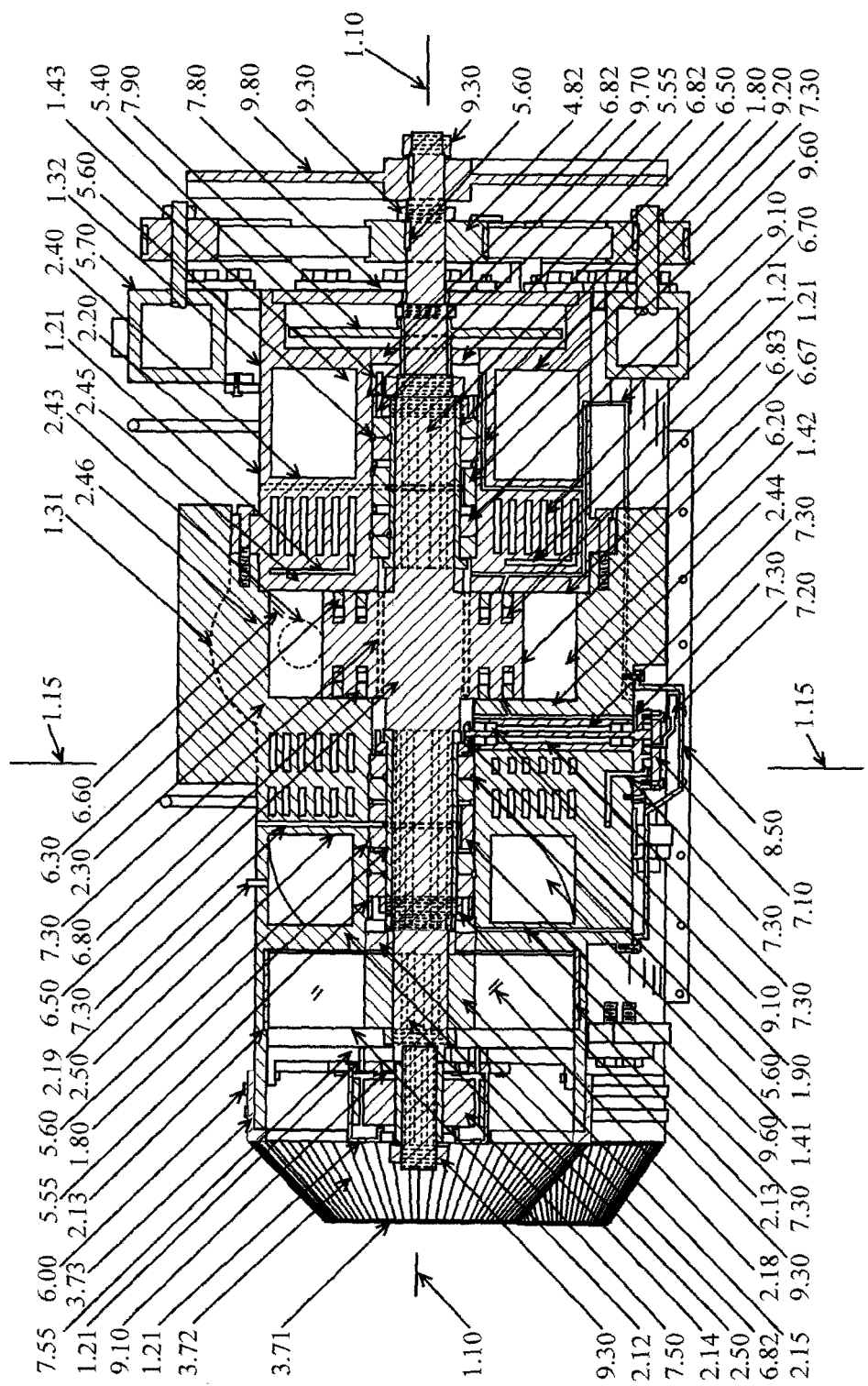
FIG. 10 illustrates section 3-3' in FIG. 6.
Figure 11:
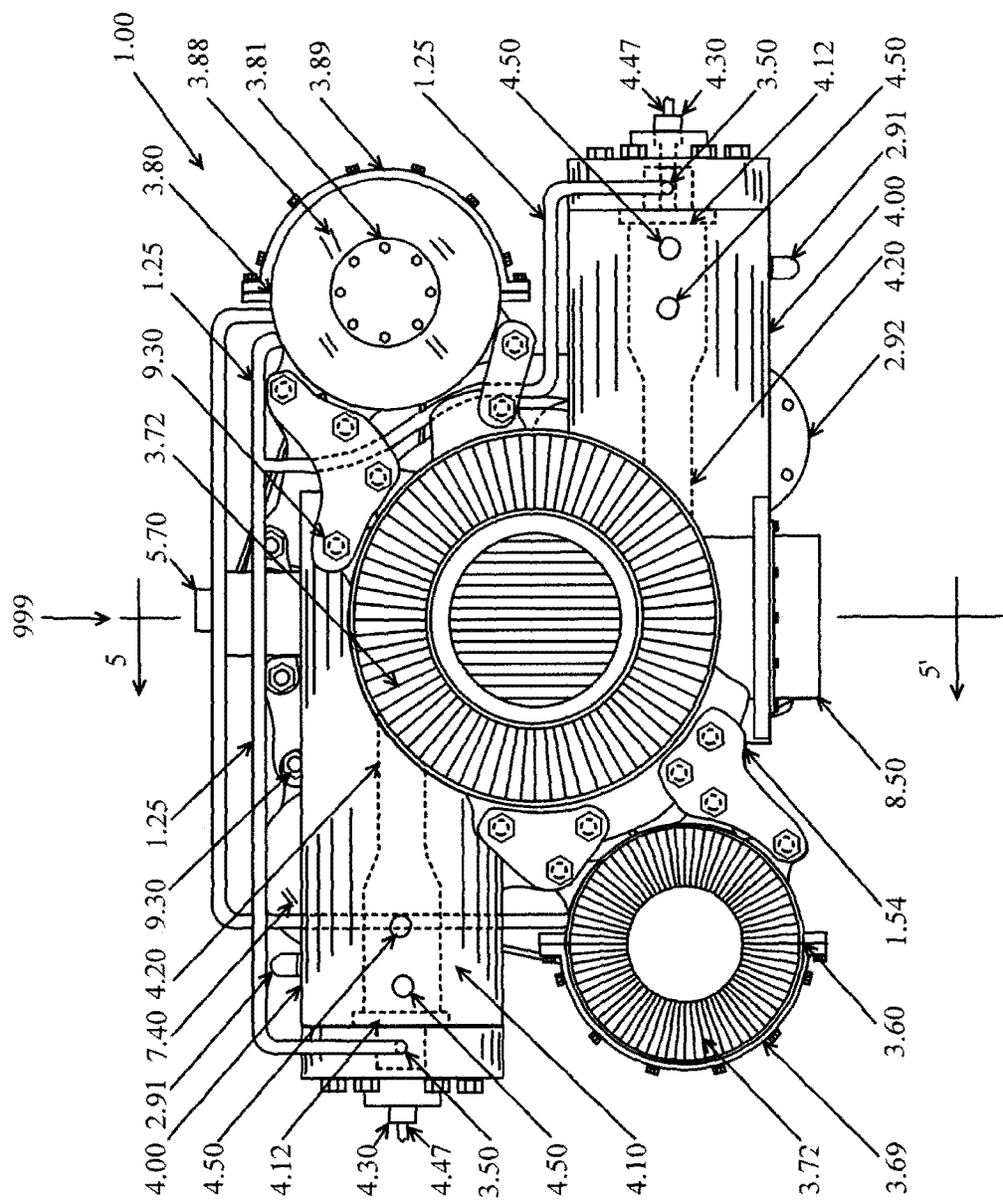
FIG. 11 illustrates the first end view of another gas-wind turbine engine designed to generate torque and having an external air compressing system and a liquid cooled system supplemented by an air cooling system.
Figure 12:
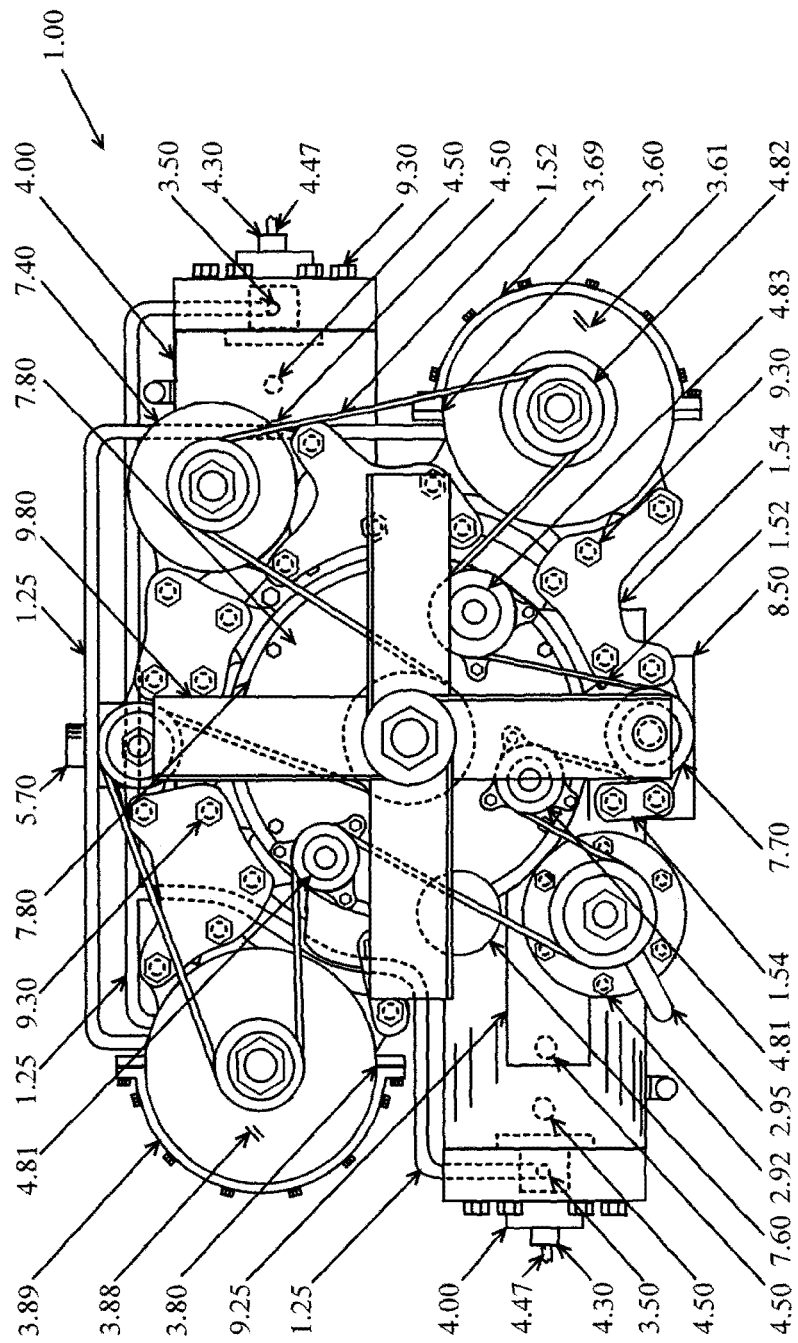
FIG. 12 illustrates the second end 888 view of the gas-wind turbine engine shown in FIG. 13 and second end view the gas-wind turbine engine shown FIG. 11.
Figure 13:
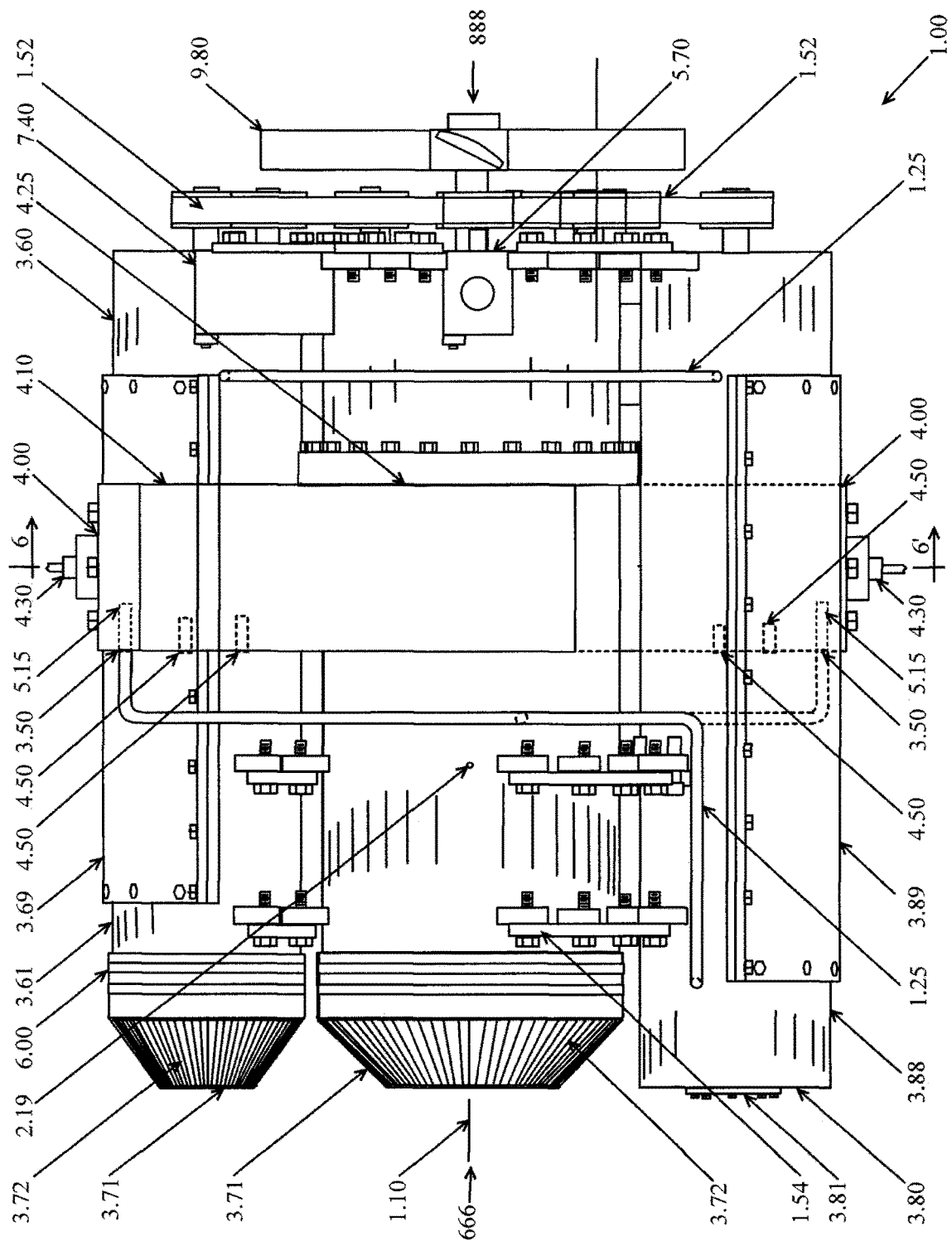
FIG. 13 illustrates third location 999 view of the gas-wind turbine engine shown in FIG. 11.
Figure 14:
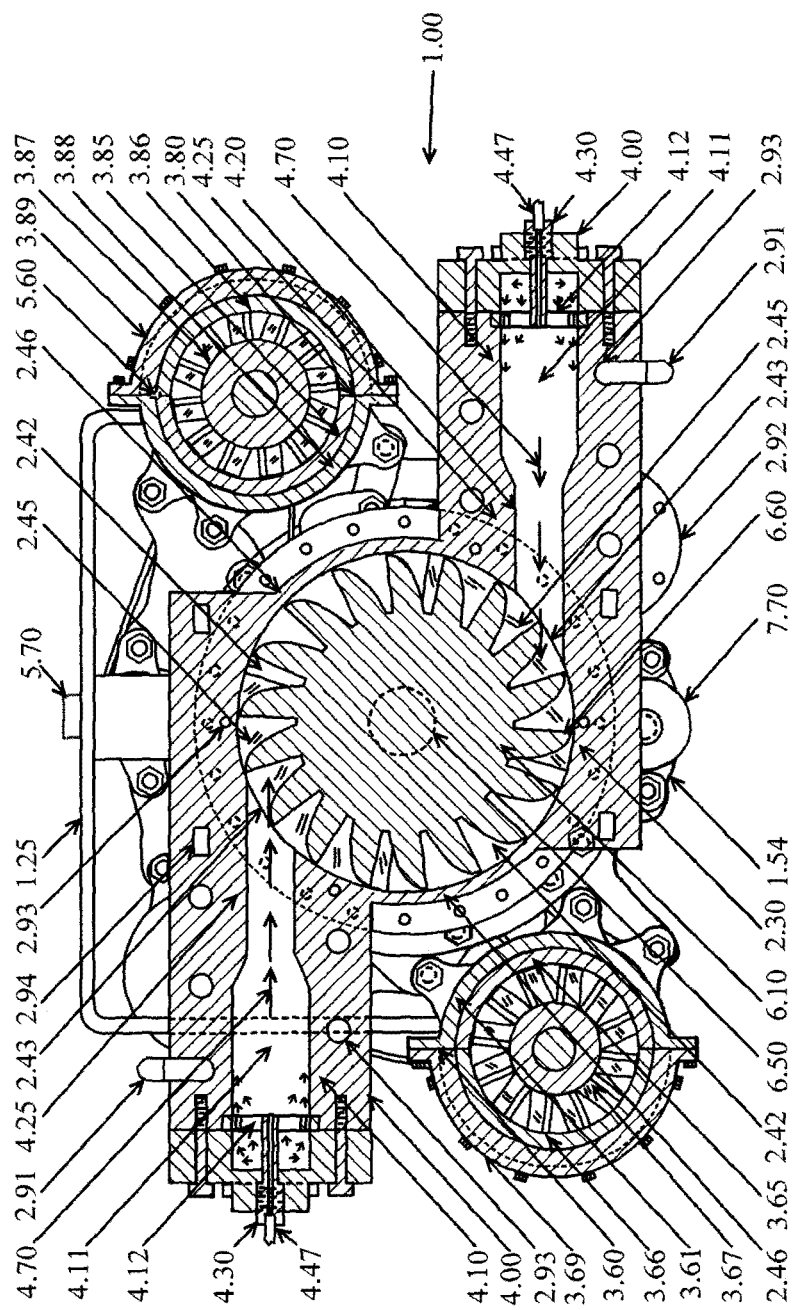
FIG. 14 illustrates section 6-6' of FIG. 13.
Figure 15:
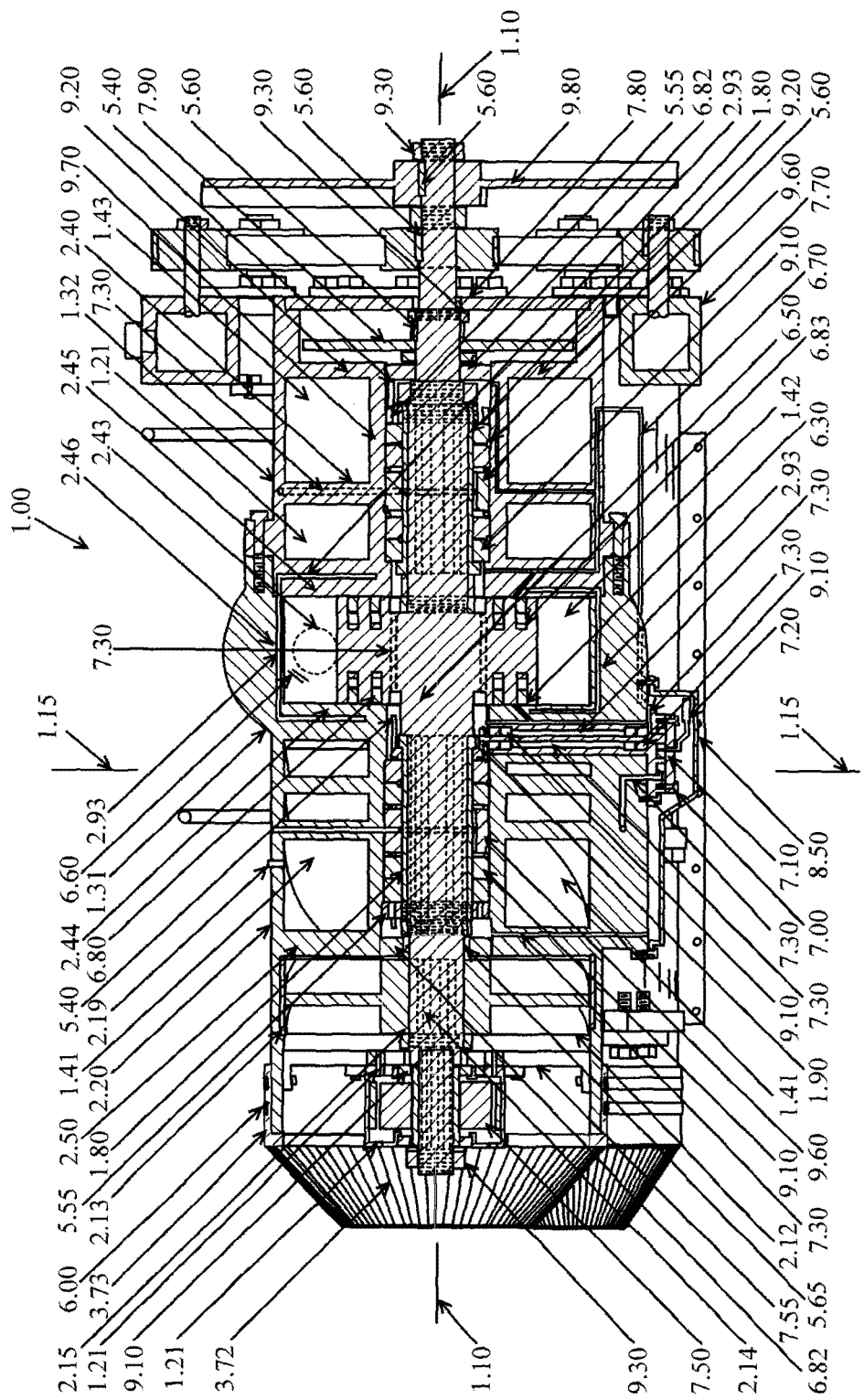
FIG. 15 illustrates section 5-5' of the gas-wind turbine engine shown in FIG. 11.
Figure 16:
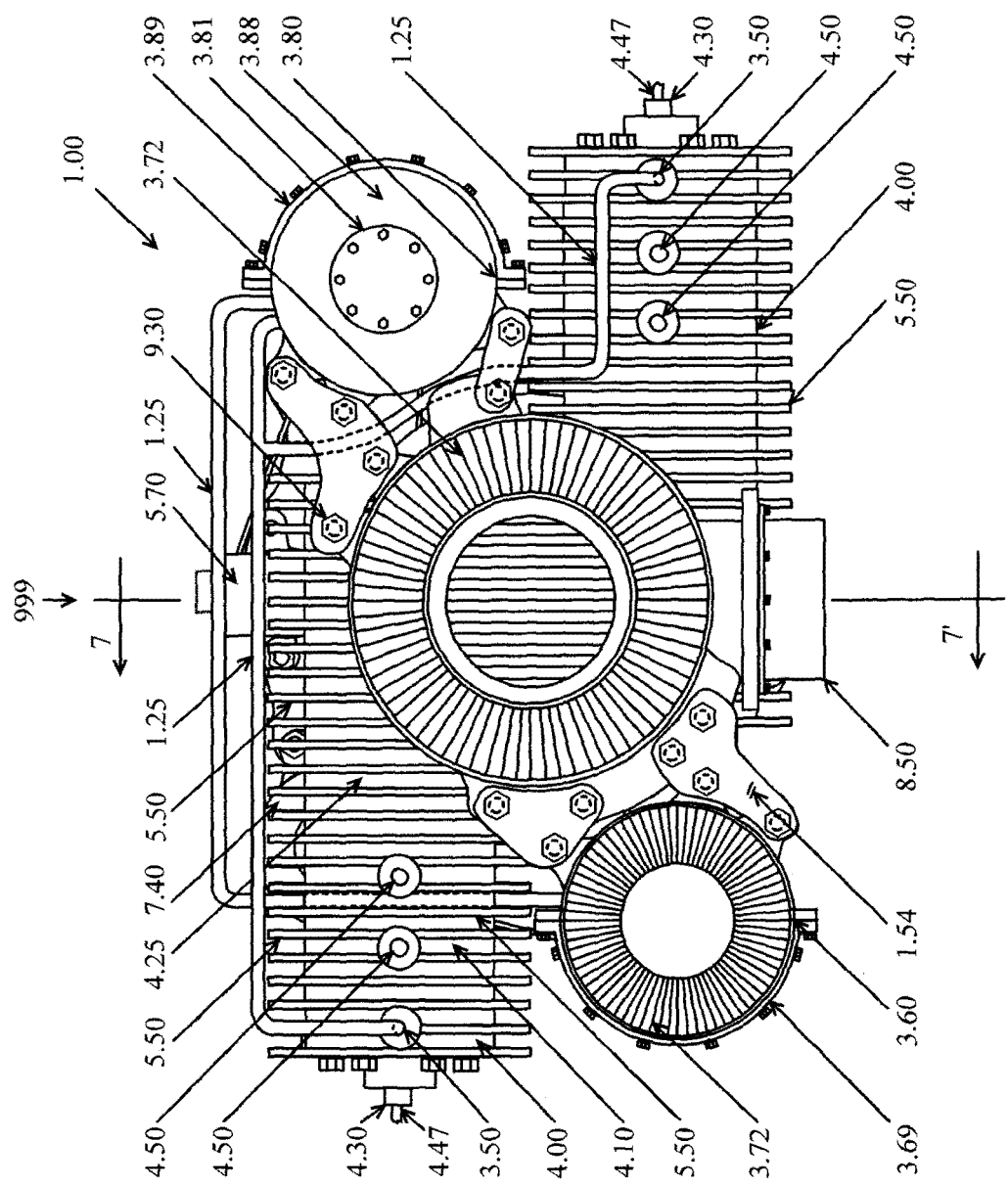
FIG. 16 illustrates the first end 666 view of a gas-wind turbine engine having an external air compressing system and having an air cooled system designed to generate torque.
Figure 17:
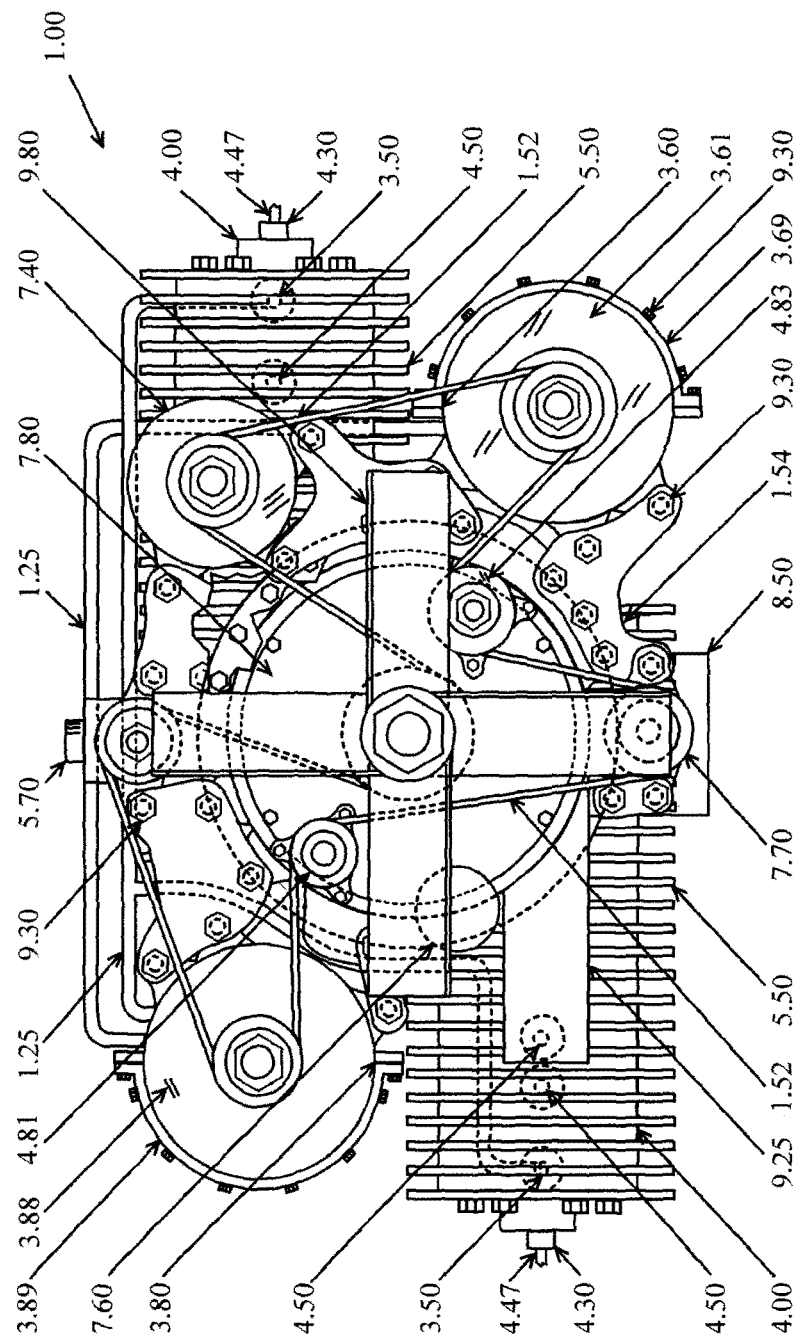
FIG. 17 illustrates the second end 888 view of the gas-wind turbine engine in FIG. 18 and second end view of the gas-wind turbine engine shown FIG. 16.
Figure 18:
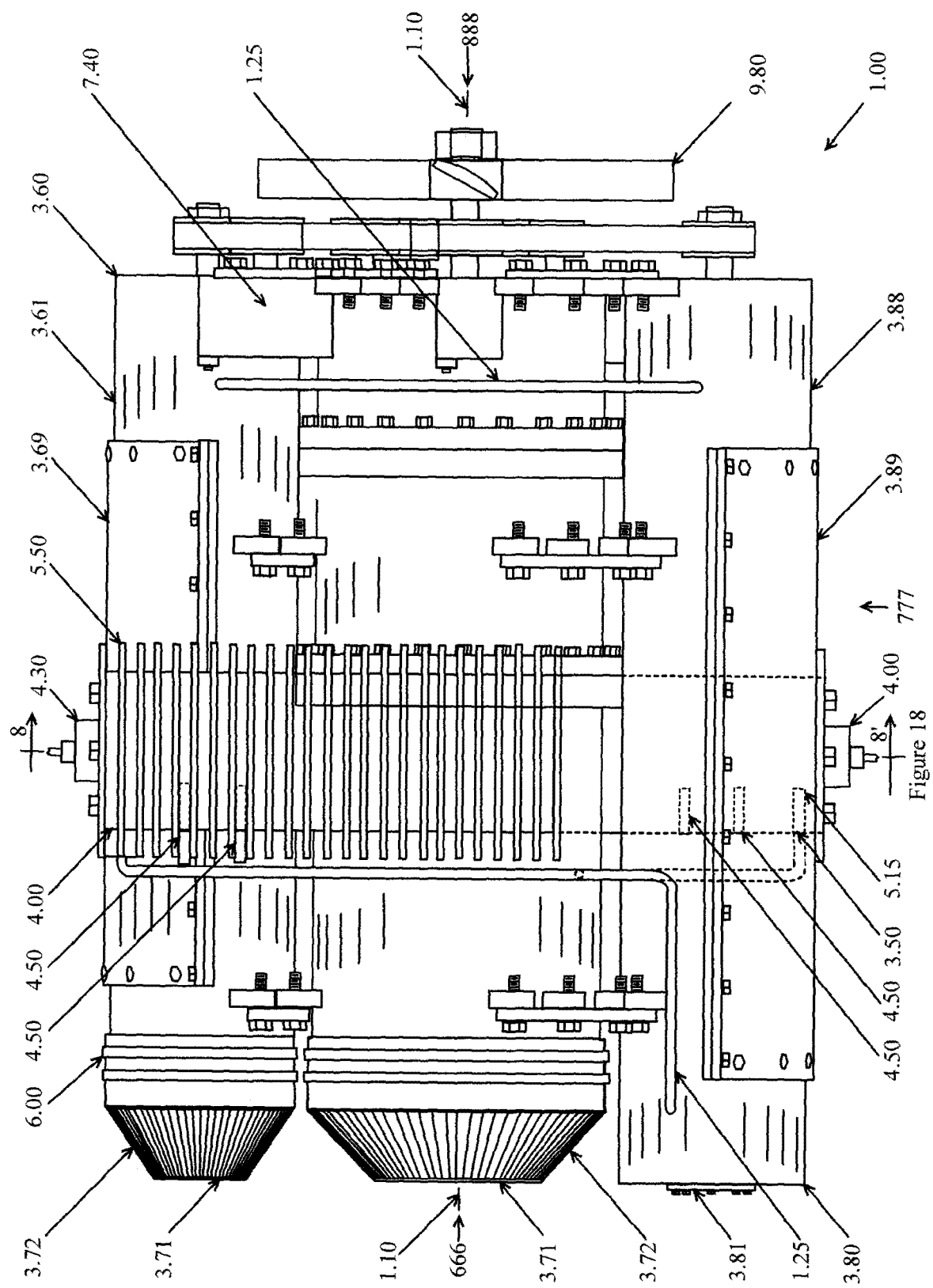
FIG. 18 illustrates the third location 999 view of the gas-wind turbine engine shown in FIG. 16.
Figure 19:
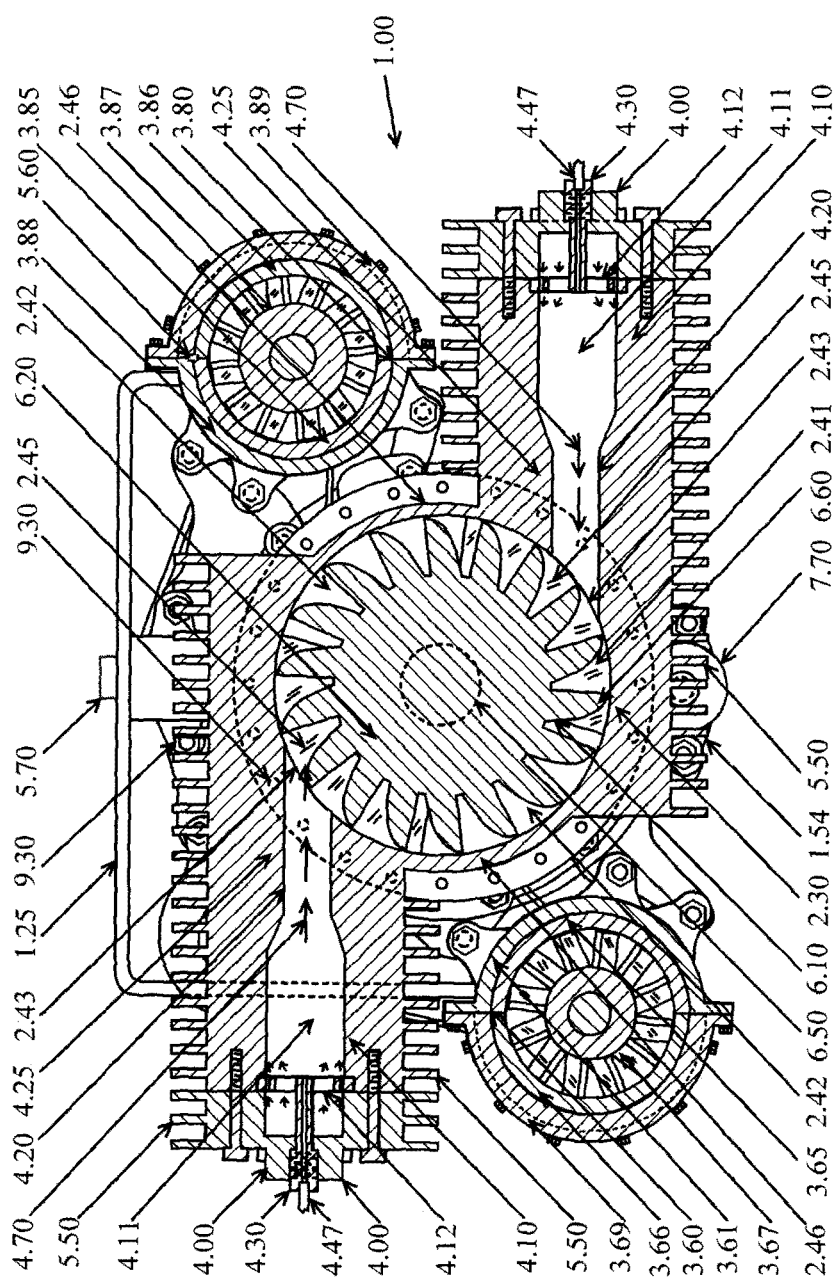
FIG. 19 illustrates section 8-8' of FIG. 18.
Figure 20:
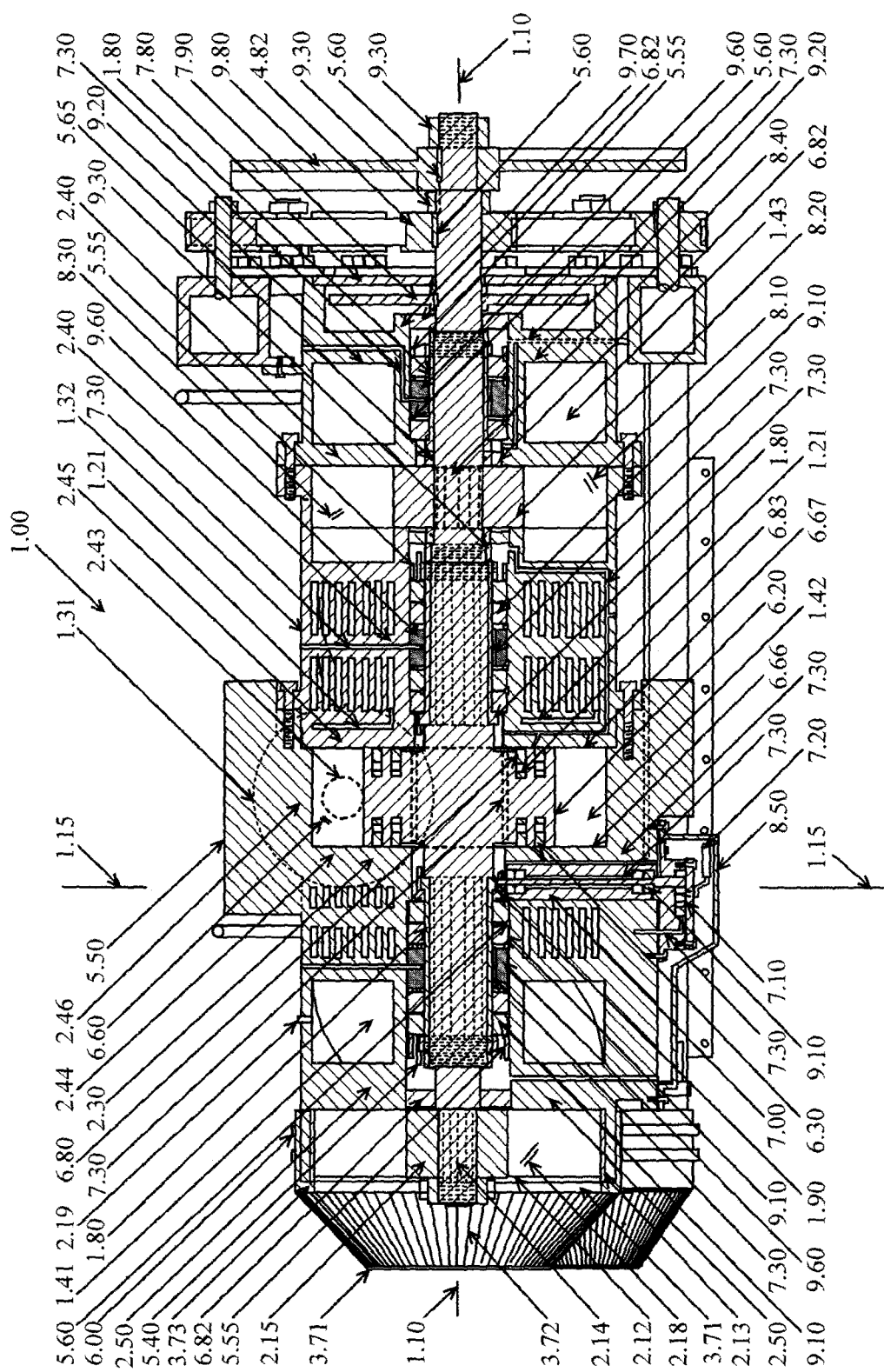
FIG. 20 shows section 7-7' of FIG. 16.
Figure 21:
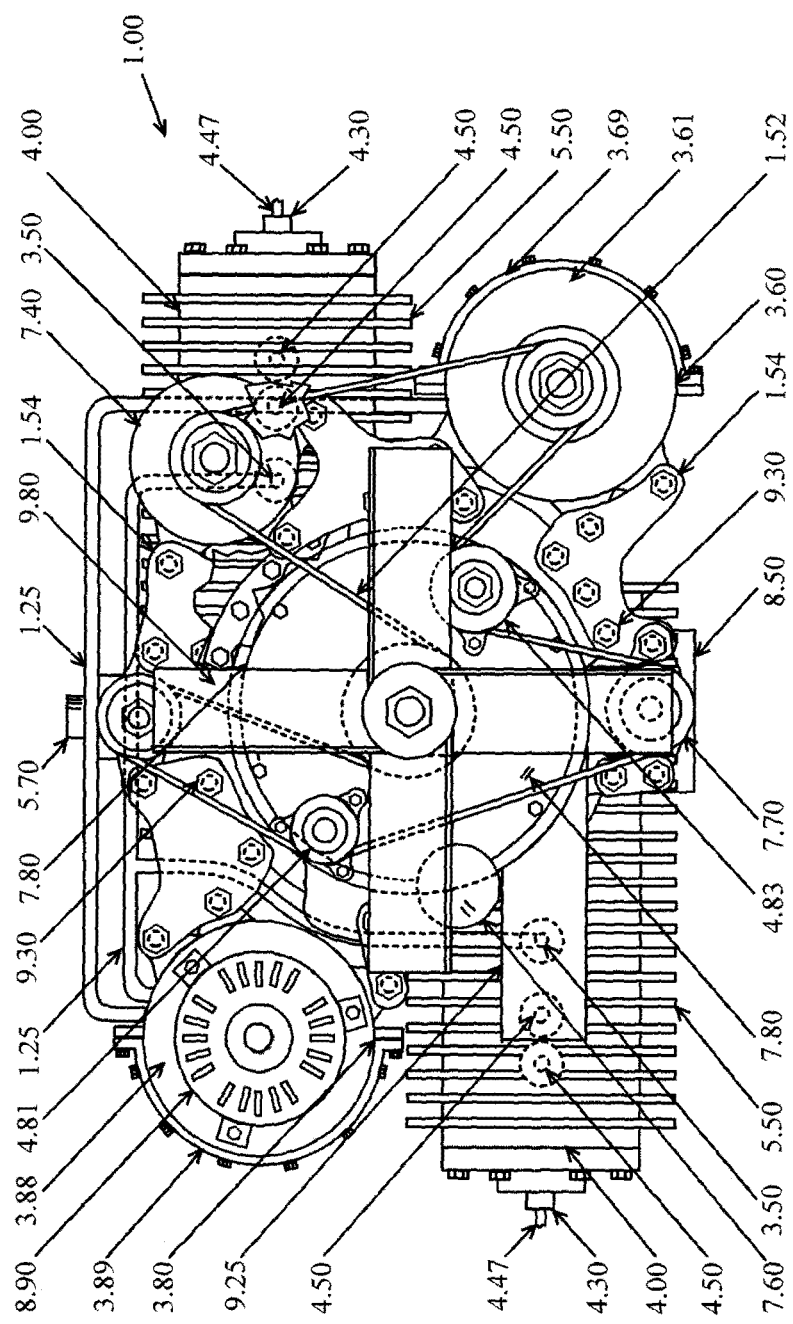
FIG. 21 illustrates the gas-wind turbine engine with an air cooled system having a typical belt arrangement wherein the booster air compressor is driven by second electric motor.
Figure 22:
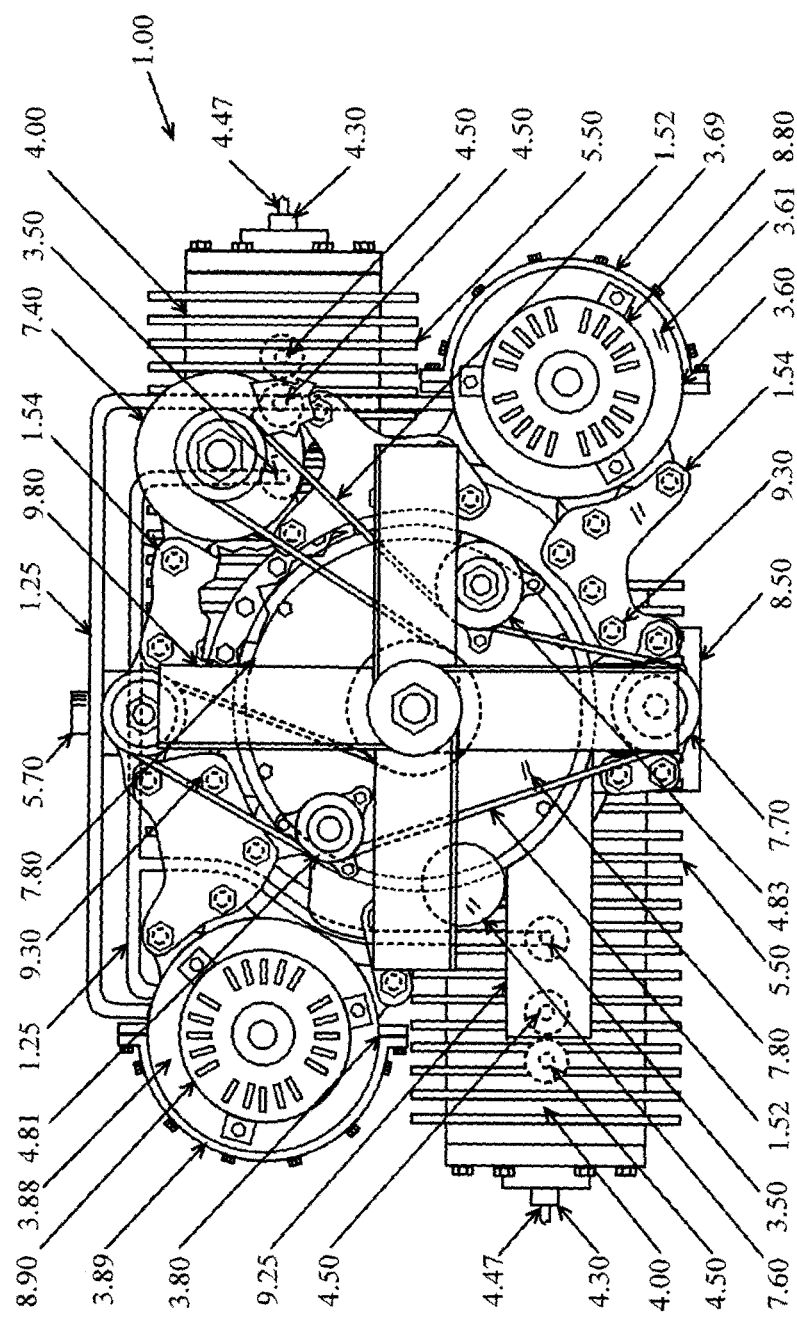
FIG. 22 illustrates the gas-wind turbine engine with an air cooled system having a typical belt arrangement showing the booster air compressor is driven by second electric motor and wherein the auxiliary air compressor driven by a first electric motor.
Figure 23:
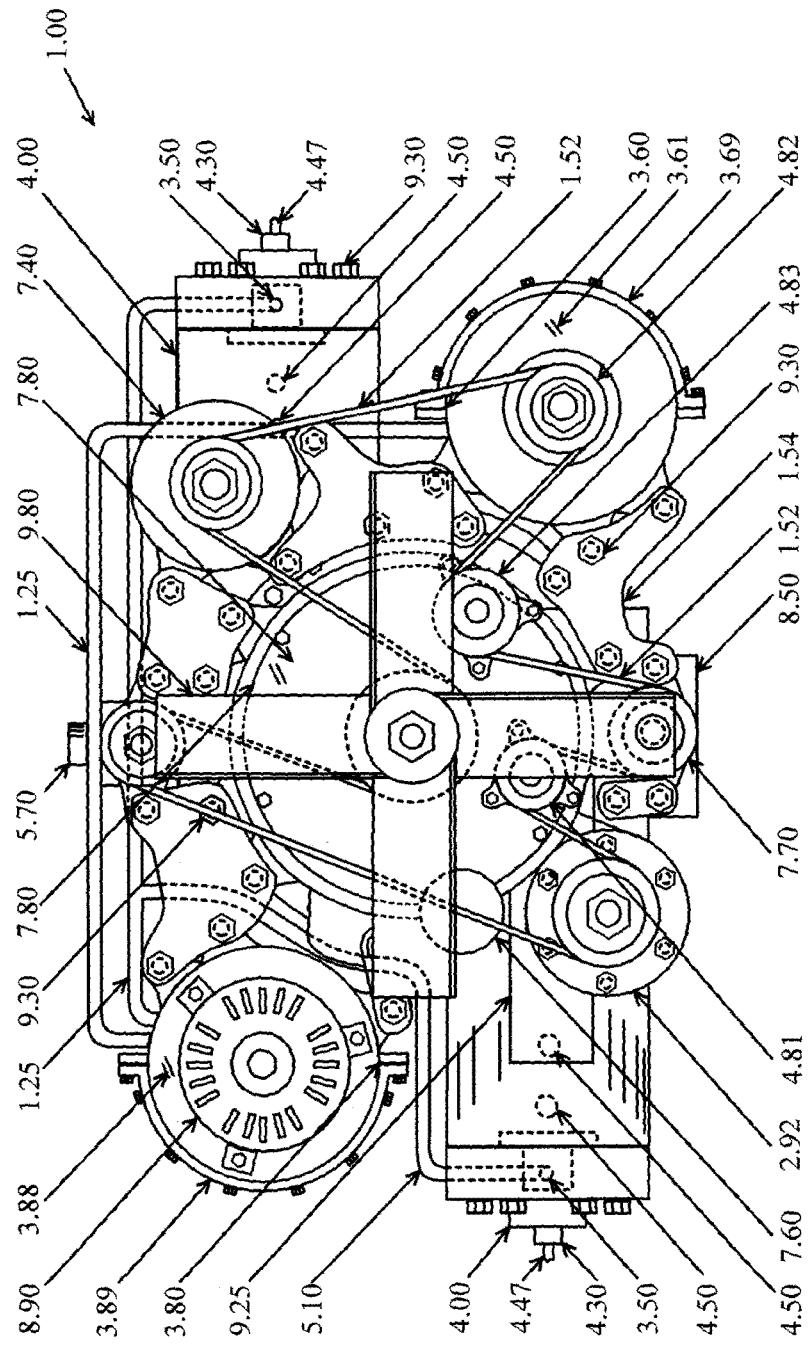
FIG. 23 illustrates the gas-wind turbine engine with an air cooled system and liquid cooled system having a typical belt arrangement wherein the booster air compressor is driven by a second electric motor.
Figure 24:
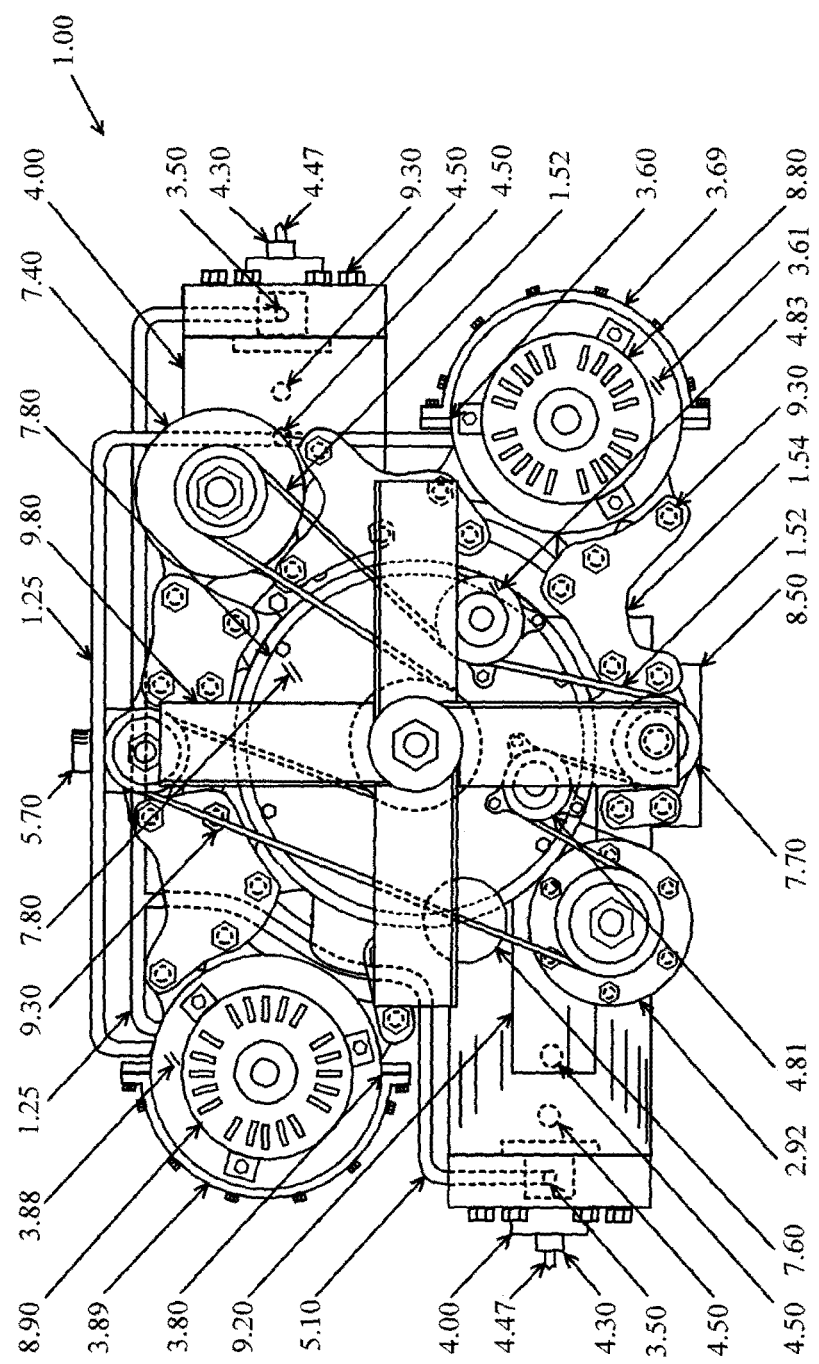
FIG. 24 illustrates the gas-wind turbine engine with an air cooled system and liquid cooled system having a typical belt arrangement and showing the booster air compressor is driven by a second electric motor and wherein the auxiliary air compressor is driven by a first electric motor.
Figure 28:
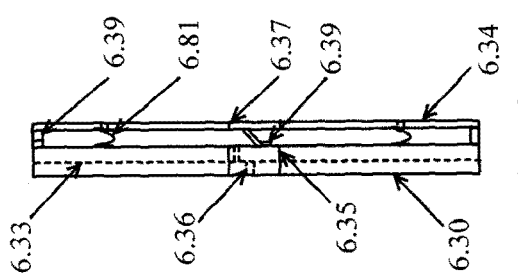
FIG. 28 illustrates an enlarged drawing as seen on first location 111 view in FIG. 27 for clarity of a typical gas pressure ring and typical gas pressure ring spring for present invention engine designed to generate torque where the gas-wind turbine engine rotor hub is not shown to show more details of the gas pressure ring and gas pressure ring spring.
Figure 27:
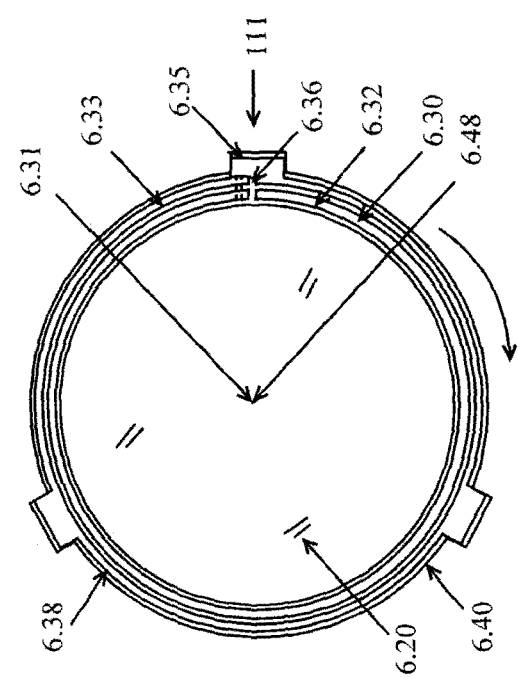
FIG. 27 illustrates an enlarged drawing for clarity of a typical gas pressure ring for present invention engine designed to generate torque.

With reference to the FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, and any of the applicable drawings from FIG. 27 to FIG. 65 inclusive are used for cross reference shows the second disclosure of the gas-wind turbine engine is stated in specification number 4 are as follows:

4. A gas-wind turbine engine 1.00 having an air cooling system or having both an air cooling system and a liquid cooling system, said air cooling system includes fins 5.50, air pipe assemblies 1.25, and air passages 1.21, said liquid cooling system includes: a heat radiator 2.90, a liquid cooling pump 2.92, liquid cooling passageways 2.93, liquid cooling medium, liquid cooling spaces 2.94, and liquid cooling accessories, said liquid cooling accessories includes coolant hose assemblies 2.91 and coolant pipe assemblies 2.95, said coolant hose assemblies 2.91 and said coolant pipe assemblies 2.95 are interchangeable, said gas-wind turbine engine 1.00 comprising: an engine housing system, an air pressure sensor 2.19, an engine fan assembly having an engine fan 2.12 and engine fan shaft 2.14, an air filtering system 3.71 or a plurality of air filtering system 3.71, an air compressing system or a plurality of air compressing system, at least one combustor 4.00, at least one compressed air delivery means, at least one compressed air receiving means 3.50, a fuel system, an electrical system having a fuel and air mixture ignition system with at least one fuel and air mixture ignition means 4.50, at least one exhaust gas duct housing 4.25 having an exhaust gas duct 4.20, at least one gas-wind turbine engine rotor assembly, a lubricating system, a power shaft means, gas-wind turbine engine accessories, a plurality of bearing means assembly 9.00, a first space 1.41, a second space 1.42, a third space 1.43, a plurality of exhaust gas pressure sealing means, a plurality of oil sealing means which includes a plurality of oil seals 6.82, bearing retainers 5.55, keys 5.60, O-ring 5.65, clamps 6.00, belt 1.52, brackets 1.54, belt tension maintaining system 4.83, air pipe assemblies 1.25, air hose assemblies 1.27, gears 1.90, an optional wind turbine assembly which includes a wind turbine rotor 8.10, gas-wind turbine engine various parts, and a drive system or a plurality of drive system for operating said gas-wind turbine engine various parts, said gas-wind turbine engine various parts includes one or more of the following: an electric generating system or a plurality of electric generating system, an air pressure sensor 2.19, a starting system, a liquid cooling pump 2.92, an air compressing system which includes one or more external air compressing system, an air conditioning system having an air conditioning system compressor 7.70, transmission 8.00, a first cooling fan 9.80 or a second cooling fan 9.90 or an optional electrically operated fan, a hydraulic pump 5.70, at least one idler pulley 4.81, at least one first pulley 4.82, an oil pump 7.10, at least one first electric motor 8.80, at least one second electric motor 8.90, a wind turbine rotor 8.10, and other gas-wind turbine engine accessories, said fuel system includes: a fuel tank 4.40, a fuel pump 4.45, fuel line assemblies 4.47, a fuel flow controlling means, and at least one fuel delivery means 4.30, said compressed air delivery means includes air pipe assemblies 1.25 and air hose assemblies 1.27, at least one of said air pipe assemblies 1.25 having communicating means with a compressed air receiving means 3.50, said air pipe assemblies 1.25 and said air hose assemblies 1.27 are interchangeable, said bearing means assembly 9.00 includes bearings 9.10, said bearings 9.10 could be in the form of ball bearings 9.15, tapered roller bearings 9.16, cylindrical roller bearings 9.17, journal bearings 9.60, and other suitable form of bearings 9.10, said bearing means assembly 9.00 could be substituted with other known form of bearing means assembly 9.00, said external air compressing system supplies compressed air to said combustor 4.00, said external air compressing system could be in a form of an auxiliary air compressing system and an optional booster air compressing system, said auxiliary air compressing system having an auxiliary air compressor 3.60 and said booster air compressing system having a booster air compressor 3.80, said auxiliary air compressing system either be belt driven or driven by said first electric motor 8.80 and said optional booster air compressing system either be belt driven or driven by said second electric motor 8.90, said auxiliary air compressing system having communicating means with an air filtering system 3.71, said optional booster air compressing system compresses air from said auxiliary air compressing system, said air compressing system could be substituted with an air pump for compressing air and adapted to the gas-wind turbine engine 1.00 so that the air pressure is high enough to flow to the combustor 4.00 for the supplying air for cooling parts of said gas-wind turbine engine 1.00 and supplying air for the ignition of the fuel and air mixture in said combustor 4.00, said combustor 4.00 includes a combustor housing 4.10, said combustor housing 4.10 includes an air duct 5.15, said combustor 4.00 generates an exhaust gas flow 4.70 when air and fuel mixture is ignited, said engine housing system having communicating means with said air filtering system 3.71, said air filtering system 3.71 includes: at least one air filtering element 3.72, at least one air filtering housing 3.73, and air filtering system accessories, said gas-wind turbine engine rotor assembly includes at least one gas-wind turbine engine rotor 6.10 and a gas-wind turbine engine main shaft 6.50, said gas-wind turbine engine rotor 6.10 includes a gas-wind turbine engine rotor hub 6.20 having a plurality of gas-wind turbine engine rotor blades 6.60, a plurality of exhaust gas pressure ring hub groove 6.40, and a plurality of oil ring hub groove 6.26, said exhaust gas pressure ring hub groove 6.40 is adapted for an exhaust gas pressure sealing means while said oil ring hub groove 6.26 is adapted for an oil sealing means, said gas-wind turbine engine main shaft 6.50 and engine fan shaft 2.14 having communicating means, said gas-wind turbine engine main shaft 6.50 having a first rotation axis 1.10, during the operation of said gas-wind turbine engine 1.00 said gas-wind turbine engine rotor 6.10 and said gas-wind turbine engine main shaft 6.50 rotates on said first rotation axis 1.10 of said gas-wind turbine engine main shaft 6.50, said electric generating system includes an alternator 7.40 and includes an electric generator 7.50 as an option, said electric generator 7.50 having supports 7.55, said electric generator 7.50 could be replaced with a combination unit with starting capability and electric generating capability, said starting system includes a starter 7.60, said lubricating system includes at least one oil pump assembly 7.00, oil line assemblies 6.70, oil hose assemblies 6.95, and lubricating system accessories, said lubricating system accessories includes oil containment unit 8.50 and at least one oil cooler, said oil line assemblies 6.70 and oil hose assemblies 6.95 are interchangeable, said lubricating system also includes: an oil pump 7.10, a known relief valve, strainer 7.20, and oil duct 7.30, said oil duct 7.30 having communicating means with said lubricating system, oil pump assembly 7.00 or the lubricating system could be substituted with a known system and adapted to said gas-wind turbine engine 1.00, said first cooling fan 9.80 or said second cooling fan 9.90 are gas-wind turbine engine main shaft 6.50 mounted system although said first cooling fan 9.80 or said second cooling fan 9.90 could optionally be substituted with electrically operated fan, said electric generating system and said starting system may come as one unit or as separate units, said starter 7.60 in other configuration of the present invention includes a flywheel 7.90 and includes a flywheel housing 7.80, said air compressing system is an air pump which supplies air for one or more of the following: engine cooling and air for the combustion of the air and fuel mixture in said combustor 4.00, said fuel and air mixture ignition means 4.50 is attached to said combustor housing 4.10 or attached to said exhaust gas duct housing 4.25 or attached to other suitable location, said fuel delivery means 4.30 having communicating means with a fuel system, said fuel delivery means 4.30 could be an optional multi-nozzle system, said engine housing system is adapted for a low bypass air flow engine configuration, said low bypass air flow engine configuration includes zero bypass air flow engine configuration, said engine housing system includes: an engine fan housing assembly, a core shell 2.20, first guide vanes 2.50, at least one gas-wind turbine engine rotor housing 2.30, fourth guide vanes 2.40, a plurality of bearing means assembly housing 9.70, a mixture flow duct 9.20, exhaust gas manifold 9.25, and fastening system with fasteners 9.30, said engine housing system consist of a first part 1.31 and a second part 1.32 or consist of an engine first housing 1.17, an engine second housing 1.18, and an engine third housing 1.19, said engine fan housing assembly includes an engine fan housing 2.11 and an engine fan shroud 2.13, said engine fan shroud 2.13 attached to said engine fan housing 2.11, said bearing means assembly housing 9.70 includes a housing oil bypass 5.40, said engine fan assembly includes an engine fan 2.12, said engine fan 2.12 having engine fan hub 2.15 and engine fan blades 2.18, said gas-wind turbine engine rotor housing 2.30 allows the installation of said gas-wind turbine engine rotor assembly, said gas-wind turbine engine rotor housing 2.30 having walls 2.41, at least one exhaust gas duct opening 2.43, and housing gaps 2.42, said walls 2.41 includes a first wall 2.44, a second wall 2.45 and a third wall 2.46, said first wall 2.44, said second wall 2.45, and said third wall 2.46 could be made of different sections and assembled together, said air compressing system includes a known air bleeding system, said air bleeding system and said air compressing system having communicating means with air passages 1.21 at said second wall 2.45, said exhaust gas duct opening 2.43 at said third wall 2.46 are to be adjacent to said first wall 2.44 and adjacent to said second wall 2.45, at one point or more points of said gas-wind turbine engine rotor housing 2.30 said first wall 2.44, said second wall 2.45, and said third wall 2.46 are adjacent to each other, said exhaust gas duct housing 4.25 is directly or indirectly attached to said gas-wind turbine engine rotor housing 2.30 or attached either to said first wall 2.44 or said second wall 2.45 or said third wall 2.46, or attached to any suitable combination of said first wall 2.44, said second wall 2.45, and said third wall 2.46 so that said exhaust gas flow 4.70 be allowed to move in to a part of said second space 1.42 of said gas-wind turbine engine rotor housing 2.30, said powers shaft means includes said gas-wind turbine engine main shaft 6.50 and said engine fan shaft, during the operation of said gas-wind turbine engine 1.00 with the complementary operation of: the fuel system, the air compressing system, and the fuel mixture ignition system said combustor 4.00 generates a high pressure of exhaust gas flow 4.70, said exhaust gas flow 4.70 goes along said exhaust gas duct 4.20 and guided by the said walls 2.41 of said gas-wind turbine engine rotor housing 2.30 pushes said gas-wind turbine engine rotor blades 6.60 and rotates said gas-wind turbine engine rotor main shaft 6.50 which generates power, said exhaust gas flow 4.70 exits through said housing gap 2.42 at said second wall 2.45 of said gas-wind turbine engine rotor housing 2.30 and said exhaust gas flow 4.70 which is guided by the fourth guide vanes 2.40 drives said wind turbine rotor 8.10 when the gas-wind turbine engine 1.00 includes a wind rotor assembly and said exhaust gas flow 4.70 moves to the mixture flow duct 9.20 and out to said exhaust gas manifold 9.25, the rotation of said gas-wind turbine engine main shaft 6.50 rotates said engine fan 2.12 which results to said engine fan housing assembly and said engine fan housing assembly generating an usable air flow 1.20, said usable air flow 1.20 is directed by said first guide vanes 2.50 and said usable air flow 1.20 goes through said housing gap 2.42 at said first wall 2.44 of said gas-wind turbine engine rotor housing 2.30 to push said gas-wind turbine engine rotor blades 6.60 and said gas-wind turbine engine rotor 6.10 rotates on the said first rotation axis 1.10 of said gas-wind turbine engine rotor shaft 6.50 and the process adds torque to said gas-wind turbine engine 1.00 and the process also cools said gas-wind turbine engine rotor 6.10 and cools other parts of said gas-wind turbine engine 1.00, said usable air flow 1.20 exits through said housing gap 2.42 at said second wall 2.45 of said gas-wind turbine engine rotor housing 2.30 and drives said wind turbine rotor 8.10 when the gas-wind turbine engine 1.00 includes a wind turbine assembly and said usable air flow 1.20 goes to said mixture flow duct 9.20 and to said exhaust gas manifold 9.25.

With reference to the FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, and any of the applicable drawings from FIG. 27 to FIG. 65 inclusive are used for cross reference shows the third disclosure of the gas-wind turbine engine is stated in specification number 5 to specification number 15 are as follows:

5. A gas-wind turbine engine 1.00 having an air cooling system or having both an air cooling system and a liquid cooling system, said air cooling system includes fins 5.50, air pipe assemblies 1.25, and air passages 1.21, said liquid cooling system includes: a heat radiator 2.90, a liquid cooling pump 2.92, liquid cooling passageways 2.93, liquid cooling medium, liquid cooling spaces 2.94, and liquid cooling accessories, said liquid cooling accessories includes coolant hose assemblies 2.91 and coolant pipe assemblies 2.95, said gas-wind turbine engine 1.00 comprising: an engine housing system, an air pressure sensor 2.19, an engine fan assembly having an engine fan 2.12, an air filtering system 3.71 or a plurality of air filtering system 3.71, an air compressing system or a plurality of air compressing system, at least one combustor 4.00, at least one compressed air delivery means, at least one compressed air receiving means 3.50, a fuel system, an electrical system having a fuel and air mixture ignition system with at least one fuel and air mixture ignition means 4.50, at least one exhaust gas duct housing 4.25 having an exhaust gas duct 4.20, at least one gas-wind turbine engine rotor assembly, a lubricating system, a power shaft means, gas-wind turbine engine accessories, a plurality of bearing means assembly 9.00, a first space 1.41, a second space 1.42, a third space 1.43, a plurality of exhaust gas pressure sealing means, a plurality of oil sealing means, clamp 6.00, belt 1.52, bracket 1.54, a belt tension maintaining system 4.83, fastening system having fasteners 9.30, air pipe assemblies 1.25, air hose assemblies 1.27, gears 1.90, an optional wind turbine assembly having a wind turbine rotor 8.10, gas-wind turbine engine various parts, and a drive system or a plurality of drive system for operating said gas-wind turbine engine various parts, said gas-wind turbine engine various parts includes one or more of the following: an electric generating system or a plurality of electric generating system, an air pressure sensor 2.19, a starting system, a liquid cooling pump 2.92, an air compressing system which includes one or more external air compressing system, an air conditioning system having an air conditioning system compressor 7.70, transmission 8.00, a first cooling fan 9.80 or a second cooling fan 9.90, a hydraulic pump 5.70, at least one idler pulley 4.81, at least one first pulley 4.82, an oil pump 7.10, at least one first electric motor 8.80, at least one second electric motor 8.90, a wind turbine rotor 8.10, an electrically operated fan, and other gas-wind turbine engine accessories, said fuel system includes: a fuel tank 4.40, a fuel pump 4.45, fuel line assemblies 4.47, a fuel flow controlling means, and at least one fuel delivery means 4.30, said oil sealing means includes a plurality of oil seals 6.82, said external air compressing system could be in a form of auxiliary air compressing system and an optional booster air compressing system, said auxiliary air compressing system either be belt driven or driven by said first electric motor 8.80 and said optional booster air compressing system either be belt driven or driven by said second electric motor 8.90, said auxiliary air compressing system having communicating means with an air filtering system 3.71, said booster air compressing system compresses air from said auxiliary air compressing system, said combustor 4.00 includes a combustor housing 4.10, said engine housing system having communicating means with the air filtering system 3.71, said air filtering system 3.71 includes: at least one air filtering element 3.72, at least one air filtering housing 3.73, and air filtering system accessories, said gas-wind turbine engine rotor assembly includes a gas-wind turbine engine rotor 6.10 and a gas-wind turbine engine main shaft 6.50, said gas-wind turbine engine main shaft 6.50 having a first rotation axis 1.10, during the operation of said gas-wind turbine engine 1.00 said gas-wind turbine engine rotor 6.10 and said gas-wind turbine engine main shaft 6.50 rotates on said first rotation axis 1.10 of said gas-wind turbine engine main shaft 6.50, said electric generating system includes an alternator 7.40 and includes an electric generator 7.50 as an option, said electric generator 7.50 having supports 7.55, said electric generator 7.50 could be replaced with a combination unit with starting capability and electric generating capability, said starting system includes a starter 7.60, said lubricating system includes at least one oil pump assembly 7.00, oil line assemblies 6.70, oil hose assemblies 6.95, and lubricating system accessories, said lubricating system accessories includes oil containment unit 8.50 and at least one oil cooler, said lubricating system could be a known lubricating system adapted to said gas-wind turbine engine 1.00, said lubricating system includes: an oil pump assembly 7.00 having an oil pump 7.10, a known relief valve, strainer 7.20, and oil duct 7.30, said first cooling fan 9.80 or said second cooling fan 9.90 are gas-wind turbine engine main shaft 6.50 mounted system, said first cooling fan 9.80 or said second cooling fan 9.90 as an alternative could be substituted with an electrically operated fan, said starter 7.60 in other configuration of the present invention includes a flywheel 7.90 and includes a flywheel housing 7.80, said air compressing system is an air pump which supplies air for one or more of the following: engine cooling, air sealing means, and air for the combustion of the air and fuel mixture in said combustor 4.00, said fuel and air mixture ignition means 4.50 is attached to said combustor housing 4.10 or attached to said exhaust gas duct housing 4.25 or attached to other suitable location, said air cooling system includes air passages 1.21 and air spaces as a means to cool parts of said gas-wind turbine engine 1.00, said electric generating system and said starting system may come as one unit or as separate units, said fuel delivery means 4.30 having communicating means with a fuel system, said fuel delivery means 4.30 could be an optional multi-nozzle system, said compressed air delivery means includes air pipe assemblies 1.25 and air hose assemblies 1.27, said air pipe assemblies 1.25 and said air hose assemblies 1.27 are interchangeable;

wherein the engine housing system is adapted for a low bypass air flow engine configuration, said low bypass air flow engine configuration includes zero bypass air flow engine configuration, said engine housing system consist either a first part 1.31 and a second part 1.32 or an engine first housing 1.17, an engine second housing 1.18, and an engine third housing 1.19, said engine housing system includes: an engine fan housing assembly, a core shell 2.20, first guide vanes 2.50, at least one gas-wind turbine engine rotor housing 2.30, a plurality of bearing means assembly housing 9.70, fourth guide vanes 2.40, a gas-wind turbine engine supporting means, a mixture flow duct 9.20, and exhaust gas manifold 9.25, in other configuration of the present invention some of said bearing means assembly housing 9.70 is incorporated with said gas-wind turbine engine rotor housing 2.30, during the operation of a gas-wind turbine engine said engine fan housing assembly and the engine fan assembly generates an usable air flow 1.20 for air cooling hot parts of said gas-wind turbine engine 1.00 and for additional torque for said gas-wind turbine engine 1.00, said first guide vanes 2.50 directs said usable air flow 1.20, said gas-wind turbine engine rotor housing 2.30 includes a second space 1.42, said second space 1.42 is located at said gas-wind turbine engine rotor housing 2.30 of said engine housing system, said first guide vanes 2.50, said first space 1.41, said gas-wind turbine engine rotor housing 2.30, said fourth guide vanes 2.40, and said third space 1.43 allows said usable air flow 1.20 from said engine fan housing assembly and the engine fan assembly to said mixture flow duct 9.20 and eventually to said exhaust gas manifold 9.25, said first space 1.41 in one of the present invention configuration having a space between said gas-wind turbine engine rotor housing 2.30 and said first guide vanes 2.50, said engine housing system having communicating means with said air filtering system 3.71, said air filtering system 3.71 includes: at least one air filtering element 3.72, at least one air filtering element housing 3.73, and air filtering accessories, in one configuration of the present invention said air filtering housing allows proper installation of an second cooling fan 9.90, said engine fan housing assembly includes an engine fan housing 2.11 and an engine fan shroud 2.13, said engine fan shroud 2.13 attached to said engine fan housing 2.11;

wherein the engine fan assembly having an engine fan 2.12, said engine fan 2.12 includes an engine fan hub 2.15 and an engine fan shaft 2.14, said engine fan hub 2.15 includes a plurality of engine fan blades 2.18, said plurality of engine fan blades 2.18 attached to said engine fan hub 2.15, said engine fan hub 2.15 attached to said engine fan shaft 2.14, during operation and during idle times of said gas-wind turbine engine 1.00 the first guide vanes 2.50, the bearing means assembly housing 9.70, and the bearing means assembly 9.00 maintain rotational stability of the engine fan shaft 2.14 while the first guide vanes 2.50, the fourth guide vanes 2.40, the bearing means assembly housing 9.70 and the bearing means assembly 9.00 maintains rotational stability of the gas-wind turbine engine main shaft 6.50, said first guide vanes 2.50 and said fourth guide vanes 2.40 could each be configured to include an oil duct 7.30 for said bearing means assembly 9.00, said oil duct 7.30 which includes return oil duct and feed oil duct are oil spaces along said first guide vanes 2.50, oil spaces along said fourth guide vanes 2.40, and oil spaces along other parts of said gas-wind turbine engine 1.00, said oil duct 7.30 are complimented by the oil line assemblies 6.70 and the oil hose assemblies 6.95 which carries the oil to and from said bearing means assembly 9.00, said oil line assemblies 6.70 and said oil hose assemblies 6.95 are interchangeable, said oil duct 7.30, said oil line assemblies 6.70, and said oil hose assemblies 6.95 communicates with the lubricating system;

wherein the combustor 4.00 is designed to generate exhaust gas flow 4.70 during a gas-wind turbine engine 1.00 operation, said exhaust gas flow 4.70 is known as a result of the movement of gases when fuel and air mixture is ignited, said combustor 4.00 includes: a combustor housing 4.10, a combustion chamber 4.11, swirl vanes 4.12, and in other configuration of said combustor 4.00 includes a liner 4.13 and a combustor seal 4.17, said liner 4.13 and said combustor seal 4.17 are known aviation related system adapted for the gas-wind turbine engine 1.00, said exhaust gas flow 4.70 goes through the exhaust gas duct 4.20, said combustor housing 4.10 includes an air duct 5.15, said combustor housing 4.10 could either be cooled by one or more of the following: liquid cooling, compressed air cooling, usable air flow 1.20 cooling or other air flow cooling, said combustor 4.00 having communicating means with: a fuel delivery means 4.30, one or more fuel and air mixture ignition means 4.50, and an air compressing system;

wherein the air compressing system is either an internal compressing system or an external air compressing system or having both an external air compressing system and internal compressing system, said internal compressing system is a known air compressing system, said external compressing system comes in other form which includes the present invention auxiliary air compressing system, said auxiliary air compressing system includes an optional booster air compressing system, said air compressing system having a known air bleeding system, the compressed air delivery means to a combustor 4.00 from an external air compressing system uses one or more of: air pipe assembly 1.25 and air hose assemblies 1.27 or with other suitable means;

wherein the gas-wind turbine engine rotor assembly includes a gas-wind turbine engine rotor 6.10 and a gas-wind turbine engine main shaft 6.50, said a gas-wind turbine engine rotor 6.10 having a gas-wind turbine engine rotor hub 6.20, said gas-wind turbine engine rotor hub 6.20 includes a plurality of gas-wind turbine engine rotor blades 6.60, a plurality of exhaust gas pressure ring hub groove 6.40, and a plurality of oil ring hub groove 6.26, said exhaust gas pressure ring hub groove 6.40 having an exhaust gas pressure ring hub groove inner periphery 6.45, said oil ring hub groove 6.26 having oil ring hub groove inner periphery 6.29, said exhaust gas pressure ring hub groove 6.40 is adapted for an exhaust gas pressure sealing means while said oil ring hub groove 6.26 is adapted for an oil sealing means, said plurality of gas-wind turbine engine rotor blades 6.60 are attached to said gas-wind turbine engine rotor hub 6.20, said gas-wind turbine engine rotor hub 6.20 is attached to a gas-wind turbine engine main shaft 6.50, said gas-wind turbine engine rotor blades 6.60 extends in an outwardly manner from said gas-wind turbine engine rotor hub 6.20, said gas-wind turbine engine rotor blades 6.60 may just be some extensions with different configuration from said gas-wind turbine engine rotor hub 6.20, said gas-wind turbine engine rotor blades 6.60 could be of any other suitable known shape, said gas-wind turbine engine rotor blades 6.60 could be made of different material as compared to the gas-wind turbine engine rotor hub 6.20 or said gas-wind turbine engine rotor blades 6.60 could be made of same material as said gas-wind turbine engine rotor hub 6.20, said plurality of gas-wind turbine engine rotor blades 6.60 spaced substantially equally on said gas-wind turbine engine rotor hub 6.20, at least one gas-wind turbine engine rotor blade 6.60 from said plurality of gas-wind turbine engine rotor blades 6.60 includes: second tip 6.65, second root 6.64, second leading edge 6.66, and second trailing edge 6.67, during the operation of said gas-wind turbine engine 1.00 said gas-wind turbine engine rotor blades 6.60, said gas-wind turbine engine rotor 6.10, and said gas-wind turbine engine main shaft 6.50 are moved to rotate on said first rotation axis 1.10 of said gas-wind turbine engine main shaft 6.50 by the exhaust gas flow 4.70 from the combustor 4.00 and additionally said gas-wind turbine engine rotor blades 6.60, said gas-wind turbine engine rotor 6.10, and said gas-wind turbine engine main shaft 6.50 are moved to rotate on said first rotation axis 1.10 of said gas-wind turbine engine main shaft 6.50 by the usable air flow 1.20 from the engine fan housing assembly and the engine fan assembly;

wherein the gas-wind turbine engine rotor housing 2.30 allows installation of required parts of the gas-wind turbine engine 1.00 into said gas-wind turbine engine rotor housing 2.30, said required parts includes the gas-wind turbine engine rotor assembly, said gas-wind turbine engine rotor housing 2.30 allows the gas-wind turbine engine main shaft 6.50 and the gas-wind turbine engine rotor 6.10 to rotate, said gas-wind turbine engine rotor housing 2.30 having walls 2.41, at least two housing gaps 2.42, at least one exhaust gas duct opening 2.43, and gas-wind turbine engine rotor assembly space, said gas-wind turbine engine rotor assembly space includes a second space 1.42, said second space 1.42 specifically allows said gas-wind turbine engine rotor 6.10 to rotate, the exhaust gas duct housing 4.25 is attached to said gas-wind turbine engine rotor housing 2.30 so that said exhaust gas flow 4.70 be allowed to move in to a part of said second space 1.42 at said gas-wind turbine engine rotor housing 2.30, said walls 2.41 includes a first wall 2.44, a second wall 2.45, and a third wall 2.46, said first wall 2.44, said second wall 2.45, and said third wall 2.46 could be made of different sections and assembled together, said exhaust gas duct housing 4.25 is directly or indirectly attached to said gas-wind turbine engine rotor housing 2.30 or attached either to: said first wall 2.44, said second wall 2.45, said third wall 2.46, or attached to any suitable combination of said first wall 2.44, said second wall 2.45, and said third wall 2.46 so that said exhaust gas flow 4.70 be allowed to move in to a part of said second space 1.42 of said gas-wind turbine engine rotor housing 2.30, in one configuration of the present invention said housing gap 2.42 at the second wall 2.45 being wider than the housing gap 2.42 at the first wall 2.44 are designed so that said exhaust gas flow 4.70 goes through said housing gap 2.42 at the second wall 2.45, said exhaust gas duct opening 2.43 on said third wall 2.46 are to be adjacent to said first wall 2.44 and adjacent to said second wall 2.45, at one point or more points of said gas-wind turbine engine rotor housing 2.30 said first wall 2.44, said second wall 2.45, and said third wall 2.46 are adjacent to each other, in other configuration of the present invention said gas-wind turbine engine rotor housing 2.30 are designed with air passages 1.21, some of said air passages 1.21 at said second wall 2.45 having communicating means with an air bleeding system, a number of said air passages 1.21 are used to cool said second wall 2.45 of said gas-wind turbine engine rotor housing 2.30 or used to cool another gas-wind turbine engine rotor housing, said gas-wind turbine engine rotor housing 2.30 having sufficient clearance from said gas-wind turbine engine rotor 6.10, by design and during the operation of said gas-wind turbine engine 1.00 the combustor 4.00 generates an exhaust gas flow 4.70, said exhaust gas flow 4.70 goes through the exhaust gas duct 4.20, said gas-wind turbine engine rotor housing 2.30 allows said exhaust gas flow 4.70 to push the gas-wind turbine engine rotor blades 6.60 and rotates said gas-wind turbine engine rotor 6.10 and also rotates the gas-wind turbine engine main shaft 6.50 is an operation which creates torque for said gas-wind turbine engine 1.00 to do work, said gas-wind turbine engine rotor housing 2.30 further allows the usable air flow 1.20 from the engine fan housing assembly to flow through said housing gaps 2.42 at said first wall 2.44 and at said second wall 2.45 of said gas-wind turbine engine rotor housing 2.30 to cool said gas-wind turbine engine rotor blades 6.60 of said gas-wind turbine engine rotor 6.10 and the process of cooling said gas-wind turbine engine rotor blades 6.60, said usable air flow 1.20 which is moving as wind additionally pushes said gas-wind turbine engine rotor 6.10 to rotate and therefore adds more torque to said gas-wind turbine engine 1.00, said usable air flow 1.20 exits said gas-wind turbine engine rotor housing 2.30 through said second wall 2.45 and said usable air flow 1.20 drives the wind turbine rotor 8.10 when the gas-wind turbine engine 1.00 includes a wind turbine assembly and said usable air flow 1.20 eventually be at said mixture flow duct 9.20 and out to the exhaust gas manifold 9.25, said gas-wind turbine engine rotor housing 2.30 also allows said exhaust gas flow 4.70 to move from said gas-wind turbine engine rotor housing 2.30, said walls 2.41 of said gas-wind turbine engine rotor housing 2.30 guides said exhaust gas flow 4.70 to said gas-wind turbine engine rotor blades 6.60 and said exhaust gas flow 4.70 pushes said gas-wind turbine engine rotor blades 6.60 and rotates said gas-wind turbine engine rotor 6.10 and further rotates said gas-wind turbine engine main shaft 6.50 on a first rotation axis 1.10 of said gas-wind turbine engine rotor main shaft 6.50, said walls 2.41 and said gas-wind turbine engine rotor blades 6.60 prevents most of said exhaust gas flow 4.70 from escaping to the mixture flow duct 9.20 until said exhaust gas flow 4.70 reaches said housing gap 2.42 at said second wall 2.45 of said gas-wind turbine engine rotor housing 2.30 and said exhaust gas flow 4.70 exits said gas-wind turbine engine rotor housing 2.30 through said housing gap 2.42 at said second wall 2.45 and said exhaust gas flow 4.70 drives said wind turbine rotor 8.10 when the gas-wind turbine engine 1.00 includes a wind rotor assembly and said exhaust gas flow 4.70 be at said mixture flow duct 9.20 and out to the exhaust gas manifold 9.25, the oil duct 7.30 are oil spaces along the first guide vanes 2.50 and fourth guide vanes 2.40 or other oil duct 7.30 at said gas-wind turbine engine rotor housing 2.30, said oil duct 7.30 is complimented with oil line assemblies 6.70 and oil hose assemblies 6.95 or other suitable means which carries the oil to and from said bearing means assembly 9.00;

wherein the exhaust gas flow 4.70 from a combustor 4.00 moves to a space of the gas-wind turbine engine rotor housing 2.30, said exhaust gas flow 4.70 also moves between at least two gas-wind turbine engine rotor blades 6.60 of a gas-wind turbine engine rotor 6.10, the movement of said exhaust gas flow 4.70 at said gas-wind turbine engine rotor housing 2.30 of said engine housing system rotates said gas-wind turbine engine rotor 6.10 and rotates the gas-wind turbine engine main shaft 6.50;

wherein the usable air flow 1.20 in motion pushes the gas-wind turbine engine rotor blades 6.60 and rotates the gas-wind turbine engine rotor 6.10 on the first rotation axis 1.10 of a gas-wind turbine engine main shaft 6.50 which adds torque to the gas-wind turbine engine 1.00, said usable air flow 1.20 also maintains an acceptable operating temperature of said gas-wind turbine engine rotor 6.10 and additionally helps maintain an acceptable operating temperature of said gas-wind turbine engine 1.00;

wherein the lubricating system having communicating means with a bearing means assembly 9.00, said lubricating system supplies oil for cooling and lubrication of the plurality of bearing means assembly 9.00, said lubricating system having communicating means with said bearing means assembly 9.00 of an external air compressing system, said lubricating system includes at least one oil pump assembly 7.00 and lubricating system accessories, said lubricating system accessories includes oil containment unit 8.50, oil line assemblies 6.70, and includes an oil cooler, the first guide vanes 2.50 could be used as an oil cooler, said oil pump assembly 7.00 includes an oil pump 7.10;

wherein the bearing means assembly 9.00 is supported by the bearing means assembly housing 9.70, said bearing means assembly includes bearings 9.10 and bearing means assembly accessories, said bearings 9.10 could be in the form of ball bearings 9.15, tapered roller bearings 9.16, cylindrical roller bearings 9.17, journal bearings 9.60, and other suitable form of bearings 9.10, said bearing means assembly 9.00 prevents too much axial movement and prevents too much radial movement of a shaft in relation to the bearing means assembly housing 9.70, in one configuration of the present invention said bearing means assembly accessories includes: spacers 9.11, inserts 1.80, keys 5.60, O-ring 5.65, hearing retainers 5.55, and oil seals 6.82, said bearing retainer 5.55 and said bearing means assembly housing 9.70 maintains the proper bearing 9.10 position, said bearing retainer 5.55 could be a known system which prevents said bearings from moving out of place, said bearing retainer 5.55 could be in the form of tabbed and threaded fasteners, said bearing retainer 5.55 works with the compliment of a tab lock 5.56, said spacers 9.11 are designed to transfer the axial load from a shaft to said bearing 9.10 or said spacers transfers axial load from said bearing 9.10 to another bearing 9.10, said spacer is designed to transfer the axial load from said insert 1.80 to said bearings 9.10 while and said bearing retainer 5.55 are designed to transfer the axial load from said bearings 9.10 to said bearing means assembly housing 9.70, said insert 1.80 allow easy disassembly or separation of the gas-wind turbine engine main shaft 6.50 from said bearing means assembly 9.00 in slip-out method, said insert 1.80 also allow less damage to said bearing means assembly 9.00 in the insertion of said gas-wind turbine engine main shaft 6.50 in a slip-in assembly process, said insert 1.80 is keyed or geared and retained to the bearings 9.10 at the gas-wind turbine engine rotor housing 2.30, said insert 1.80 having an inner diameter preferably in a gear form which fits to a specially designed gas-wind turbine engine main shaft 6.50 with a matching gear form so that said insert 1.80 and the gas-wind turbine engine main shaft 6.50 could be assembled together and rotates together during the operation of said gas-wind turbine engine 1.00, said insert 1.80 makes it possible for less complicated insertion of said gas-wind turbine engine main shaft 6.50 to said bearing means assembly 9.00 at said gas-wind turbine engine rotor housing 2.30 or said insert 1.80 makes it possible for less complicated withdrawal of said gas-wind turbine engine main shaft 6.50 from said bearing means assembly 9.00 at said gas-wind turbine engine rotor housing 2.30, said gas-wind turbine engine main shaft 6.50 or other shaft of the gas-wind turbine engine 1.00 is prevented from moving axially by said insert 1.80 and said insert 1.80 is prevented from moving axially by said bearings 9.10 and fasteners, a similar insert 1.80 are adapted to a bearings means assembly 9.00 of an air compressing system, said bearing means assembly 9.00 having communicating means with a lubricating system, said bearing means assembly 9.00 during said gas-wind turbine engine 1.00 operation or during idle times supports for rotation one or more of the following: engine fan shaft 2.14, gas-wind turbine engine main shaft 6.50, auxiliary air compressor shaft 3.68, and booster air compressor shaft 3.90, said insert 1.80 are to be secured to the said gas-wind turbine engine main shaft 6.50 so that said insert 1.80 rotates with said gas-wind turbine engine main shaft 6.50 and said insert 1.80 proper position is maintained in relation to said bearings 9.10 and in relation to said gas-wind turbine engine main shaft 6.50 or said insert 1.80 are to be secured to other shaft related to said gas-wind turbine engine 1.00 or secured to the auxiliary compressor shaft 3.68 or secured to the booster compressor shaft 3.90 so that said insert 1.80 rotates with said other shaft or rotates with said auxiliary compressor shaft 3.68 or rotates with said booster compressor shaft 3.90 and said insert 1.80 proper position is maintained in relation to said bearings 9.10 and in relation to said other shaft or in relation to said auxiliary compressor shaft 3.68 or in relation to said booster compressor shaft 3.90, said bearing means assembly 9.00 could be substituted with other known form of bearing means assembly 9.00;

wherein the bearing means assembly housing 9.70 supports one bearing 9.10 or supports a plurality of bearings 9.10, said bearing means assembly housing 9.70 in one present invention configuration includes a housing oil bypass 5.40, said housing oil bypass 5.40 is a groove along said bearing means assembly housing 9.70, said housing oil bypass 5.40 allows proper circulation of oil at the bearing means assembly housing 9.70, said bearing means assembly housing 9.70 and said bearings 9.10 in another present invention configuration includes a matching groove for a key 5.60, said key 5.60 prevents said bearings 9.10 from damaging said bearing means assembly housing 9.70;

wherein a power shaft means is a system in which the engine fan shaft 2.14 and a gas-wind turbine engine main shaft 6.50 is a single continuous shaft or in other present invention configuration said engine fan shaft 2.14 and said gas-wind turbine engine main shaft 6.50 are separate shafts but said engine fan shaft 2.14 and said gas-wind turbine engine main shaft 6.50 communicates with one another;

wherein the liquid cooling system is a known engine configuration, said liquid cooling system accessories includes an electrically operated fan or gas-wind turbine engine shaft mounted fan, liquid cooling passageways 2.93, coolant hose assemblies 2.91, coolant pipe assemblies 2.95, and liquid cooling spaces 2.94, said liquid cooling passageways 2.93 and liquid cooling spaces 2.94 are located at the following: the walls 2.41 of the gas-wind turbine engine rotor housing 2.30, the combustor housing 4.10, and the exhaust gas duct housing 4.25, said liquid cooling passageways 2.93, said coolant hoses assemblies 2.91, coolant pipe assemblies 2.95, and said liquid cooling spaces 2.94 communicates with said liquid cooling pump 2.92, said coolant hoses assemblies 2.91 and coolant pipe assemblies 2.95 are interchangeable, said liquid cooling passageways 2.93 and said liquid cooling spaces 2.94 are used for cooling other parts of the gas-wind turbine engine 1.00 with a liquid cooling system, said liquid cooling passageways 2.93 and said liquid cooling spaces 2.94 are designed so that liquid cooling medium could flow in and flow out, said liquid cooling medium maybe plain water or water mixed with other substances which includes anti-freeze chemicals.

6. A gas-wind turbine engine 1.00 according to the third disclosure wherein the engine housing system includes at least one wind turbine rotor assembly, said engine housing system is adapted for said wind turbine rotor assembly, said wind turbine rotor assembly includes at least one wind turbine rotor 8.10, said wind turbine rotor 8.10 having a wind turbine rotor hub 8.20, said wind turbine rotor hub 8.20 includes a plurality of wind turbine rotor blades 8.30, each of the wind turbine rotor blades 8.30 having a sixth root 8.36, sixth tip 8.37, sixth section 8.31, sixth leading edge 8.32, a sixth trailing edge 8.33, and a substantially straight sixth line 8.34, said wind turbine rotor blades 8.30 are attached to said wind turbine rotor hub 8.20, said wind turbine rotor hub 8.20 is attached to a gas-wind turbine engine main shaft 6.50, during the operation of said gas-wind turbine engine 1.00 said wind turbine rotor blades 8.30 are pushed by the usable air flow 1.20 from the engine fan housing assembly and engine fan assembly, additionally said wind turbine rotor blades 8.30 are moved by the exhaust gas flow 4.70 which went through the gas-wind turbine engine rotor housing 2.30, said exhaust gas flow 4.70 which initially from the combustor 4.00 passes through the exhaust gas duct 4.20 of an exhaust gas duct housing 4.25 and said exhaust gas flow 4.70 moves in to said gas-wind turbine engine rotor housing 2.30 and to the vicinity of said wind turbine rotor 8.10 to push said wind turbine rotor blades 8.30 to rotate said wind turbine rotor 8.10 on the first rotation axis 1.10 of said gas-wind turbine engine main shaft 6.50 and the process generates additional torque for said gas-wind turbine engine 1.00, said usable air flow 1.20 and said exhaust gas flow 4.70 to said wind turbine rotor 8.10 are directed by the fourth guide vanes 2.40, said wind turbine rotor blades 8.30 when cut by a radial arc 1.70 generates said sixth section 8.31, said radial arc 1.70 having a center which substantially lies at said first rotation axis 1.10 of said gas-wind turbine engine main shaft 6.50 or lies about said first rotation axis 1.10 of said gas-wind turbine engine main shaft 6.50, said sixth section 8.31 lies between twenty and eighty percent of the wind turbine rotor blade length 600, said wind turbine rotor blade length 600 is the distance between the sixth root 8.36 and the sixth tip 8.37, said distance is measured along a sixteenth line, said sixteenth line is about perpendicular to said first rotation axis 1.10, said sixteenth line intersects said sixth root 8.36 and said the sixth tip 8.37, when a substantially straight sixth line 8.34 connects the sixth leading edge 8.32 and the sixth trailing edge 8.33 of said sixth section 8.31, said sixth line 8.34 forms a sixth angle 8.35 with the sixth plane 1.16, said sixth plane 1.16 substantially lies along said first rotation axis 1.10 of said gas-wind turbine engine main shaft 6.50 and intersects said sixth line 8.34, said sixth angle 8.35 measured perpendicularly from said sixth plane 1.16 is within about zero degree and forty degrees from said sixth plane 1.16.

7. A gas-wind turbine engine 1.00 according to third disclosure wherein each of the gas-wind turbine engine rotor blades 6.60 includes second root 6.64, the second tip 6.65, second leading edge 6.66, a second trailing edge 6.67, second blade length 200, a substantially straight second line 6.63, and a second section 6.61, said second section 6.61 is generated when said gas-wind turbine engine rotor blade 6.60 is cut by a radial arc 1.70, said radial arc 1.70 cuts said gas-wind turbine engine rotor blade 6.60 between twenty and eighty percent of the gas-wind turbine engine rotor blade length 200, said second blade length 200 is the distance between the second root 6.64 and the second tip 6.65, said distance is measured along a twelfth line, said twelfth line is about perpendicular to the first rotation axis 1.10, said twelfth line intersects said second root 6.64 and intersects said second tip 6.65, in a fully assembled gas-wind turbine engine 1.00 said radial arc 1.70 having a center which substantially lies at said first rotation axis 1.10 of the gas-wind turbine engine main shaft 6.50 or lies about said first rotation axis 1.10 of the gas-wind turbine engine main shaft 6.50, when said substantially straight second line 6.63 connects the second leading edge 6.66 and said second trailing edge 6.67 of said second section 6.61 said substantially straight second line 6.63 forms a second angle 6.69 with the second plane 1.12, said second plane 1.12 substantially lies along said first rotation axis 1.10 of said gas-wind turbine engine main shaft 6.50 and intersects said second line 6.63, said second angle 6.69 measured perpendicularly from said second plane 1.12 is within about zero degree and forty degrees from said second plane 1.12.

8. A gas-wind turbine engine 1.00 according to the third disclosure wherein the gas-wind turbine engine assembly includes a plurality of exhaust gas pressure sealing means, said exhaust gas pressure sealing means works in complementary relationship with the gas-wind turbine engine rotor housing 2.30, said plurality of exhaust gas pressure sealing means includes a plurality of exhaust gas pressure ring hub groove 6.40 and a plurality of exhaust gas pressure ring assembly, said exhaust gas pressure ring hub groove 6.40 and said plurality of exhaust gas pressure ring assembly located at a gas-wind turbine engine rotor hub 6.20, each of said exhaust gas pressure ring hub groove 6.40 is adapted for an exhaust gas pressure ring assembly, said exhaust gas pressure ring assembly includes an exhaust gas pressure ring 6.30 and at least one exhaust gas pressure ring spring 6.34, said exhaust gas pressure ring 6.30 having at least one exhaust gas pressure ring extension 6.35, exhaust gas pressure ring outer periphery 6.38, exhaust gas pressure ring inner periphery 6.32, an exhaust gas pressure ring heat expansion gap 6.36, slip joint 3.30, exhaust gas pressure ring radial center 6.48, and an optional exhaust gas pressure ring radial oil channel 6.33, said optional exhaust gas pressure ring radial oil channel 6.33 having a exhaust gas pressure ring radial oil channel center 6.31, said exhaust gas pressure ring heat expansion gap 6.36 having oil sealing feature, said exhaust gas pressure sealing means prevents the exhaust gas pressure from contaminating the oil at the bearing means assembly 9.00 of said gas-wind turbine engine 1.00, said exhaust gas pressure ring heat expansion gap 6.36 preferably located adjacent to said exhaust gas pressure ring extension 6.35 or off the exhaust gas pressure ring extension 6.35 for simplicity, said exhaust gas pressure ring heat expansion gap 6.36 is designed to retain any residual oil for lubrication of the substantial pathway for said exhaust gas pressure ring 6.30 on said gas-wind turbine engine rotor housing 2.30, said exhaust gas pressure ring heat expansion gap 6.36 communicates with said gas-wind turbine engine rotor housing 2.30, said exhaust gas pressure ring extension 6.35 extends from the exhaust gas pressure ring outer periphery 6.38, said exhaust gas pressure ring extension 6.35 may extend at the exhaust gas pressure ring inner periphery 6.32 as a variation, said exhaust gas pressure ring extension 6.35 having designated space at said exhaust gas pressure ring hub groove 6.40 so that the exhaust gas pressure ring 6.30 rotates with said gas-wind turbine engine rotor hub 6.20 of the gas-wind turbine engine rotor 6.10 during said gas-wind turbine engine 1.00 operation, said exhaust gas pressure ring inner periphery lowest point and adjacent section of said exhaust gas pressure ring inner periphery 6.32 are to be adjacent to an oil duct 7.30 at said gas-wind turbine engine rotor housing 2.30 when said gas-wind turbine engine 1.00 is sitting at a level position so that the oil could be drained out, said exhaust gas pressure ring inner periphery 6.32 further are to be substantially in contact with the exhaust gas pressure ring hub groove inner periphery 6.45 of said exhaust gas pressure ring hub groove 6.40, said exhaust gas pressure ring spring 6.34 in one of the present invention configuration includes an exhaust gas pressure ring spring extension 6.37 which fits into an exhaust gas pressure ring hub groove 6.40 designed for the said exhaust gas pressure ring spring extension 6.37, said exhaust gas pressure ring spring extension 6.37 allows the exhaust gas pressure ring spring 6.34 to rotate with said gas-wind turbine engine rotor 6.10, said exhaust gas pressure ring spring 6.34 is designed to push the exhaust gas pressure ring 6.30 against said gas-wind turbine engine rotor housing 2.30, said exhaust gas pressure ring 6.30 may include an optional exhaust gas pressure ring radial oil channel 6.33 for more efficient lubrication of the pathway of said exhaust gas pressure ring 6.30, said optional exhaust gas pressure ring radial oil channel 6.33 having an exhaust gas pressure ring radial oil channel center 6.31, said optional exhaust gas pressure ring radial oil channel 6.33 is equidistant to said exhaust gas pressure ring radial center 6.48 of said exhaust gas pressure ring 6.30, in a fully assembled gas-wind turbine engine 1.00 said exhaust gas pressure ring radial oil channel center 6.31 and said exhaust gas pressure ring radial center 6.48 substantially lies about the first rotation axis 1.10 of the gas-wind turbine engine main shaft 6.50, said optional exhaust gas pressure ring radial oil channel 6.33 communicates with said gas-wind turbine engine rotor housing 2.30 and said optional exhaust gas pressure ring radial oil channel 6.33 communicates with said exhaust gas pressure ring expansion gap 6.36, in one configuration of the present invention includes at least one or more said exhaust gas pressure ring assembly adjacent to each other in a measure to prevent too much oil loss, said exhaust gas pressure ring spring 6.34 could be made in other form which includes a ring with a plurality of exhaust gas pressure ring spring pusher leg 6.39 extending from said exhaust gas pressure ring spring 6.34, said exhaust gas pressure ring spring 6.34 includes exhaust gas pressure ring spring pusher legs 6.39 and coil springs 6.81.

9. A gas-wind turbine engine 1.00 according to the third disclosure wherein the gas-wind turbine engine rotor assembly includes a plurality of oil sealing means, said oil sealing means works in complementary relationship with the gas-wind turbine engine rotor housing 2.30, said oil sealing means having a plurality of oil ring 6.80 and a plurality of oil ring hub groove 6.26 located at the gas-wind turbine engine rotor hub 6.20, each of said hub oil ring hub groove 6.26 is adapted for an oil ring assembly, said oil ring assembly having at least one oil ring 6.80 and at least one oil ring spring 6.83, said oil ring 6.80 having at least one oil ring extension 6.84, oil ring outer periphery 6.85, an oil ring heat expansion gap 6.86, slip joint 3.30, oil ring radial center 6.77, and oil ring inner periphery 6.87, said oil ring extension 6.84 fits into the assigned space for the oil ring extension 6.84 at said oil ring hub groove 6.26 of said gas-wind turbine engine rotor hub 6.20 so that said oil ring 6.80 rotates with said gas-wind turbine engine rotor hub 6.20 of the gas-wind turbine engine rotor 6.10 during said gas-wind turbine engine 1.00 operation, said oil ring extension 6.84 located at the oil ring outer periphery 6.85, said oil ring heat expansion gap 6.86 located adjacent to said oil ring extension 6.84 or off the oil ring extension 6.84 for simplicity, said oil ring heat expansion gap 6.86 communicates with the gas-wind turbine engine rotor housing 2.30, said oil ring inner periphery 6.87 further are to be substantially in contact with the oil ring hub groove inner periphery 6.29 of said oil ring hub groove 6.26, said oil ring inner periphery 6.87 communicates with a lubricating system, said oil ring spring 6.83 includes an oil ring spring extension 6.88 which fits into a oil ring hub groove 6.26 for said oil ring spring extension 6.88, said oil ring spring 6.83 which includes oil ring spring pusher leg 6.89 and coil spring 6.81, said oil ring spring 6.83 is designed to push said oil ring 6.80 against said gas-wind turbine engine rotor housing 2.30, said oil ring 6.80 in one of the present invention configuration includes a small groove 3.40 for oil to go through to allow small quantity of oil for lubrication and cooling for the exhaust gas pressure ring 6.30, said small groove 3.40 located adjacent to the oil ring heat expansion gap 6.86, said oil ring 6.80 includes an optional oil ring radial oil channel 6.27 for more efficient lubrication of the pathway of said oil ring 6.80, said optional oil ring radial oil channel 6.27 having an oil ring radial oil channel center 6.75, said oil ring radial oil channel 6.27 is equidistant to said oil ring radial center 6.77 of said oil ring 6.80, in a fully assembled gas-wind turbine engine 1.00 said oil ring radial oil channel center 6.75 and oil ring radial center 6.77 lies about the first rotation axis 1.10 of the gas-wind turbine engine main shaft 6.50, said oil ring radial oil channel 6.27 communicates with said gas-wind turbine engine rotor housing 2.30 and said optional oil ring radial oil channel 6.27 communicates with said oil ring heat expansion gap 6.86, said oil ring spring 6.83 could be made in other form which includes a ring with a plurality of oil ring spring pusher leg 6.89 extending from said oil ring spring 6.83, said oil ring spring 6.83 includes oil spring pusher legs 6.89, oil ring spring extension 6.88, and coil springs 6.81, said oil spring 6.83 could be substituted with a plurality of coil springs 6.81 where each of said coil spring 6.81 located at a through hole 8.60 at the gas-wind rotor hub 6.20, said through hole 8.60 is about parallel to the first rotation axis 1.10.

10. A gas-wind turbine engine 1.00 according to the third disclosure wherein the gas-wind turbine engine rotor housing 2.30 having at least two main parts which consist the first part 1.31 and the second part 1.32, said first part 1.31 and said second part 1. 32 could be separated from each other and attached to each other to allow the installation the gas-wind turbine engine rotor assembly into said gas-wind turbine engine rotor housing 2.30, between the first part 1.31 and the second part 1.32 is a gasket or other suitable part sealing material, said two main parts with a liquid cooling system have known through holes that goes through the gasket for liquid cooling passageway 2.93.

11. A gas-wind turbine engine 1.00 according to third disclosure wherein the auxiliary air compressing system having an auxiliary air compressor 3.60, said auxiliary air compressor 3.60 includes: an auxiliary air compressor housing, an auxiliary air compressor fan 3.63, an auxiliary air compressor fan shroud 3.64, an auxiliary air compressor first stationary vanes assembly 3.65, an auxiliary air compressor second stationary vanes assembly 3.66, an auxiliary air compressor shaft mounted vanes assembly 3.67, an auxiliary air compressor shaft 3.68, and a plurality of bearing means assembly 9.00, said auxiliary air compressor 3.60 having communicating means with an air filtering system 3.71, said air filtering system 3.71 includes at least one filtering element housing 3.73 having a filtering element 3.72, said auxiliary air compressor housing includes: an auxiliary air compressor first housing 3.61, an auxiliary air compressor second housing 3.69, auxiliary air compressor guide vanes 3.62, oil duct 7.30, air convergence zone 1.29, and an air duct 5.15, said auxiliary air compressor first stationary vanes assembly 3.65 and auxiliary air compressor second stationary vanes assembly 3.66 is partly inserted between said auxiliary air compressor shaft mounted vanes assembly 3.67 and said auxiliary air compressor first stationary vanes assembly 3.65 is prevented from moving around by said auxiliary air compressor second stationary vanes assembly 3.66, said auxiliary air compressor first stationary vanes assembly 3.65 is secured or keyed to said auxiliary air compressor first housing 3.61, said auxiliary air compressor second housing 3.69 is attached to said auxiliary air compressor first housing 3.61, said auxiliary air compressing system having an optional booster air compressing system, said booster air compressing system compresses the air from said auxiliary air compressor 3.60, said optional booster air compressing system includes a booster air compressor 3.80, said booster air compressor 3.80 includes: booster air compressor housing, booster air compressor first stationary vanes assembly 3.85, booster air compressor second stationary vanes assembly 3.86, booster air compressor shaft mounted vanes assembly 3.87, booster air compressor shaft 3.90, and a plurality of bearing means assembly 9.00, said booster air compressor housing includes: a booster air compressor first housing 3.88, a booster air compressor second housing 3.89, oil duct 7.30, air convergence zone 1.29, dust cover 3.81, and a plurality of air duct 5.15, said air convergence zone 1.29, said air duct 5.15, the air pipe assembly 1.25, and the compressed air receiving means 3.50 having communicating means with the combustor 4.00, said booster air compressor second housing 3.89 is attached to said booster air compressor first housing 3.88, said booster air compressor first stationary vanes assembly 3.85 and booster air compressor second stationary vanes assembly 3.86 is partly inserted between said booster air compressor shaft mounted vanes assembly 3.87 and said booster air compressor first stationary vanes assembly 3.85 is not allowed to move around by said booster air compressor second stationary vanes assembly 3.86 when said booster air compressor first stationary vanes assembly 3.85 is secured or keyed to said booster air compressor first housing 3.88, said auxiliary air compressing system either be belt driven or driven by the first electric motor 8.80 and said optional booster air compressing system either be belt driven or driven by the second electric motor 8.90.

12. A gas-wind turbine engine 1.00 according to the third disclosure wherein at least one of the fourth guide vanes 2.40 having a fourth root 2.26, a fourth segment 2.27, a fourth leading edge 2.23, a fourth trailing edge 2.24, a fourth guide vanes length 400, a substantially straight fourth line 2.22, and a fourth guide vane section 2.21, said fourth guide vane section 2.21 is generated when said fourth guide vane 2.40 is cut by a radial arc 1.70, said radial arc 1.70 cut the fourth guide vanes 2.40 between twenty percent and eighty percent the fourth guide vanes length 400, said radial arc 1.70 having center which lies about the first rotation axis 1.10 of a gas-wind turbine engine main shaft 6.50, said first guide vane length 400 is the distance between the fourth root 2.26 and the fourth segment 2.27, said distance is measured along a fourteenth line, said fourth line is about perpendicular to the first rotation axis 1.10, said fourteenth line intersects said fourth root 2.26 and said fourth segment 2.27, when said substantially straight fourth line 2.22 connects said fourth leading edge 2.23 and said fourth trailing edge 2.24 of said fourth guide vane section 2.21 said fourth line 2.22 forms a fourth angle 2.25 with a fourth plane 1.14, said fourth plane 1.14 substantially lies along said first rotation axis 1.10 of said gas-wind turbine engine main shaft 6.50 and intersects said fourth line 2.22, said fourth angle 2.25 measured perpendicularly from said fourth plane 1.14 is within about zero degree and sixty degrees from said fourth plane 1.14.

13. A gas-wind turbine engine 1.00 according to the third disclosure wherein each of the first guide vanes 2.50 having a first root 2.56, a first segment 2.57, a first leading edge 2.53, a first trailing edge 2.54, a first guide vanes length 100, a substantially straight first line 2.52, and a first guide vane section 2.51, said first guide vane section 2.51 is generated when said first guide vane 2.50 is cut by a radial arc 1.70, said radial arc 1.70 cut the first guide vanes 2.50 between twenty percent and eighty percent the first guide vanes length 100, said radial arc 1.70 having center which lies about the first rotation axis 1.10 of a gas-wind turbine engine main shaft 6.50, said first guide vane length 100 is the distance between the first root 2.56 and the first segment 2.57, said distance is measured along an eleventh line, said eleventh line is about perpendicular to said first rotation axis 1.10, said eleventh line intersects said first root 2.56 and said first segment 2.57 said first guide vane section 2.51 having a first leading edge 2.53, a first trailing edge 2.54, and a substantially straight first line 2.52, when said substantially straight first line 2.52 connects said first leading edge 2.53 and said first trailing edge 2.54 of said first guide vane section 2.51 said first line 2.52 forms a first angle 2.55 with a first plane 1.11, said first plane 1.11 substantially lies along said first rotation axis 1.10 of said gas-wind turbine engine main shaft 6.50 and intersects said first line 2.52, said first angle 2.55 measured perpendicularly from said first plane 1.11 is within about zero degrees and sixty degrees from said first plane 1.11.

14. A gas-wind turbine engine 1.00 according to the third disclosure wherein the gas-wind turbine engine rotor blade 6.60 having a second leading edge 6.66 and a second trailing edge 6.67 which are substantially parallel to the fifth plane 1.15, said fifth plane 1.15 is perpendicular to the first rotation axis 1.10 of the gas-wind turbine engine main shaft 6.50, said second leading edge 6.66 and said second trailing edge 6.67 joins the second tip 6.65 in a curving manner or other suitable manner, additionally the second space 1.42 of an engine housing system at the gas-wind turbine engine rotor housing 2.30 for said gas-wind turbine engine rotor 6.10 is adapted for said gas-wind turbine engine rotor 6.10 shape to maintain an acceptable clearance between said gas-wind turbine engine rotor 6.10 and said gas-wind turbine engine rotor housing 2.30.

15. A gas-wind turbine engine 1.00 according to the third disclosure wherein the gas-wind turbine engine rotor housing 2.30 includes three major sections, said three major sections are: an engine first housing 1.17 which includes the first wall 2.44, an engine second housing 1.18 which includes a second wall 2.45, and an engine third housing 1.19 which includes a third wall 2.46, said engine third housing 1.19 are assembled between said engine first housing 1.17 and said engine second housing 1.18, said engine first housing 1.17, said engine second housing 1.18, and said engine third housing 1.19 could be separated from each other and attached to each other to allow the installation the gas-wind turbine engine rotor assembly into said gas-wind turbine engine rotor housing 2.30.

As described herein, a gas-wind turbine engine 1.00 is provided which used air cooling and optional liquid cooling. Although various embodiments, are described, the engine 1.00 generally includes the following components: (i) gas-wind turbine engine housing 2.30, (ii) a gas-wind turbine engine rotor 6.10 within the housing, (iii) an air compressor (3.00 or 3.60), (iv) a combustor 4.00, and (v) a cooling fan (e.g. the large fan 5.00 or the engine fan 2.12). The gas-wind turbine engine housing extends longitudinally between a first end and a second end of the gas-wind turbine engine housing. The gas-wind turbine engine housing defines a rotor cavity 1.42 bounded at longitudinally opposing ends by a first wall 2.44 and a second wall 2.45 of the rotor cavity respectively and bounded peripherally by a third wall 2.46 extending longitudinally between the first wall and the second wall. The gas-wind turbine engine rotor 6.10 has a plurality of gas-wind turbine engine rotor blades supported within the rotor cavity of the gas-wind turbine engine housing such that the gas-wind turbine engine rotor is rotatable about a rotor axis 1.10 oriented longitudinally of the gas-wind turbine engine housing. The gas-wind turbine engine housing 2.30 includes a first housing gap 2.42 in communication with the rotor cavity through the first wall 2.44 of the rotor cavity and a second housing gap 2.42 in communication with the rotor cavity through the second wall 2.46 of the rotor cavity. The air compressor (3.00 or 3.60) is powered by rotation of the gas-wind turbine engine rotor to generate a pressurized air flow. The combustor 4.00 receives fuel from a fuel system and receives the pressurized air flow from the air compressor so that the combustor is arranged to combust a fuel and air mixture from the fuel system and the air compressor respectively to generate an exhaust gas flow. The combustor including an exhaust duct 4.70 arranged to direct the exhaust gas flow from the combustor into the rotor cavity, circumferentially of the gas-wind turbine engine rotor. The exhaust duct 4.70 is separate from the first housing gap 2.42 and the second housing gap 2.42 of the gas-wind turbine engine housing. A mixture flow duct 9.20 at the second end of the gas-wind turbine engine housing is in communication with the rotor cavity 1.42 through the second wall 2.45 of the rotor cavity whereby the mixture flow duct is arranged to receive the exhaust gas flow discharged from the gas-wind turbine engine rotor rotating within the gas-wind turbine engine housing. The cooling fan at the first end of the gas-wind turbine engine housing is operatively connected to the gas-wind turbine engine rotor so as to be driven to rotate by rotation of the gas-wind turbine engine rotor whereby the cooling fan generates a cooling fan air flow longitudinally of the gas-wind turbine engine housing. The cooling fan (e.g. the large fan 5.00 or the engine fan 2.12) is in communication with the first housing gap in the first wall of the rotor cavity such that at least a portion of the cooling fan air flow is directed through the rotor cavity 1.42 from the first housing gap in the first wall 2.44 to the second housing gap in the second wall 2.45 whereby (i) the cooling fan air flow partly drives rotation of the gas-wind turbine engine rotor about the rotor axis and (ii) cools the gas-wind turbine engine rotor blades. The second housing gap in the second wall 2.45 of the rotor cavity 1.42 communicates with the mixture flow duct 9.20 whereby the mixture flow duct receives said at least a portion of the cooling fan air flow together with the exhaust gas flow discharged from the gas-wind turbine engine rotor rotating within the gas-wind turbine engine housing.

The first wall 2.44 and the second wall 2.45 of the rotor cavity 1.42 may be parallel to one another.

When the cooling fan comprises a large fan 5.00 received within a large fan housing 5.02, the large fan housing forms a large fan duct surrounding the gas-wind turbine engine housing. In this instance, a second portion of the cooling air flow generated by the large fan is directed externally about the gas-wind turbine engine housing 2.30 from the first end of the gas-wind turbine engine housing to the second end of the gas-wind turbine engine housing whereby the second portion of the cooling air flow generated by the large fan (i) cools gas-wind turbine engine housing and exits the gas-wind turbine engine housing at the second end of the gas-wind turbine engine housing to generate thrust. In this instance, the air compressor may be an internal air compressor 3.00 comprising air compressor fan blades 3.12 rotating within an air compressor housing 3.20 coaxially with the gas-wind turbine engine rotor. The large fan duct of the large fan 5.00 further surrounds the air compressor housing such that the cooling air flow generated by the large fan is directed externally about the air compressor housing.

Alternatively, the cooling fan may comprise an engine fan 2.12 comprising engine fan blades 2.18 rotating within an engine fan shroud 2.13. in which the engine fan shroud is operatively connected to the gas-wind turbine engine housing such that the cooling air flow generated by the engine fan is fully ducted into the rotor cavity 1.42 of the gas-wind turbine engine housing independently of the exhaust gas flow in the exhaust duct 4.70 from the combustor. In this instance, the air compressor is an external auxiliary air compressor 3.60 comprising air compressor fan blades 3.63 rotating within an air compressor housing 3.64. The external auxiliary air compressor can be mechanically connected to the gas-wind turbine engine rotor such that rotation of the air compressor fan blades is mechanically driven by rotation of the gas-wind turbine engine rotor. In this instance, the air compressor may further comprise an external booster air compressor 3.80 connected downstream from the auxiliary air compressor such that the auxiliary air compressor and the booster air compressor collectively generate said pressured air flow directed into the combustor in two stages.

The air compressor may alternatively be driven to rotate by electric motors respectively.

The gas-wind turbine engine 1.00 also includes an air pressure sensor 2.19 in communication with the first space 1.41 in the gas-wind turbine engine housing receiving the cooling air flow from the cooling fan 2.12 at a location upstream from the gas-wind turbine engine rotor 6.10.

The gas-wind turbine engine may further include a wind turbine rotor 8.10 supported within the gas-wind turbine engine housing for rotation coaxially with said rotor axis 1.10. The wind turbine rotor is downstream from the gas-wind turbine engine rotor so as to be driven by said at least a portion of the cooling fan air flow and said exhaust gas flow discharged from the rotor cavity of the gas-wind turbine engine rotor.

Each gas-wind turbine engine rotor blade comprises a length defined between a root and a tip of the blade along a radial axis lying perpendicularly to said rotor axis in which a straight line connected between a leading edge and a trailing edge of the blade lying between zero and forty degrees from a reference plane occupied by said rotor axis and said radial axis of the blade.

The gas-wind turbine engine further includes a bearing assembly rotatably supporting the gas-wind turbine engine rotor relative to the gas-wind turbine engine housing and an oil channel supplying oil to the bearing assembly. In this instance, an exhaust gas pressure sealing means prevents the exhaust gas flow from contaminating the oil of the bearing assembly. More particularly, there may be provided an oil sealing assembly comprising: (i) a plurality of oil ring hub grooves 6.26 located in a rotor hub 6.20 of the gas-wind turbine engine rotor 6.10, (ii) a plurality of oil rings 6.80 received in the oil ring hub grooves respectively, (iii) an oil ring spring 6.83 associated with each oil ring for pushing said oil ring against said gas-wind turbine engine rotor housing, and (iv) an oil ring extension 6.35 at an outer periphery of each oil ring.

In some embodiments, the gas-wind turbine engine housing may further include liquid cooling passageways 2.93 formed in the gas-wind turbine engine housing to receive liquid coolant circulated through the gas-wind turbine engine housing whereby the gas-wind turbine engine uses both air cooling and liquid cooling.

The gas-wind turbine engine housing includes a first part 1.31 and a second part 1.32 joined to one another with a gasket therebetween, the liquid cooling passageways communicating between the first part and the second part to communicate the liquid coolant between the first part and the second part of the gas-wind turbine engine housing, the gasket including through holes in alignment with the liquid cooling passageways communicating between the first part and the second part.

The gas-wind turbine engine housing further comprises a plurality of guide vanes 2.40 supported in communication with the exhaust gas flow between the gas-wind turbine engine rotor 6.10 and the wind turbine rotor 8.10. In this instance, each guide vane has a length defined between a root and a tip of the guide vane along a radial axis lying perpendicularly to said rotor axis, in which a straight line connected between a leading edge and a trailing edge of the guide vane lies between zero and sixty degrees from a reference plane occupied by said rotor axis and said radial axis of the guide vane.

The gas-wind turbine engine housing further comprises a plurality of guide vanes 2.50 supported in communication with the cooling air flow between the engine fan 2.12 and the gas-wind turbine engine rotor 6.10. In this instance, each guide vane has a length defined between a root and a tip of the guide vane along a radial axis lying perpendicularly to said rotor axis, in which a straight line connected between a leading edge and a trailing edge of the guide vane lies between zero and sixty degrees from a reference plane occupied by said rotor axis and said radial axis of the guide vane.

Each gas-wind turbine engine rotor blade 6.60 includes (i) a leading side edge in proximity to the first wall 2.44 of the rotor cavity 1.42, (ii) a trailing side edge in proximity to the second wall 2.45 of the rotor cavity, and (iii) a tip 6.65 in proximity to the third wall 2.45 of the rotor cavity whereby the gas-wind turbine engine rotor blades and the walls of the rotor cavity prevent a majority of said exhaust gas flow from escaping to the mixture flow duct until said exhaust gas flow is displaced circumferentially with the gas-wind turbine engine rotor from the exhaust duct of the combustor to the second housing gap in the second wall of the rotor cavity.

In some embodiments, the gas-wind turbine engine housing 2.30 includes a first housing part which includes the first wall of the rotor cavity, a second housing part which includes the second wall of the rotor cavity, and a third housing part which includes the third wall of the rotor cavity, in which the third housing part is mounted between the first housing part and the second housing part such that the housing parts are readily separable from one another to allow installation of the gas-wind turbine engine rotor into the gas-wind turbine engine housing.

The invention claimed is:

1. A gas-wind turbine engine using air cooling, the engine comprising:
 a gas-wind turbine engine housing extending longitudinally between a first end and a second end of the gas-wind turbine engine housing, the gas-wind turbine engine housing defining a rotor cavity bounded at longitudinally opposing ends by a first wall and a second wall of the rotor cavity respectively and bounded peripherally by a third wall extending longitudinally between the first wall and the second wall;
 a gas-wind turbine engine rotor having a plurality of gas-wind turbine engine rotor blades supported within the rotor cavity of the gas-wind turbine engine housing such that the gas-wind turbine engine rotor is rotatable about a rotor axis oriented longitudinally of the gas-wind turbine engine housing;
 the gas-wind turbine engine housing including a first housing gap in communication with the rotor cavity through the first wall of the rotor cavity and a second housing gap in communication with the rotor cavity through the second wall of the rotor cavity;
 an air compressor powered by rotation of the gas-wind turbine engine rotor to generate a pressurized air flow;

a combustor receiving fuel from a fuel system and receiving the pressurized air flow from the air compressor, the combustor being arranged to combust a fuel and air mixture from the fuel system and the air compressor respectively to generate an exhaust gas flow;

the combustor including an exhaust duct arranged to direct the exhaust gas flow from the combustor into the rotor cavity, the exhaust duct being separate from the first housing gap and the second housing gap of the gas-wind turbine engine housing, and the exhaust duct being directed into the rotor cavity circumferentially of the gas-wind turbine engine rotor;

a mixture flow duct at the second end of the gas-wind turbine engine housing, the mixture flow duct being in communication with the rotor cavity through the second wall of the rotor cavity whereby the mixture flow duct is arranged to receive the exhaust gas flow discharged from the gas-wind turbine engine rotor rotating within the gas-wind turbine engine housing;

a cooling fan at the first end of the gas-wind turbine engine housing, the cooling fan being operatively connected to the gas-wind turbine engine rotor so as to be driven to rotate by rotation of the gas-wind turbine engine rotor whereby the cooling fan generates a cooling fan air flow longitudinally of the gas-wind turbine engine housing;

the cooling fan being in communication with the first housing gap in the first wall of the rotor cavity such that at least a portion of the cooling fan air flow is directed through the rotor cavity from the first housing gap in the first wall to the second housing gap in the second wall whereby (i) the cooling fan air flow partly drives rotation of the gas-wind turbine engine rotor about the rotor axis and (ii) cools the gas-wind turbine engine rotor blades;

the second housing gap in the second wall of the rotor cavity communicating with the mixture flow duct whereby the mixture flow duct receives said at least a portion of the cooling fan air flow together with the exhaust gas flow discharged from the gas-wind turbine engine rotor rotating within the gas-wind turbine engine housing.

2. The gas-wind turbine engine according to claim 1 wherein the second housing gap is greater in dimension than the first housing gap whereby the second housing gap receives the exhaust gas flow therethrough from the rotor cavity to the mixture flow duct.

3. The gas-wind turbine engine according to claim 1 wherein the first wall and the second wall of the rotor cavity are parallel to one another.

4. The gas-wind turbine engine according to claim 1 wherein the cooling fan is received within a fan housing forming a fan duct surrounding the gas-wind turbine engine housing and wherein a second portion of the cooling fan air flow generated by the cooling fan is directed externally about the gas-wind turbine engine housing from the first end of the gas-wind turbine engine housing to the second end of the gas-wind turbine engine housing whereby the second portion of the cooling fan air flow generated by the cooling fan (i) cools the gas-wind turbine engine housing and exits the gas-wind turbine engine housing at the second end of the gas-wind turbine engine housing to generate thrust.

5. The gas-wind turbine engine according to claim 4 wherein the air compressor comprises air compressor fan blades rotating within an air compressor housing coaxially with the gas-wind turbine engine rotor, the fan duct of the cooling fan further surrounding the air compressor housing such that the cooling fan air flow generated by the cooling fan is directed externally about the air compressor housing.

6. The gas-wind turbine engine according to claim 1 wherein the cooling fan comprises engine fan blades rotating within an engine fan shroud, the engine fan shroud being operatively connected to the gas-wind turbine engine housing such that the cooling fan air flow generated by the cooling fan is fully ducted into the rotor cavity of the gas-wind turbine engine housing independently of the exhaust gas flow from the combustor.

7. The gas-wind turbine engine according to claim 1 wherein the air compressor comprises air compressor fan blades rotating within an air compressor housing mounted externally of the gas-wind turbine engine housing, the air compressor being mechanically connected to the gas-wind turbine engine rotor such that rotation of the air compressor fan blades is mechanically driven by rotation of the gas-wind turbine engine rotor.

8. The gas-wind turbine engine according to claim 7 further comprising a booster compressor connected downstream from the air compressor mounted externally of the gas-wind turbine engine housing such that the air compressor and the booster compressor collectively generate said pressurized air flow directed into the combustor in two stages.

9. The gas-wind turbine engine according to claim 1 wherein the air compressor is driven to rotate by an electric motor.

10. The gas-wind turbine engine according to claim 1 further comprising an air pressure sensor in communication with a space in the gas-wind turbine engine housing receiving the cooling fan air flow from the cooling fan at a location upstream from the gas-wind turbine engine rotor.

11. The gas-wind turbine engine according to claim 1 further comprising a wind turbine rotor supported within the gas-wind turbine engine housing for rotation coaxially with said rotor axis, the wind turbine rotor being downstream from the gas-wind turbine engine rotor whereby the wind turbine rotor is driven by said at least a portion of the cooling fan air flow and said exhaust gas flow discharged from the rotor cavity of the gas-wind turbine engine rotor.

12. The gas-wind turbine engine according to claim 1 wherein each gas-wind turbine engine rotor blade comprises:
   a length defined between a root and a tip of the blade along a radial axis lying perpendicularly to said rotor axis; and
   a straight line connected between a leading edge and a trailing edge of the blade lying between zero and forty degrees from a reference plane occupied by said rotor axis and said radial axis of the blade.

13. The gas-wind turbine engine according to claim 1 further comprising:
   a bearing assembly rotatably supporting the gas-wind turbine engine rotor relative to the gas-wind turbine engine housing;
   an oil channel supplying oil to the bearing assembly; and
   exhaust gas pressure sealing means preventing the exhaust gas flow from contaminating the oil of the bearing assembly.

14. The gas-wind turbine engine according to claim 1 further comprising:
   a bearing assembly rotatably supporting the gas-wind turbine engine rotor relative to the gas-wind turbine engine housing;
   an oil channel supplying oil to the bearing assembly; and an oil sealing assembly comprising: (i) a plurality of oil ring hub grooves located in a rotor hub of the gas-wind turbine engine rotor, (ii) a plurality of oil rings received in the oil ring hub grooves respectively, (iii) an oil ring spring associated with each oil ring for pushing said oil ring against said gas-wind turbine engine rotor housing, and (iv) an oil ring extension at an outer periphery of each oil ring.

15. The gas-wind turbine engine according to claim 1 wherein the gas-wind turbine engine housing includes liquid cooling passageways formed in the gas-wind turbine engine housing to receive liquid coolant circulated through the gas-wind turbine engine housing whereby the gas-wind turbine engine uses liquid cooling in addition to the cooling fan air flow.

16. The gas-wind turbine engine according to claim 15 wherein the gas-wind turbine engine housing includes a first part and a second part joined to one another with a gasket therebetween, the liquid cooling passageways communicating between the first part and the second part to communicate the liquid coolant between the first part and the second part of the gas-wind turbine engine housing, the gasket including through holes in alignment with the liquid cooling passageways communicating between the first part and the second part.

17. The gas-wind turbine engine according to claim 11 wherein the gas-wind turbine engine housing further comprises a plurality of guide vanes supported in communication with the exhaust gas flow between the gas-wind turbine engine rotor and the wind turbine rotor, each guide vane comprising:
  a length defined between a root and a tip of the guide vane along a radial axis lying perpendicularly to said rotor axis; and
  a straight line connected between a leading edge and a trailing edge of the guide vane lying between zero and sixty degrees from a reference plane occupied by said rotor axis and said radial axis of the guide vane.

18. The gas-wind turbine engine according to claim 6 wherein the gas-wind turbine engine housing further comprises a plurality of guide vanes supported in communication with the cooling fan air flow between the cooling fan and the gas-wind turbine engine rotor, each guide vane comprising:
  a length defined between a root and a tip of the guide vane along a radial axis lying perpendicularly to said rotor axis; and
  a straight line connected between a leading edge and a trailing edge of the guide vane lying between zero and sixty degrees from a reference plane occupied by said rotor axis and said radial axis of the guide vane.

19. The gas-wind turbine engine according to claim 1 wherein each gas-wind turbine engine rotor blade comprises (i) a leading side edge in proximity to the first wall of the rotor cavity, (ii) a trailing side edge in proximity to the second wall of the rotor cavity, and (iii) a tip in proximity to the third wall of the rotor cavity whereby the gas-wind turbine engine rotor blades and the first wall, the second wall, and the third wall of the rotor cavity prevent a majority of said exhaust gas flow from escaping to the mixture flow duct until said exhaust gas flow is displaced circumferentially with the gas-wind turbine engine rotor from the exhaust duct of the combustor to the second housing gap in the second wall of the rotor cavity.

20. The gas-wind turbine engine according to claim 1 wherein the gas-wind turbine engine housing includes a first housing part which includes the first wall of the rotor cavity, a second housing part which includes the second wall of the rotor cavity, and a third housing part which includes the third wall of the rotor cavity, the third housing part being mounted between the first housing part and the second housing part such that the first housing part, the second housing part, and the third housing part are readily separable from one another to allow installation of the gas-wind turbine engine rotor into the gas-wind turbine engine housing.

\* \* \* \* \*